United States Patent
Ito et al.

(10) Patent No.: US 7,799,485 B2
(45) Date of Patent: Sep. 21, 2010

(54) FUEL CELL SYSTEM AND COMPOSITION FOR ELECTRODE

(75) Inventors: Masashi Ito, Yokosuka (JP); Takao Maruyama, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 923 days.

(21) Appl. No.: 11/571,865

(22) PCT Filed: Jul. 7, 2005

(86) PCT No.: PCT/JP2005/012593

§ 371 (c)(1),
(2), (4) Date: Jan. 9, 2007

(87) PCT Pub. No.: WO2006/006501

PCT Pub. Date: Jan. 19, 2006

(65) Prior Publication Data

US 2008/0050631 A1    Feb. 28, 2008

(30) Foreign Application Priority Data

| Jul. 9, 2004 | (JP) | ............................ 2004-203147 |
| Sep. 6, 2004 | (JP) | ............................ 2004-258507 |
| Dec. 8, 2004 | (JP) | ............................ 2004-355268 |
| May 30, 2005 | (JP) | ............................ 2005-157449 |
| Jun. 13, 2005 | (JP) | ............................ 2005-172229 |

(51) Int. Cl.
*H01M 4/02* (2006.01)
*B01D 19/00* (2006.01)
*C10L 1/24* (2006.01)
*C10L 1/00* (2006.01)

(52) U.S. Cl. ...................... 429/531; 252/188.2; 44/347; 44/418; 44/423

(58) Field of Classification Search .................. 429/42, 429/38; 252/186.1; 44/347, 418, 423
See application file for complete search history.

(56) References Cited

U.S. PATENT DOCUMENTS

| 6,375,922 B1 | 4/2002 | Ishii et al. |
| 6,518,419 B1 | 2/2003 | Van Der Lugt et al. |
| 6,777,516 B2 | 8/2004 | Li et al. |
| 2003/0008196 A1 | 1/2003 | Wessel et al. |
| 2003/0078308 A1 | 4/2003 | Holdcroft et al. |
| 2008/0044709 A1* | 2/2008 | Ito .............................. 429/33 |

FOREIGN PATENT DOCUMENTS

| JP | 59-185787 A | 10/1984 |
| JP | 2000-223135 A | 8/2000 |

(Continued)

OTHER PUBLICATIONS

Ota et al., "Development of Fuel Cell Vehicles & Their Materials", CMC Publishers Co., Ltd., Dec. 2002, pp. 20-21.

(Continued)

*Primary Examiner*—Patrick Ryan
*Assistant Examiner*—Thomas H. Parsons
(74) *Attorney, Agent, or Firm*—Foley & Lardner LLP

(57) ABSTRACT

According to the invention, a fuel cell system features a fuel cell (1) having an electrode (5, 6), and an antioxidant residing in or contacting the electrode (5, 6), for inactivating active oxygen.

61 Claims, 22 Drawing Sheets

CYCLIC VOLTAMMOGRAM OF NHPI

FOREIGN PATENT DOCUMENTS

| | | | |
|---|---|---|---|
| JP | 2000-251906 A | | 9/2000 |
| JP | 2001-118591 A | | 4/2001 |
| JP | 2003-503510 A | | 1/2003 |
| JP | 2003-86188 A | | 3/2003 |
| JP | 2003-109623 A | | 4/2003 |
| JP | 2003-117398 A | | 4/2003 |
| JP | 2003-201352 | * | 7/2003 |
| JP | 2003-201352 A | | 7/2003 |
| JP | 2003-226743 A | | 8/2003 |
| JP | 2004-134269 A | | 4/2004 |
| JP | 2005-190752 A | | 7/2005 |
| WO | WO 00/24796 | | 5/2000 |

OTHER PUBLICATIONS

"Researches and Developments of Proton-Exchange Membrane Fuel Cell", Kyoto University Graduate School of Engineering as entrustee from the New Energy and Industrial Technology Development Organization, Mar. 2002, pp. 1-44.

Office Action received in U.S. Appl. No. 11/631,943.

De Jonge, "Synergism of Antioxidants," *Pure and Applied Chemistry*, 1983, pp. 1637-1650, vol. 55, No. 10.

Ezerskis et al., Oxidation of Chlorophenols on Pt Electrode in Alkaline Solution Studied by Cyclic Voltammetry, Galvanostatic Electrolyis, and Gas Chromatography-Mass Spectrometry, *Pure and Applied Chemistry*, 2001, pp. 1929-1940, vol. 73, No. 12.

\* cited by examiner

FIG. 10
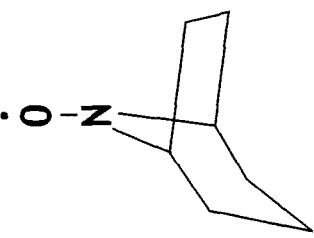
(xli)
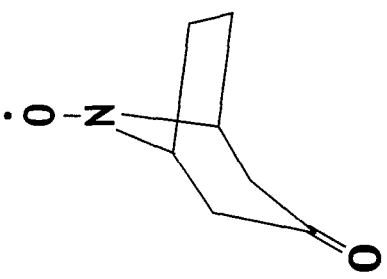
(xlii)
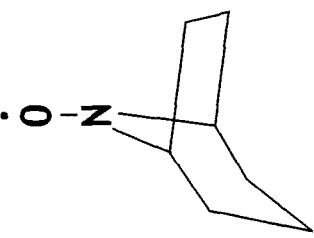
(xliii)
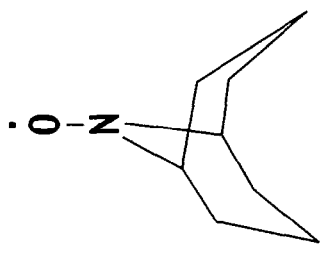
(xl)
m=2∼3
n=2∼3
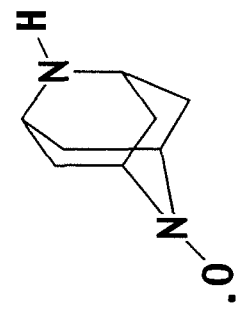
(xliv)
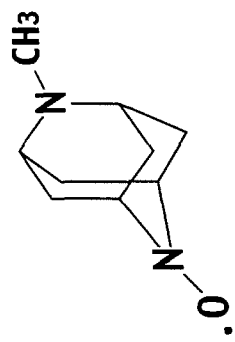
(xlv)
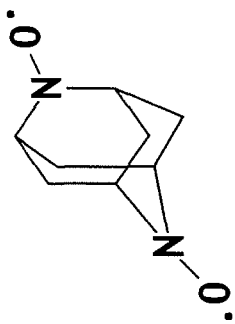
(xlvi)

FIG. 21
(a)
(b)
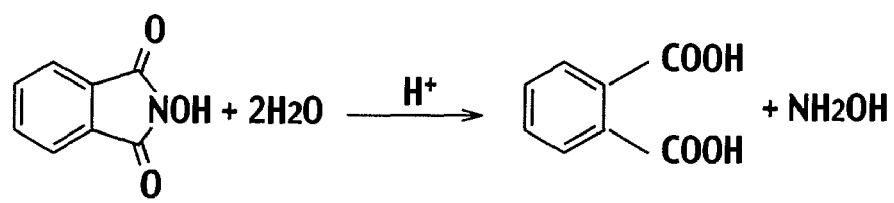
(c)
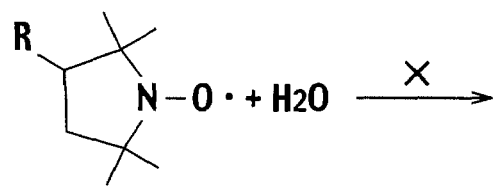

FUEL CELL SYSTEM AND COMPOSITION FOR ELECTRODE

TECHNICAL FIELD

The present invention relates to a fuel cell system and a composite for electrodes, and more specifically, to a fuel cell system, a composite for electrodes, an electrode, a composite for air electrodes, an air electrode for fuel cells, a fuel cell, and a fuel cell vehicle.

BACKGROUND ART

The fuel cell technology is attracting attention as a solution to the problem of energy resources, as well as to the issue of global warming due to CO2 emission. The fuel cell is adapted for electrochemical oxidation of a fuel, such as hydrogen or methanol or any hydrocarbon else in the cell, to effect a direct conversion of chemical energy of the fuel to electrical energy to be taken out. The fuel cell is thus free from emissions of combustion products of fuel, such as NOX and SOX, and attracts attention as a clean energy source for internal combustion engines such as for automobiles, or for thermal power plants.

There are some types of fuel cells, with the PEFC (proton-exchange membrane fuel cell) inclusive, which is now most watched, and developed. The PEFC has various advantages, such that it is (1) adapted for an operation to be facile in start and stop at low temperatures, (2) allowed to be high in theoretical voltage as well as in theoretical efficiency of conversion, (3) implemented with a liquid-free electrolyte allowing a flexible design of cell structure, such as a vertical type, and (4) configured for an interface between ion exchange membrane and electrode to have a three-phase interface controlled to take out an enhanced amount of current, achieving a high density power output.

The principle of operation of a fuel cell includes two electrochemical processes, being an $H_2$ oxidation at the fuel electrode (cathode as negative-pole), and a four-electron reduction of molecular oxygen ($O_2$) shown by formula (A1) below, which produces water.

$$O_2 + 4H^+ + 4e^- \rightarrow 2H_2O \tag{A1}$$

This reaction does not have a yield of 100%, and has concurrent side reactions. A typical one of them is a two-electron reducing reaction of oxygen, which produces active oxygen, such as hydrogen peroxide ($H_2O_2$), as shown in formula (A2) below, for example. (Kyoto University Graduate School of Engineering as entrustee from the New Energy and Industrial Technology Development Organization, "2001 yearly results report, researches and developments of proton-exchange membrane fuel cell, researches on deterioration factors of proton-exchange membrane fuel cell, fund research (1) on deterioration factors, deterioration factor of electrode catalyst/electrolyte interfaces", March 2002, p. 27).

$$O_2 + 2H^+ + 2e^- \rightarrow H_2O_2 \tag{A2}$$

With production of active oxygen due to the two-electron reducing reaction of oxygen, platinum-supporting carbon in the air electrode is oxidized by active oxygen, so that carbon is consumed at the air electrode, where oxygen may have a reduced activation speed on platinum as a catalyst.

The catalyst in use is platinum, which has a lower electrochemical charge voltage than other metals, and a sole metal that can catalyze the electrochemical reaction of fuel cell from about a normal temperature, that is, the reaction of four-electron reduction of oxygen up to water. However, platinum particles may have reduced activities in catalysis, as particle size increases, with exposure to high temperatures as well as high potentials in start-stop operations.

In general, the electrolyte membrane used in PEFC is Nafion® as a cation-exchange film of a perfluorosulfonic acid system. The perfluorosulfonic acid system polymer has a history, where it has been developed as a membrane having a tolerance to active oxygen that the fuel cell produces at the air electrode, i.e., positive electrode. Long endurance tests have not yet revealed a sufficient tolerance. Hydrogen per-oxide produced by the two-electron reduction of oxygen at the air electrode may be the cause. Hydrogen peroxide is stable, and has a long life, though weak in oxidizability. Hydrogen peroxide decomposes, following reaction formulas (A3) and (A4) shown below. When decomposing, it generates radicals, such as hydroxy radical (.OH) and hydroperoxy radical (.OOH). Such radicals, in particular hydroxy radical, are strong in oxidizability, so that even perfluorosulfonated polymer used as an electrolyte membrane may be decomposed in a long use.

$$H_2O_2 \rightarrow 2.OH \tag{A3}$$

$$H_2O_2 \rightarrow .H + .OOH \tag{A4}$$

Low-valence ions of transition metals such as $Fe^{2+}$, $Ti^{3+}$, or $Cu^+$, if present in the electrolyte membrane, cause a Haber-Weiss reaction, where hydrogen peroxide is one-electron reduced by such a metal ion, producing hydroxy radical. Hydroxy radical, most reactive among free radicals, has a very strong oxidizability, as is known. If the metal ion is an iron ion, the Haber-Weiss reaction is known as a Fenton reaction shown by formula (A5) below.

$$Fe^{2+} + H_2O_2 \rightarrow Fe^{3+} + OH^- + .OH \tag{A5}$$

Metal ions, if mixed in an electrolyte membrane, cause a Haber-Weiss reaction, whereby hydrogen peroxide in the electrolyte membrane is changed into a hydroxy radical, whereby the electrolyte membrane may be deteriorated.

For the electrolyte membrane being acid, PEFC will not work unless the element to be employed as a catalyst is a chemically stable noble metal. Further, for reduction of oxygen at a highest potential in the four-electron reducing reaction, the catalyst to be used there should be an oxidizing agent strong of oxidizability. For such reasons, it is considered difficult to find an alternative to platinum as a catalyst. However, platinum is expensive, and current fuel cell systems require 1 g of platinum per 1 kW. Therefore, assuming an output of an automobile of a class of 2,000 cc in displacement to be 100 kW, conversion for an equivalent fuel cell vehicle (FCV) taken as an example results in 100 g of platinum required per one FCV, which does cost ("Development of Fuel Cell Vehicles & Their Materials" by Kenichiro Ohta, and one else, as supervising editor, CMC Publishers Co., Ltd., December 2002, p. 21). Such being the case, the amount of platinum to be used for elecrodes as well as the development of an alternative catalyst to platinum is important.

As a catalyst employable in place of platinum, there has been proposed, e.g., a catalyst using a cobalt salen compound (Japanese Patent Application Laying-Open Publication No. 2000-251906), or a catalyst using tungsten carbide (Japanese Patent Application Laying-Open Publication No. 2003-117398). Further, to prevent an electrolyte membrane from being oxidized by hydroxy radical, there has been proposed, for example, a method in which a compound with phenolic hydroxyl is mixed in the electrolyte membrane, so that peroxide radicals are Wed to be inactive (Japanese Patent Application Laying-Open Publication No. 2000-223135). There has been proposed another method, in which an electrolyte membrane has a phenol compound, amine compound, sulfur compound, phosphorus compound, or the like mixed therein as anantioxidant to vanish generate radicals (Japanese Patent Application Laying-Open Publication No. 2004-134269). There has been proposed still another method, which has an electrolyte membrane disposed adjacent to a catalyst layer containing molecules having a smaller bond energy than carbon-fluorine bonding in the electrolyte membrane, the molecules reacting with priority to hydroxy radicals, thereby protecting the electrolyte membrane (Japanese Patent Application Laying-Open Publication No. 2003-109623).

DISCLOSURE OF INVENTION

The catalyst using a cobalt salen compound however has a reduced activity in acidic media, and needs a change of electrolyte membrane from a cation-exchange film, such as the Nafion® film, to an anion-exchange film. Still less, tungsten carbide has not yet reached a level passing platinum's capability, and the use as a catalyst in place of platinum constitutes a difficulty for a reaction for four-electron reduction.

Generation of hydroxy radical occurs with an increased tendency in a vicinity of a three-phased interface of an air electrode, that is an environment where oxygen and platinum as an electrode catalyst exist, and compounds tend to be oxidized, so that those methods in which an electrolyte membrane simply contains an oxidation-preventive compound, as described above, may have this compound also oxidized to disappear, whether hydroxy radical is present or not, which is inefficient. Still less, that compound may react with hydroxy radical to generate an unstable radical or peroxide, which may act as an initiator of additional reaction for oxidation, causing deterioration of the electrolyte membrane.

This invention is made in view of such points. It is an object of the invention to provide a fuel cell system with an excellent tolerance, as well as inclusion of a catalyst alternative to platinum for electrodes.

A first invention is a fuel cell system characterized by a fuel cell having an electrode, and an antioxidant residing in or contacting said electrode, for inactivating active oxygen.

A second invention is a composite for electrodes characterized by a composition containing as an oxidation-reduction catalyst a compound having a redox cycle, where it acts as a reducing agent in a range of potentials lower than a redox potential of oxygen and as an oxidizing agent in a range of potentials higher than a redox potential of hydrogen or hydrogen ion.

As a third invention, an electrode comprises a composite for electrodes according to the second invention.

As a fourth invention, a composite for air electrodes comprises a composite for electrodes according to the second invention.

As a fifth invention, an air electrode for fuel cells comprises a composite for air electrodes according to the fourth invention.

As a sixth invention, a fuel cell comprises an electrode according to the third invention.

As a seventh invention, a fuel cell vehicle has mounted thereon a fuel cell system according to the first invention.

BRIEF DESCRIPTION OF THE DRAWINGS

FIG. 10 is a diagram of formulas of exemplary compounds.

FIG. 21 shows in a reaction formula (a) NHPI being hydrolyzable, in a diagram (b) PROXYL being unhydrolyzable, and diagram (c) TEMPO being unhydrolyzable.

BEST MODE FOR CARRYING OUT THE INVENTION

There will be described below details of a fuel cell system and a composite for electrodes according to the invention, in accordance with their modes of embodiment.

(Fuel Cell System)

Figure 1:
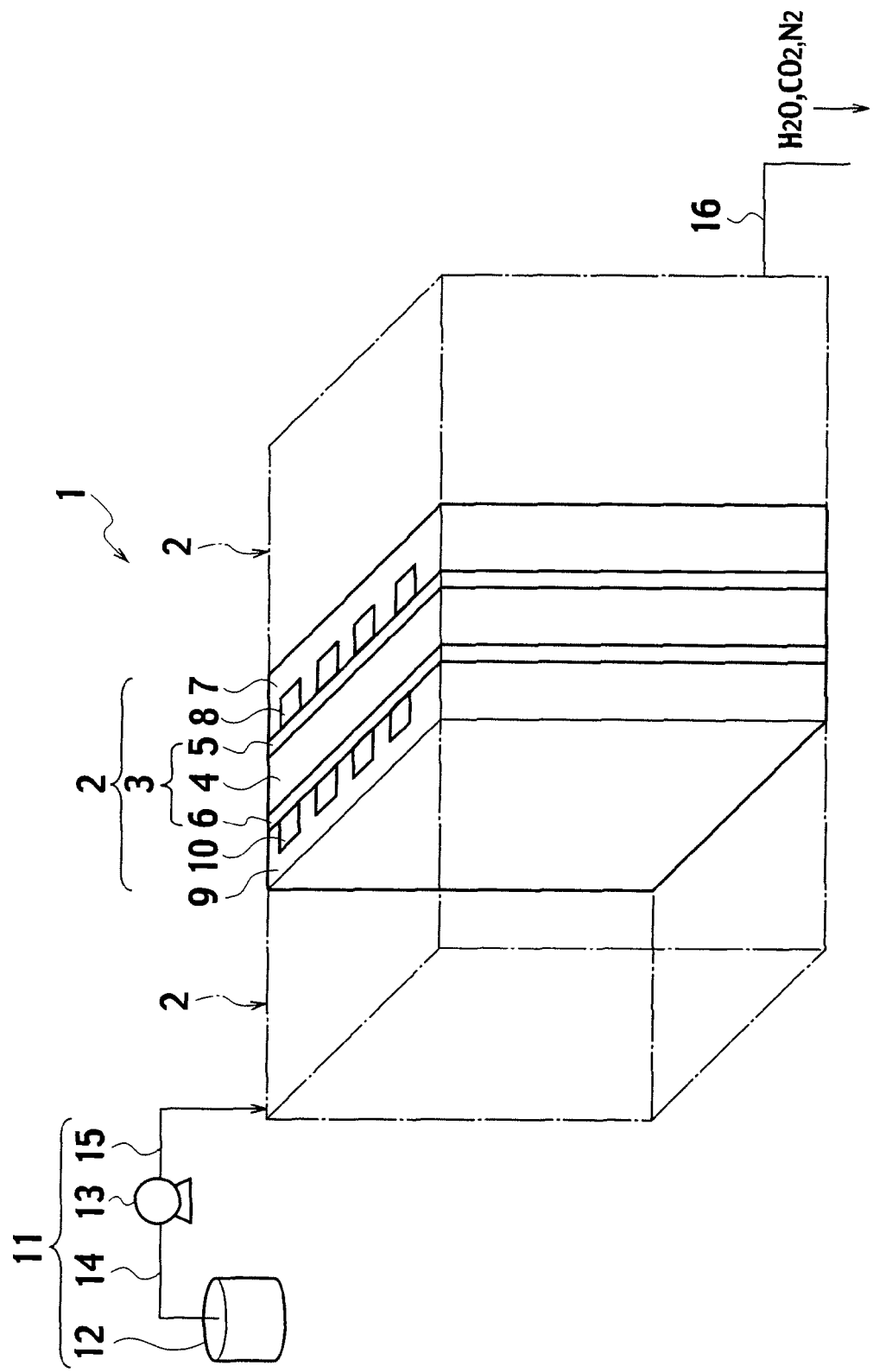
FIG. 1 is a diagram generally illustrating a mode of embodiment of a fuel cell system according to the invention.

According to a mode of embodiment of the invention, the fuel cell system is characterized by a fuel cell having an electrode, and an antioxidant residing in or contacting the electrode, for inactivating active oxygen The fuel cell system taken now as an example of the invention is a solid polymer electrolyte type that employs, as its electrolyte membrane, a solid polymer electrolyte membrane. FIG. 1 is a diagram generally illustrating a mode of embodiment of the fuel cell system according to the invention. According to this mode of embodiment, the fuel cell system is generally made, as illustrated in FIG. 1, by a fuel cell 1, and an antioxidant supply system 11 disposed outside the fuel cell 1 and configured to supply the fuel cell 1 with an antioxidant to be brought into contact with electrodes in the fuel cell 1, for inactivation of active oxygen therein.

As illustrated in FIG. 1, the fuel cell 1 constituting the fuel cell system according to this mode of embodiment includes a fuel cell stack (not shown) configured as a lamination of a plurality of unit cells 2 each serving as a fundamental unit for power generation by electrochemical reactions, while the lamination has end flanges (not shown) fit on its both ends and connected at their peripheral parts by tie bolts (not shown). Each unit cell 2 comprises a membrane electrode assembly 3 comprising a solid polymer electrolyte membrane 4, and an air electrode 5 and a fuel electrode 6, with the solid polymer electrolyte membrane 4 in between, an air electrode side separator 7 disposed on the air electrode 5 side of the membrane electrode assembly 3, cooperating with the membrane electrode assembly 3 to have air channels defined therebetween, and a fuel electrode side separator 9 disposed on a surface at the fuel electrode 6 side of the membrane electrode assembly 3, cooperating with the membrane electrode assembly 3 to have fuel gas channels 10 defined therebetween.

As the solid polymer electrolyte membrane 4 in unit cell 2, there may be employed a film of perfluorocarbon polymer having sulfonate group (trade name: Nafion® 112 by Du Pont Co., U.S.), and the like. The membrane electrode assembly 3 is configured with catalytic layers having platinum catalyst supported by carbon, of which one is joined as the air electrode 5 to either side of the solid polymer electrolyte membrane 4, and the other, as the fuel electrode 6 to the opposite side.

The air electrode side separator 7 and the fuel electrode side separator 9 are configured as plate-shaped carbon or metal members, which have gas channels and cooling water channels formed in surfaces thereof. The air channels 8 are formed between the air electrode 5 and the air electrode side separator 7, to supply the air electrode 5 with air as a reaction gas. The fuel gas channels 10 are formed between the fuel electrode 6 and the fuel electrode side separator 9, to supply the fuel electrode 6 with hydrogen as a reaction gas. The fuel gas channels 10 are adapted to serve as paths for moisture supplement by humidification of fuel gas, and the air channels 8 are adapted to serve as paths for removal of produced water, as well. Between the electrode 5, 6 and the separator 7, 9, there may be interposed an adequate gas diffusion layer made of, e.g., carbon paper, unwoven carbon cloth, etc.

In each unit cell 2 of the solid polymer electrolyte type fuel cell 1 configured as described, the air channels 8 and the fuel gas channels 10 are respectively supplied with air and hydrogen gas, whereby air and hydrogen gas are fed to the air electrode 5 and the fuel electrode 6, respectively, causing reactions shown by formulas (B1) and (B2) below.

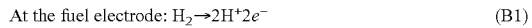

At the fuel electrode: $H_2 \rightarrow 2H^+ + 2e^-$ (B1)

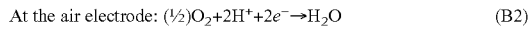

At the air electrode: $(\frac{1}{2})O_2 + 2H^+ + 2e^- \rightarrow H_2O$ (B2)

Figure 3:
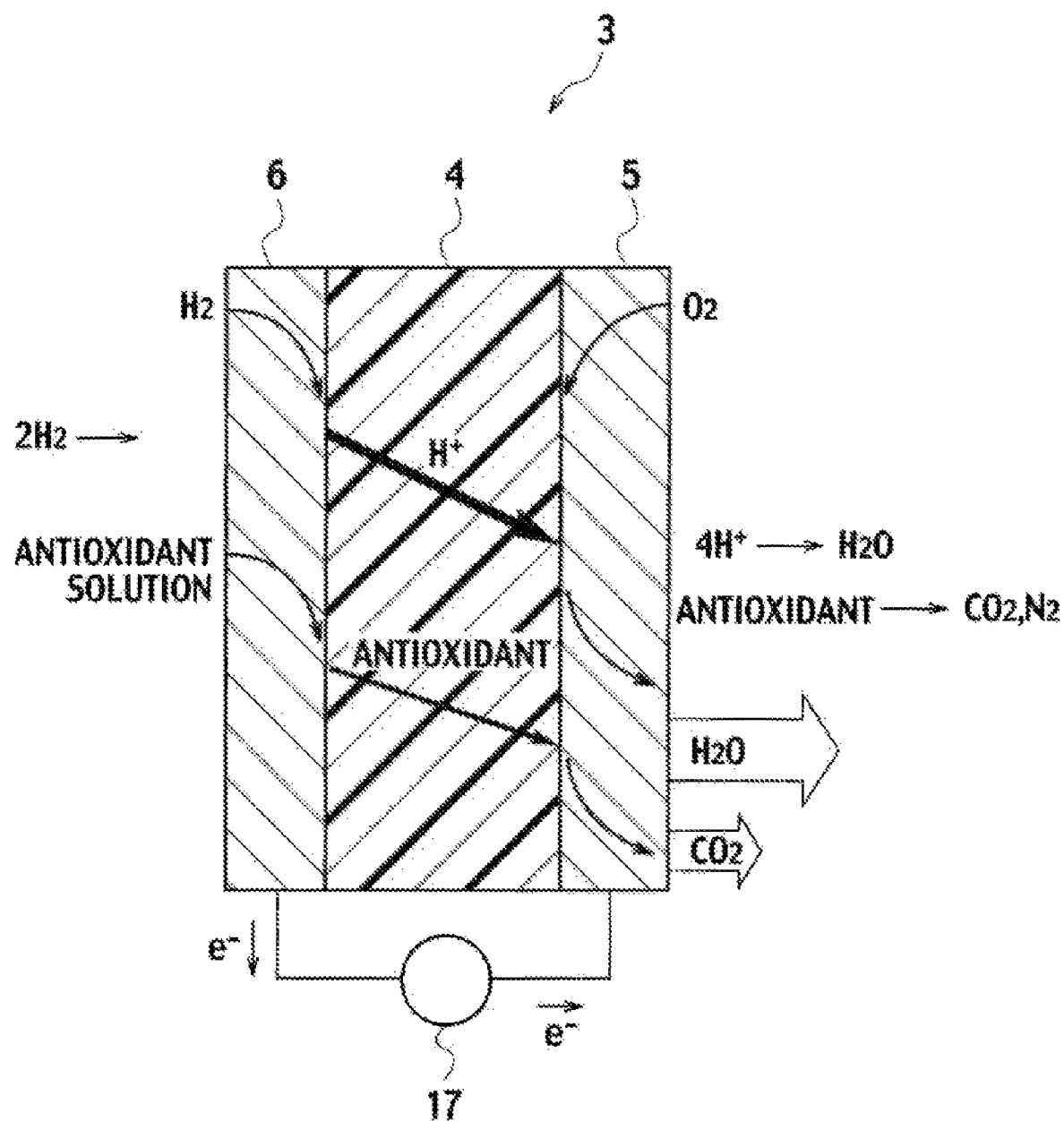
FIG. 3 is a diagram illustrating transfer of materials in a membrane-electrode assembly constituting the unit cell.

As illustrated in FIG. 3, with hydrogen gas fed to the fuel electrode 6, the reaction of formula (B1) develops, generating H⁺ (proton) and e⁻ (electron). H⁺ is hydrated to move through the solid polymer electrolyte membrane 4 to the air electrode 5, where it reacts to e- and oxygen gas of air fed thereto, so that the reaction of formula (B2) develops, producing water. With an electromotive force then produced, electrons generate at the fuel electrode 6 are conducted to the air electrode 5, via an external circuit 17 shown in FIG. 3.

Such being the case, the reaction at the air electrode 5 appears as a generation of water by four-electron reduction of molecular oxygen ($O_2$). T is four-electron reduction of oxygen accompanies concurrent side reactions that generate free radicals, such as superoxide anion ($O_2^-$) as a one-electron reduction body of oxygen, hydroperoxy radical (.OOH) as a conjugate acid of superoxide, hydrogen peroxide ($H_2O_2$) as a two-electron reduction body, and hydroxy radical (.OH) as a three-electron reduction body. Generation mechanisms of those free radicals are considered to be complex reactions by way of such elementary reaction processes as shown by formulas (B3) to (B7) below.

$O_2 + e^- \rightarrow O_2^-$ (B3)

$O_2^- + H^+ \rightarrow .OH$ (B4)

$O_2 + 2H^+ + 2e^- \rightarrow H_2O_2$ (B5)

$H_2O_2 + H^+ + e^- \rightarrow H_2O + .OH$ (B6)

$H_2O_2 \rightarrow 2.OH$ (B7)

Generated free radicals are considered to be reduced finally to water, by way of such elementary reaction process as shown by formulas (B8) to (B10) below, where $E^O$ is a standard redox potential given in terms of NHE (normal hydrogen electrode).

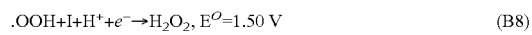

$.OOH + I + H^+ + e^- \rightarrow H_2O_2,\ E^O = 1.50\ V$ (B8)

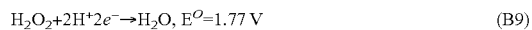

$H_2O_2 + 2H^+ + 2e^- \rightarrow H_2O,\ E^O = 1.77\ V$ (B9)

$.OH + + H^+ + e^- \rightarrow H_2O,\ E^O = 2.85V$ (B10)

Now controversial is hydroxy radical that has a redox potential as high as 2.85V, and is strong in oxidizability. Hydroxy radical is most reactive among free radicals, and has a very short life of one millionth second. As the oxidizability is strong, hydroxy radical reacts with another molecule, unless it is promptly reduced. Most controversial cases of oxidative degradation may have been caused by hydroxy radical. Generation of hydroxy radical is maintained by way of formulas (B3) to (B7) during power generation of fuel cell. Hydroperoxy radical and hydrogen peroxide, though weaker in oxidizability than hydroxy radical, return to water by ways of processes that may generate hydroxy radical. Like this, the generation of hydroxy radical continues semipermanently, so long as power is generated in a solid polymer electrolyte type fuel cell. The solid polymer electrolyte membrane may thus be deteriorated, unless the solid polymer electrolyte type fuel cell is continuously supplied with a compound that can inactivate hydroxy radical. According to this mode of embodiment, the fuel cell system has an antioxidant supply system 11 installed outside a fuel cell 1, for supplying an antioxidant to the fuel cell 1 of a proton-exchange membrane type, so that even when power is generated at the fuel cell 1, continuously generating active oxygen, the antioxidant can be supplied from outside the fuel cell, besides hydrogen ion or hydrogen acting as fuel, in a manner where it is uninvolved in the fuel cell reaction, allowing a successful inactivation and elimination of active oxygen, with a resultant prevention of deterioration of the solid polymer electrolyte membrane. Further, an efficient inactivation of active oxygen can be maintained by the external supply of antioxidant, even in an environment where the antioxidant tends to be oxidized.

Figure 2:
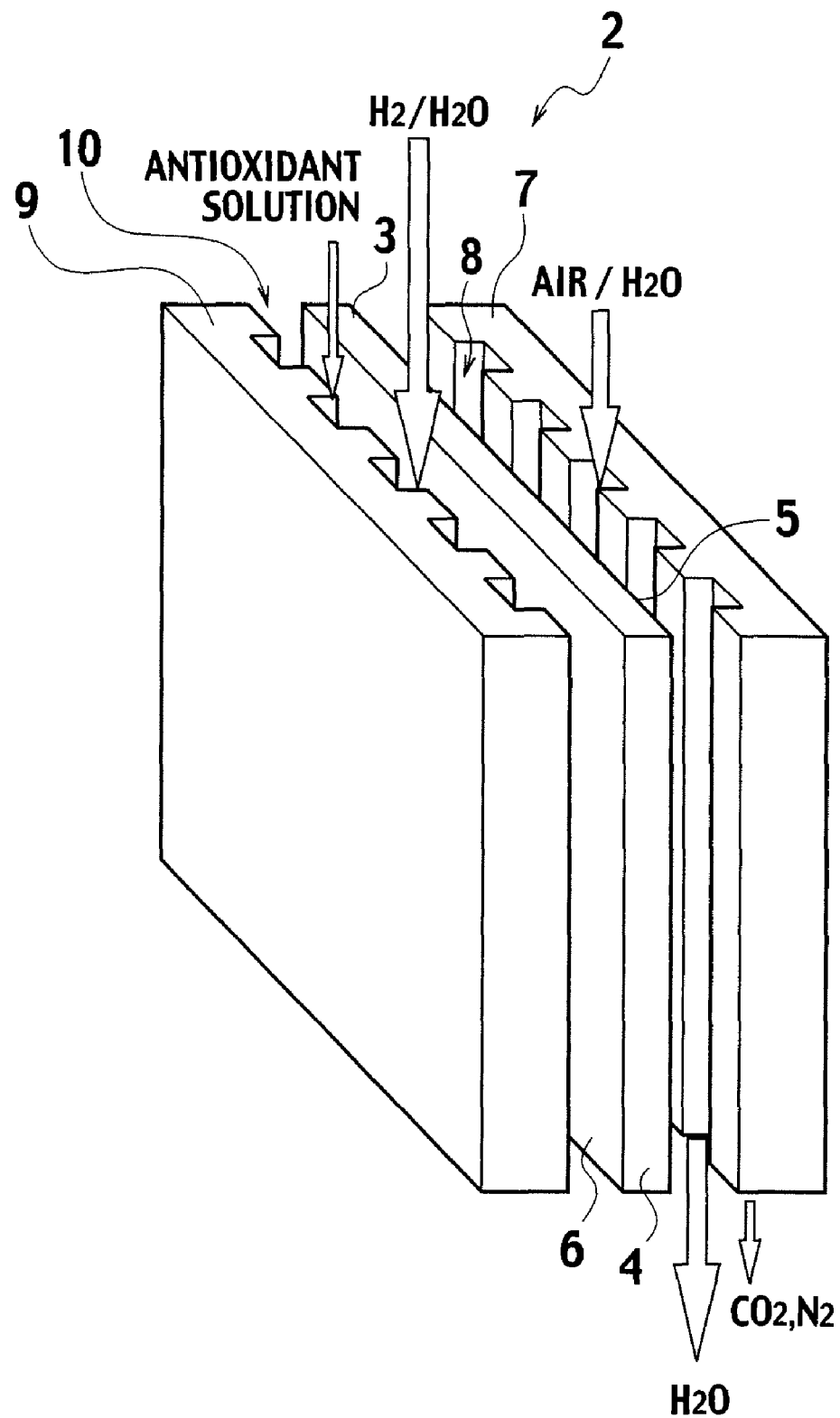
FIG. 2 is an exploded perspective view of a unit cell of a fuel cell constituting the fuel cell system according to the invention.

In view of the generation of active oxygen that continues semipermanently so long as power is generated in a solid polymer electrolyte type fuel cell, it should be effective to continuously supply antioxidant as an antioxidant solution from air electrode or fuel electrode. The supply may preferably be made from the fuel electrode 9 side of the fuel cell 1. In the case of an antioxidant to be supplied from the fuel electrode 9 side, the antioxidant supply system 11 is configured, as illustrated in FIG. 1, with e.g. an antioxidant solution tank 12 having sealed therein a solution of the antioxidant, a liquid feed pump 13 for feeding the antioxidant solution to the fuel electrode 6 side of the fuel cell 1, an antioxidant solution line 14 for interconnection between the antioxidant solution tank 12 and the liquid feed pump 13, and an antioxidant supply line 15 for interconnection between the liquid feed pump 13 and fuel gas channels 10. In the fuel cell 1, the air electrode side separator 7 and the fuel electrode side separator 9 have air channels 8 and fuel gas channels 10 formed in surfaces thereof for supplying air and hydrogen as reaction gases, respectively, as described. The reaction gases may be humidified by bubblers (not shown), and pass air channels 8 and fuel gas channels 10, as illustrated in FIG. 2, which is an exploded perspective view of a unit cell of a fuel cell constituting the fuel cell system. The antioxidant solution is then fed by drive power of the liquid feed pump 13, from the antioxidant solution tank 12 to a fuel gas channel 10, via antioxidant solution line 14 and antioxidant supply line 15. The antioxidant solution fed to fuel gas channel 10 is diffused in the solid polymer electrolyte membrane 4, moving from the fuel electrode 6 side to the air electrode 5 side, as illustrated in FIG. 3, which is a diagram illustrating transfer of materials in a membrane-electrode assembly constituting the unit cell. As a result, the antioxidant is uniformly dispersed within the air electrode 5, depending on a gradient of concentration.

Figure 4:
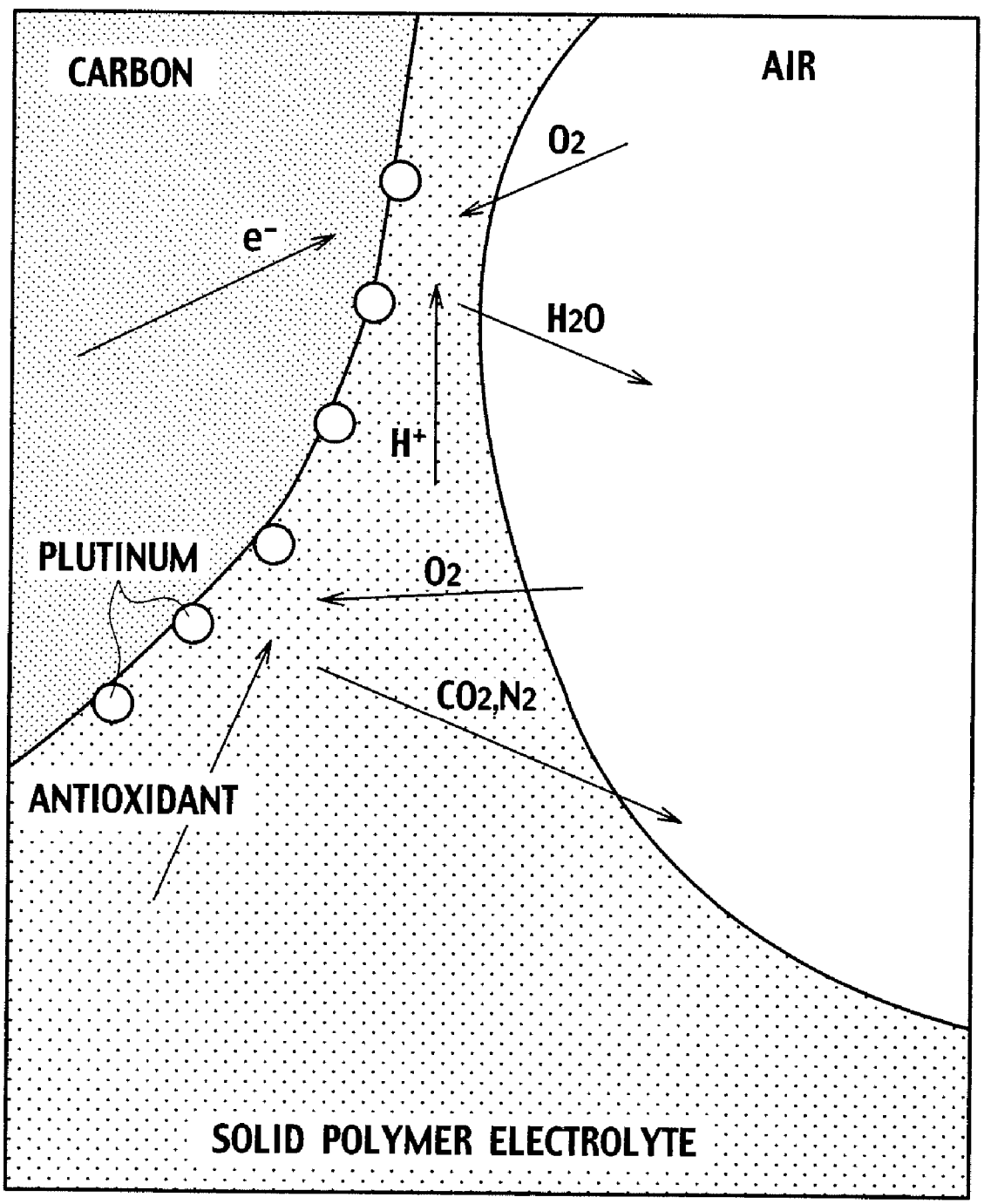
FIG. 4 is a schematic diagram illustrating a three-phased interface in an air electrode.

Such being the case, it is desirable to supply an antioxidant as an antioxidant solution from the fuel electrode 6 side, which is because of the possibility of occurrence of active oxygen, such as hydroxy radical, that increases within a region near a three-phase interface at the air electrode. As illustrated in FIG. 4 that is a schematic diagram illustrating a three-phase interface at an air electrode, there is platinum residing as electrode catalyst, as well as oxygen in the air, in a region vicinal to the three-phase interface at the air electrode, which region thus constitutes an extremely oxidizable environment. Therefore, if an antioxidant is supplied from the air electrode side, the antioxidant itself may be oxidized and disappear at a three-phase interface at the air electrode, resulting in an inefficient inactivation of active oxygen, whether hydroxy radical is present or not.

The air channels 8 of the air electrode side separator 7 described serve as channels for removal of produced water, as well. Overfed and unused antioxidant, as well as antioxidant having been changed to an oxidant by inactivation of active oxygen, is oxidized by catalyst on a three-phase interface, and changed to $CO_2$, $H_2O$, $N_2$, etc. which can thus be discharged from a discharge line 16 shown in FIG. 1, together with produced water. The antioxidant, as it has been changed by reaction with active oxygen into an oxidant, unstable radical, or peroxide, is thus kept from acting as an initiator of additional oxidation, causing a deterioration of electrolyte membrane.

Although, in preparation of an antioxidant solution, one may be unfastidious about a low solubility for a uniform dispersion in the air electrode, the solubility to a solvent should be hung on as being important. In an insoluble case, inhibited entry or exit of hydrogen radical causes an insufficient exhibition of the effect to inactivate active oxygen. A solvent should thus be selected for dissolution of antioxidant, using an organic solvent solely or in combination with water, as a mixed solvent, as necessary. The use of an organic solvent should however be checked for no adverse affect to the performance of power generation. It therefore is desirable from the view point of generation performance to make an aqueous solution, if the antioxidant is dissoluble.

The antioxidant may preferably be a hydrocarbon system compound composed of four elements, being carbon, oxygen, nitrogen, and hydrogen. Other elements else than carbon, oxygen, nitrogen, and hydrogen may poison platinum in electrode, adversely affecting a power generation performance of the fuel cell. Base metal elements may promote generation of hydroxy radical. To cover an application including oxidation in and discharge from air electrode, the antioxidant may preferably be composed simply of the four elements being carbon, oxygen, nitrogen, and hydrogen, as a hydrocarbon system compound to be decomposed into $CO_2$, $H_2O$, $N_2$, and the like. Hydroxy radical has a very high redox potential so that, thermodynamically, most hydrocarbon compounds composed of the above-noted four elements may act as a reductant on hydroxy radical. Kinetically, those compounds may be different in reducing ability. In view of high reactivity of hydroxy radical, it is desirable for the antioxidant to be kinetically faster in reducing reaction. It also is important to consider the stability of the oxidant the antioxidant is to be oxidized to, that is, the compound to be obtained when it is oxidized by active oxygen. If the oxidant of antioxidant is unstable, the oxidized substance may act as an initiator of new side reaction, promoting the deterioration of electrolyte membrane. As compounds kinetically relatively fast and chemically stable in the state of oxidant, there may be taken, for example, secondary alcohol system compounds having hydroxyl group, such as isopropanol, 2-butanol, and cyclohexanol, aromatic series having hydroxyl group, such as phenols, phonol, cresol, picric acid, naphthol, and hydroquinone, an ether system compounds, such as dioxane, tetrahydrofuran and benzyl methyl ether, and nitrogen-containing system compounds, such as propylamine, diethylamine, acetamide, aniline, and N-hydroxy system compound.

In selection of such compounds, the stability, durability, and heat resistance of compound are important. In particular, the stability and durability of compound are most important for the inactivation of active oxygen to be maintained to use a fuel cell over a long term. Preferably, hydrolysate of oxidant of antioxidant should also be chemically stable. For inactivation of active oxygen, it should be effective if the antioxidant supplied to the fuel electrode be kept stable until its discharge from the air electrode. On the other hand, antioxidant used for inactivation of active oxygen is discharged together with produced water, as described, and for a long-term operation of the system, the hydrolysate of antioxidant may preferably be stable without generating radicals. For the operating temperature of fuel cell to be within a range of 80 to 90° C. in normal run, and for the heat resistance of electrolyte membrane to be enhanced in future, the antioxidant may preferably be stable in heat resistance up to a temperature about 120° C.

Preferably, the compound for inactivating active oxygen should be such a compound as having an oxidation potential of 2.85V or less that can be oxidized by hydroxy radical at least promptly. More preferably, not simply being oxidizable, but should it also be redox-reversible by an oxidation-reduction cycle where, as it is oxidized, the oxidant is reduced, whereby it comes back to an original form. The redox potential may preferably be greater than 0.68V (NHE) and smaller than 1.77V (NHE). 0.68V (NUE) is a potential where hydrogen peroxide acts as a reducing agent, and hence provision of an equivalent or higher potential allows the oxidant of the compound in concern to oxide hydrogen peroxide, returning to the original form. On the other hand, 1.77V (NHE) is a potential where hydrogen peroxide acts as an oxidizing agent, and for equivalent or higher oxidation potentials, the oxidant of the compound may act as a new oxidizing agent, causing oxidation of electrolyte membrane and the like.

For the oxidizability of compound to be decreased, the redox potential may preferably be 1.00V or less. A fluorine system film may be used as an electrolyte membrane. In this case, the potential where the fluorine system electrolyte membrane is to be oxidized ranges 2.5V or more, and with the oxidizability of 1.77V, the electrolyte membrane will not be oxidized, causing no problem. A hydrocarbon system film may be used as an electrolyte membrane. In this case, the hydrocarbon system electrolyte membrane may be oxidized when the redox potential of added compound exceeds 1.00V. Substituting typical organic compounds therefor, benzene is to be oxidized at 2.00V, toluene is at 1.93V, and xylene is at 1.58V. Hydrocarbon system electrolyte membrane is thus oxidized at a lower redox potential than fluorine system electrolyte membrane. Therefore, by setting the redox potential within a range of 1.00V or less, the electrolyte membrane can be kept from being oxidized, allowing for a long service, even in the use of a hydrocarbon system film. It is noted that the actual redox potential (RHE: real hydrogen electrode) may vary, depending on various conditions, such as pH and temperature, and the selection may preferably be made within a matching range.

The reversibility of redox is important for the following reasons. For fuel cells, preventing oxidation, while generating power, needs consideration to the electrolytic oxidation. A situation is now supposed, in which a compound employed as an antioxidative substance for reducing active oxygen to water is supplied to an electrolyte, from the side of an electrode. The antioxidative substance may then be oxidized by electrolytic oxidation at the electrode, thus having an oxidized state to enter the electrolyte. In particular, for compounds under 1.23V (NHE) that is a theoretical voltage of the solid polymer electrolyte type fuel cell, the possibility of electrolytic oxidation on the way to the electrolyte is great. For any compound, unless it has a reversible redox-ability, the function as an antioxidative substance is lost when the compound is oxidized by electrolytic oxidation. If the compound has a reversible redox-ability, it will be regenerated, by hydrogen peroxide as a reducing agent, for example, as a reductant that again functions as an antioxidative substance. From such point of view, as well, the amount of a compound to be supplied as antioxidant can be reduced, if the compound has a reversible redox-ability. Moreover, in the use of an antioxidant that has a reversible redox-ability, the antioxidant may be positively oxidized by electrolytic oxidation, to thereby implement a method of inactivating hydrogen peroxide without detouring via hydroxy radicals, allowing for the more effective inactivation of active oxygen.

The antioxidant may preferably comprise a compound represented by a general formula (I) below

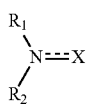

(I)

where R1 and R2 respectively denote elements of a set of arbitrary substituent groups mutually identical or different, and X denotes an oxygen atom or hydroxyl group. More preferably, R1 and R2 are combined with each other, to form a double bond, an aromatic ring, or a nonaromatic ring.

Further, the compound may preferably comprise an imide compound represented by a general formula (II) below

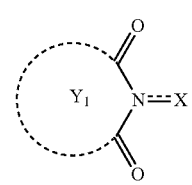

(II)

where a ring Y1 comprises any ring of a set of 5-membered to 12-membered rings double-bonded and aromatic or nonaromatic.

The above-noted compound is supplied as an antioxidant to the proton-exchange membrane fuel cell, where it efficiently reduces hydroxyl radical to water, thereby suppressing a deterioration of electrolyte membrane, through an elementary process shown by formula (B11) below.

$$>NOH + .OH \rightarrow >NO. + H_2O \quad (B11)$$

The supply of hydrogen causes generation of N-oxyl radical (>NO.), which draws out radical hydrogen from hydrogen peroxide, to return to an original form of hydroxyamine (>NOH), as shown by formula (B12) below.

$$2(>NO.) + H2O2 \rightarrow 2(>NOH) + O_2 \quad (B12)$$

Figure 5:
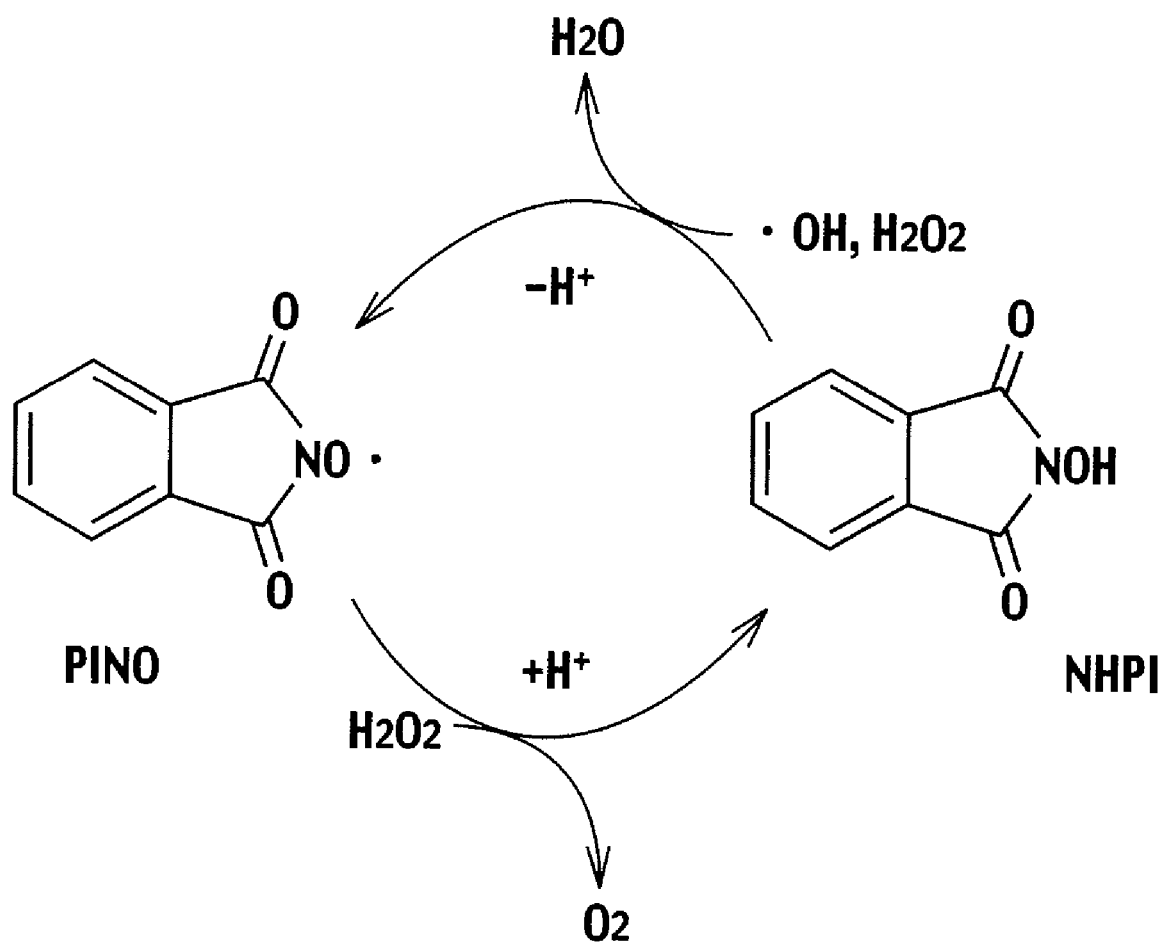
FIG. 5 is a diagram illustrating a mechanism for inactivation of active oxygen by NHPI.

FIG. 5 shows N-hydroxyphthalimide (NHPI) as a typical example of the compound having a hydroxy imide group, and phthalimide N-oxyl (PINO) as an oxidant of NHPI in which NHPI is changed in a radical form, and illustrates a mechanism in which hydroxyl radical as an active oxygen as well as hydrogen peroxide is inactivated. As shown in FIG. 5, NHPI acts as a reducing agent on hydroxyl radical, generating PINO and water, and PINO reacts with hydrogen peroxide to return to NHPI. At this time, PINO acts as an oxidizing agent on hydrogen peroxide, inactivating hydrogen peroxide into oxygen. Like this, a redox cycle turns between NHPI and PINO, enabling the use as an antioxidant to be repeated many times, which allows inactivation of active oxygen over a long term, allowing for implementation of a fuel cell system with maintained durability. In addition, as the redox cycle turns, the antioxidant having reduced hydroxyl radical will not constitute an initiator of additional side reactions.

Further, the above-noted compound may preferably comprise an imide compound represented by a general formula (III) below

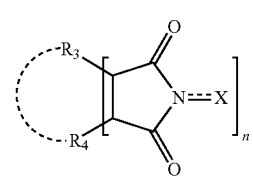

(III)

were R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or hydroxyl group, and n denotes an integer within 1 to 3.

In the compound represented by the general formula (III), subsets R3 and R4 may include iodine, bromine, chlorine, and fluorine as halogen atoms. The alkyl groups may include those linear chain or branch chain alkyl groups which have carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The aryl groups may include, for example, a phenyl group, a naphthyl group, etc. The cycloalkyl groups may include a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, that have carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups which have carbon numbers of their alkoxy parts within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, a hexyloxy carbonyl group, and the like. They may preferably have carbon numbers of alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, a pivaloyl group, and the like.

The substituents R3 and R4 may be mutually identical or different. In the compound represented by the general formula (III), the substituents R3 and R4 may be combined with each other to form a double bond, an aromatic ring, or a nonaromatic ring. Among them, the aromatic ring or nonaromatic ring may preferably be any one kind of ring of 5-membered to 12-membered rings, or more preferably, of roughly 6-membered to 10-membered rings, and these may be heterocycles or fused heterocycles, or preferably, hydrocarbon rings.

As such rings, there may be taken, for example: nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring; and aromatic rings, such as benzene rings and naphthalene rings. Those rings may have substituent groups.

Further, in compounds represented by the general formula (III), as compounds to be more preferable in particular from view points of the compound's stability, durability, and solubility to electrolyte membrane, there may be employed those in which R3 and R4 are mutually combined to form an aromatic or nonaromatic one of 5-membered to 12-membered rings, or those in which R3 and R4 are mutually combined to provide a cycloalkane ring with a substituent, a cycloalkene ring with a substituent, or a bridging type hydrocarbon ring with a substituent.

In particular from the points of compound's stability, durability, and solubility to electrolyte membrane, the compound represented by the general formula (III) may preferably comprise a compound represented by one of general formulas (IVa) to (IVf) below

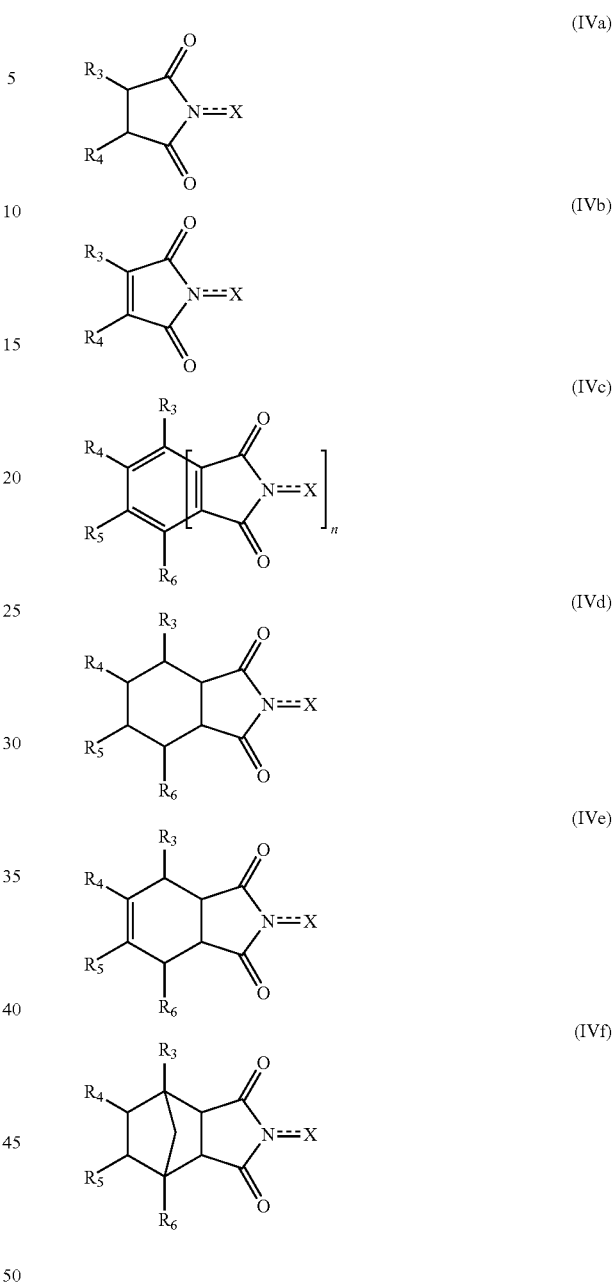

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

The substituents R3 to R6 may include as alkyl groups, those of like alkyl groups to the before-mentioned alkyl groups, which have carbon numbers within a range of 1 to 6 or near, as alkoxy groups, like alkoxy groups to the before-mentioned alkoxy groups, in particular those lower alkoxy groups which have carbon numbers within a range of 1 to 4 or near, and as alkoxycarbonyl groups, like alkoxycarbonyl groups to the before-mentioned alkoxycarbonyl groups, in particular those lower alkoxycarbonyl groups whose alkoxy parts have carbon numbers within a range of 1 to 4 or near.

Substituents R3 to R6 may include, as acyl groups, like acyl groups to the before-mentioned acyl groups, in particular those acyl groups which have carbon numbers within a range of 1 to 6 or near. As halogen atoms, there may be cited fluorine, chlorine, and bromine atoms. As for substituents R3 to R6, they may typically be elements of a set of hydrogen atoms, lower alkyl groups having carbon numbers within a range of 1 to 4 or near, carboxyl groups, nitro groups, and halogen atoms, in most cases.

In view of the availability, synthesis to be facile, and cost of compound, more desirable imide compounds may preferably comprise an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide. This compound may be disposed as a coexisting catalyst in the electrolyte membrane. Such an imide compound may be prepared by a standard imidizing reaction in which a correspondent acid anhydride reacts with hydroxylamine $NH_2OH$, whereby its acid anhydride radical has an opened ring, which is closed for imidization.

The compound represented by the general formula (II) may comprise such a compound that has an N-substitution cyclic imide frame, as represented by a general formula (V) below

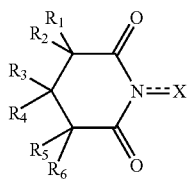

(V)

where X denotes an oxygen atom or hydroxyl group, R1 to R6 respectively denote elements of a set of hydrogen atoms, halogen atoms, alkyl groups, aryl groups, cycloalkyl groups, hydroxyl groups, alkoxy groups, carboxyl groups, substituent carbonyl groups, acyl groups, or acyloxy groups, mutually identical or different. At least two of R1 to R6 may be combined with each other to form a double bond, an aromatic ring, or a nonaromatic ring. Of the rings, at least one may have an N-substitution cyclic imide group.

In the N-substitution cyclic imide frame, both 5-membered ring and 6-membered ring are hydrolyzable as shown by formulas (B13) and (B14) below, while the 6-membered ring is slower in hydrolysis, and higher in hydrolysis resistance, than the 5-membered ring.

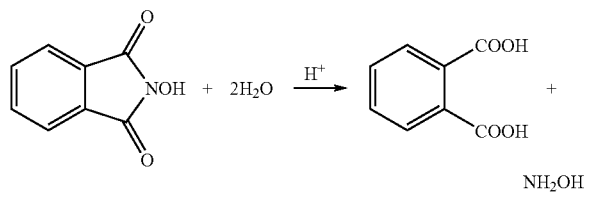

(B13)

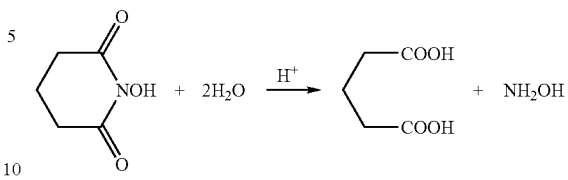

(B14)

Therefore, if the compound having the N-substitution cyclic imide frame is a cyclic imide of a 6-membered ring, this can be reused many times as a redox catalyst, thus allowing the consumption of catalyst to be the more reduced.

It is noted that the alkyl groups may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

Further, the aryl groups may include a phenyl group, a naphthyl group, etc., and the cycloalkyl groups may include a cyclopentyl a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, having carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of their alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, and a pivaloyl group, and the like.

Further, in the compound represented by the general formula (V), at least two of R1 to R6 may preferably be combined with each other to form a double bond, or an aromatic or nonaromatic ring. Among them, the aromatic ring or the nonaromatic ring may preferably be any one kind of ring of 5-membered to 12-membered rings, or more preferably, about 6-membered to 10-membered rings, while the ring may be heterocycles or fused heterocycles. As such rings, there may be taken, for example, nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring, and aromatic rings, such as benzene rings and naphthalene rings. It is noted that those rings may have a substituent group.

In view in particular of the compound's stability, durability, and the like, the compound represented by the general formula (V) may preferably comprise a compound represented by one of general formulas (VIa) and (VIb) below

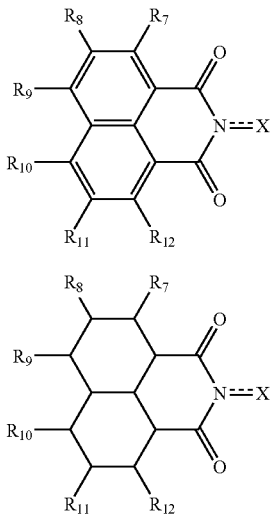

where R7 to R12 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

The compound represented by one of the general formulas (V), (VIa) and (VIb) may preferably comprise at least one kind of imide compound selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8; 4,5-naphthalene tetracarboxylic acid imide, N,N'-dihydroxy-1,8; 4,5-decalin tetracarboxylic acid imide, and N,N',N" trihydroxy isocyanuric acid imide.

The cyclic imide of 6-membered ring can be prepared by a standard imidizing reaction in which, for example, a correspondent acid anhydride of 6-membered ring reacts with hydroxylamine $NH_2OH$, whereby its acid anhydride radical has an opened ring, which is closed for imidization. This cyclic imide of 6-membered ring is disposed for a coexistence in the electrolyte membrane, like the cyclic imide of 5-membered ring, whereby elementary processes progress, as shown by formulas (B15) and (B16) below. And, simply upon an entry such as of hydroxyl radical or hydrogen peroxide into electrolyte membrane, the 6-membered imide ring supplies hydrogen radical, which efficiently reduces hydrogen peroxide, suppressing oxidation of the electrolyte membrane.

>NOH+.OH→>NO.+H₂O (B15)

2(>NOH)+H₂O₂→2(>NO.)+2H₂O (B16)

The supply of hydrogen generates N-oxyl radical (>NO.), which draws out hydrogen ion from hydrogen element or hydrogen peroxide, and returns to the original form of hydroxyimide (>NOH), as shown by formulas (B17) to (B19) below.

2(>NO.)+H₂→2(>NOH) (B17)

>NO.+H⁺+e⁻→>NOH (B18)

2(>NO.)+H₂O₂→2(>NOH)+O₂ (B19)

Figure 6:
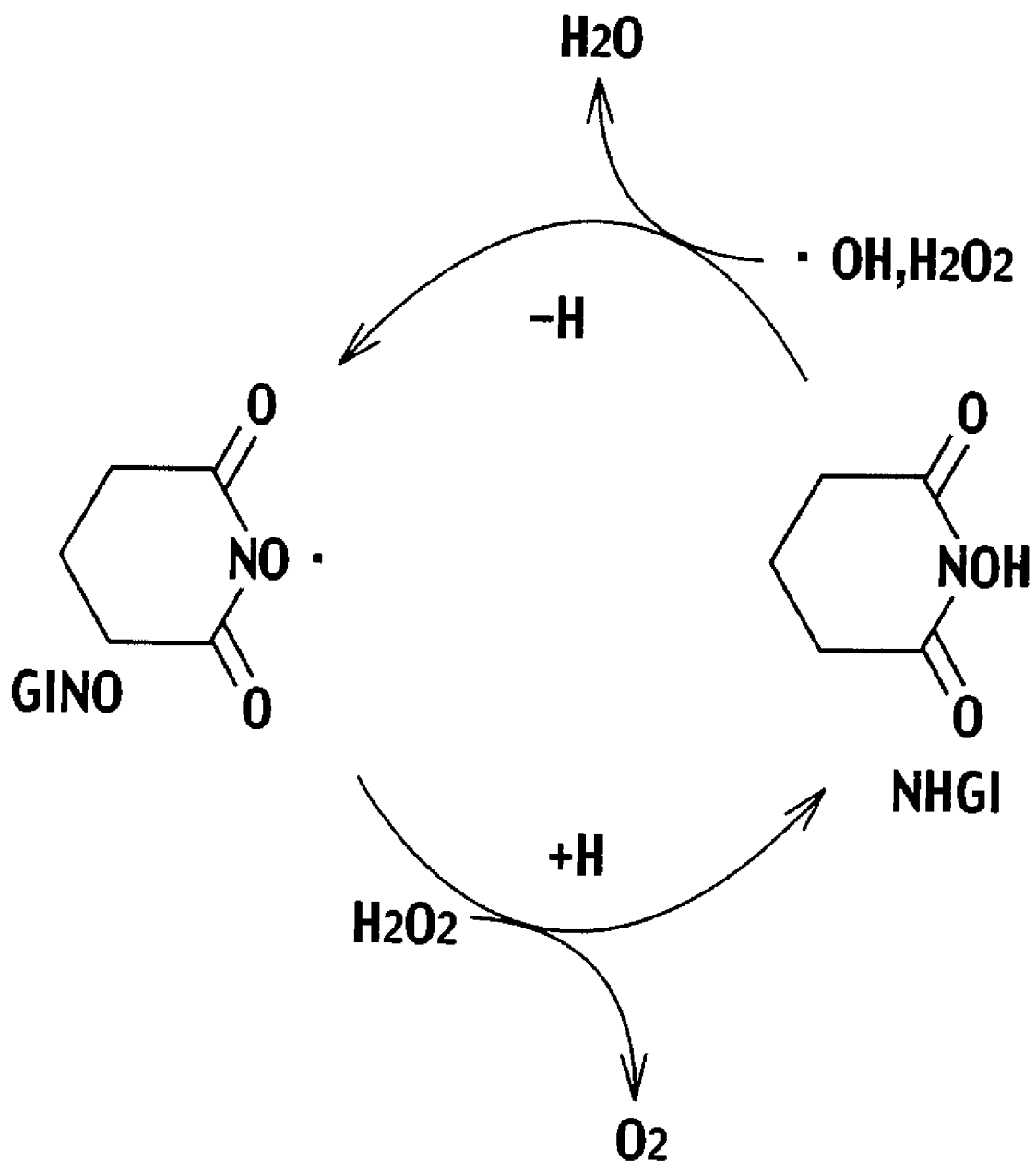
FIG. 6 is a diagram illustrating a mechanism for inactivation of active oxygen by NHGI.

FIG. 6 shows N-hydroxy glutaric acid imide (NHGI) as a typical example of the compound having a hydro-oxy imide group, and glutaric acid imide N-oxyl (GINO) as an oxidant of NHGI in which NHGI is changed in a radical form, and illustrates a mechanism in which a cycle turns between hydroxy imide group of NHGI and N-oxyl radical of GINO, thereby having hydroxy radical as well as hydrogen peroxide disappear over a long term. That is, NHGI acts as a reducing agent on hydroxyl radical or hydrogen peroxide, for reducing hydroxyl radical or hydrogen peroxide into water. On the other hand, GINO acts as an oxidizing agent on hydrogen peroxide, for oxidizing hydrogen peroxide into oxygen. Like this, a redox cycle turns between NHGI and GINO, concurrently having hydroxy radical as well as hydrogen peroxide disappear. In the N-substitution cyclic imide frame, the 6-membered ring is slower in hydrolysis, and higher in hydrolysis resistance, than the 5-membered ring, and hence, if the compound having the N-substitution cyclic imide frame is a cyclic imide of a 6-membered ring, this allows the consumption of catalyst to be the more reduced.

The compound represented by the general formula (I) may comprise a compound represented by a general formula (VII) below

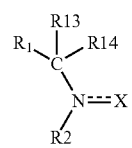

(VII)

where R13 and R14 each respectively denote an alkyl group, or an alkyl group substituted in part by an arbitrary radical, wherein R13 and R14 may be chained, ringed, or branched. R13 and R14 may be mutually combined to form a ring, and may include oxygen and nitrogen atoms. The compound represented by the general formula (VII) may be continuously supplied, for inactivation of continuously generated active oxygen to suppress an oxidation of electrolyte membrane. In the compound represented by the general formula (VII), substituents R13 and R14 may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VII) may preferably comprise a compound represented by a general formula (VIII) below

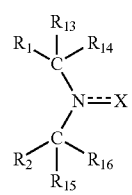

(VIII)

where R13 to R16 each respectively denote an alkyl group, or an alkyl group substituted in part by an arbitrary radical, wherein R13 to R16 may be chained, ringed, or branched. Among them, R13 and R14, or R15 and R16 may be mutually combined to form a ring, and they may include oxygen and nitrogen atoms. In the compound represented by the general formula (VIII), substituents R13 to R16 may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VIII) may preferably comprise a compound represented by a general formula (IX) below

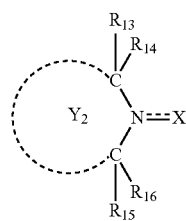

(IX)

where a ring Y2 denotes a 5-membered or 6-membered ring formed by R13 and R14 mutually combined. As such rings, there may be taken, for example, nonaromatic hydrocarbon rings, such as cycloalkane rings, e.g., cyclohexane ring, and cycloalkene rings, e.g. cyclohexene ring, nonaromatic bridging rings, such as bridging type hydrocarbon rings, e.g. five-norbornene ring, and aromatic rings, such as benzene rings and naphthalene rings. It is noted that those rings may have a substituent group.

The compound represented by the general formula (IX) may preferably comprise a compound represented by a general formula (X) below

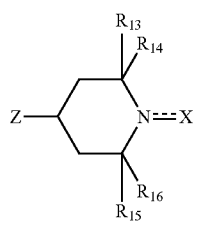

(X)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. The compound represented by the general formula (X) is hardly hydrolyzable, and may be continuously supplied, for inactivation of continuously generated active oxygen to suppress an oxidation of electrolyte membrane.

For substituent Z in the compound represented by the general formula (X), there may be taken alkyl groups, in particular those of like alkyl groups to the before-mentioned alkyl groups, which have carbon numbers within a range of 1 to 6 or near, while as aryl groups, there may be taken phenyl groups and naphthyl groups. There may be taken alkoxy groups, in particular those of like alkoxy groups to the before-mentioned alkoxy groups, which have carbon numbers within a range of 1 to 6 or near, and as carboxyl groups, those carboxyl groups which have carbon numbers within a range of 1 to 4 or near, for example. As alkoxycarbonyl groups, there may be taken those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of alkoxy parts within a range 1 to 6 or near, or more preferably, be as lower alkoxycarbonyl groups as carbon numbers within a range of 1 to 4 or near.

Figure 7:
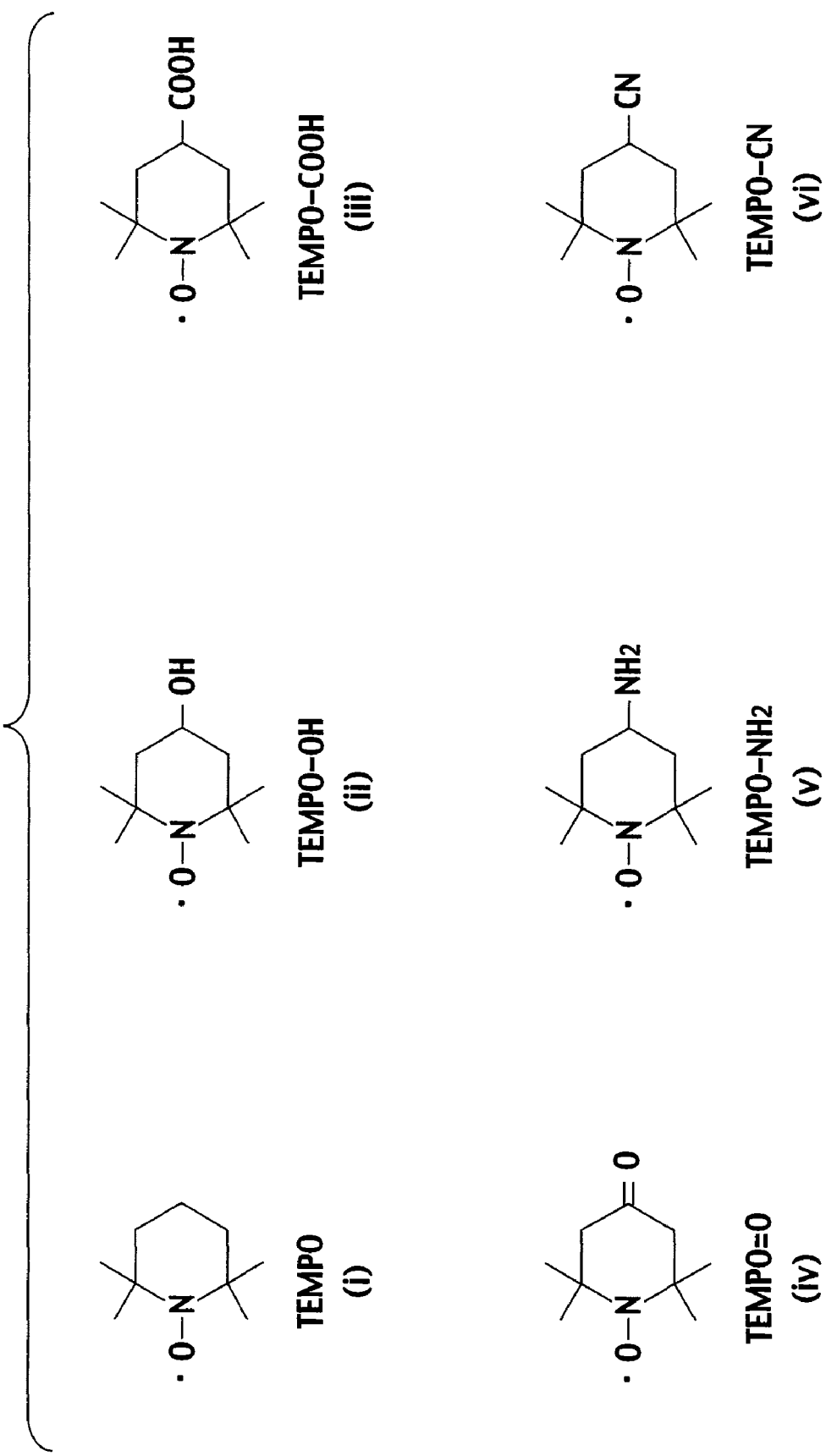
FIG. 7 is a diagram of formulas of exemplary compounds.

As an example of compound represented by the general formula (X), there is now taken TEMPO (2,2,6,6-tetramethylpiperidine-1-oxyl). FIG. 7 shows chemical formulas of examples of compounds represented by the general formula (X), with TEMPO inclusive. FIG. 7(i) shows TEMPO as a compound having a reversible redox-cycle, which finally inactivates active oxygen.

The compound represented by the general formula (IX) may comprise a compound represented by a general formula (XI) below

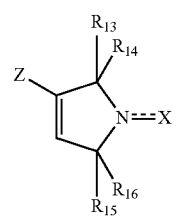

(XII)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms.

The compound represented by the general formula (IX) may comprise a compound represented by a general formula (XI) below

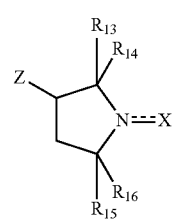

(XI)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms. Also these compounds are hay hydrolysable like that represented by the general formula (X), and may be continuously supplied, for inactivation of continuously generated active oxygen to suppress an oxidation of electrolyte membrane. For compounds represented by the general formula (XI) or (XII), the substituents to be employed may be like to the compound represented by the general formula (X).

Figure 8:
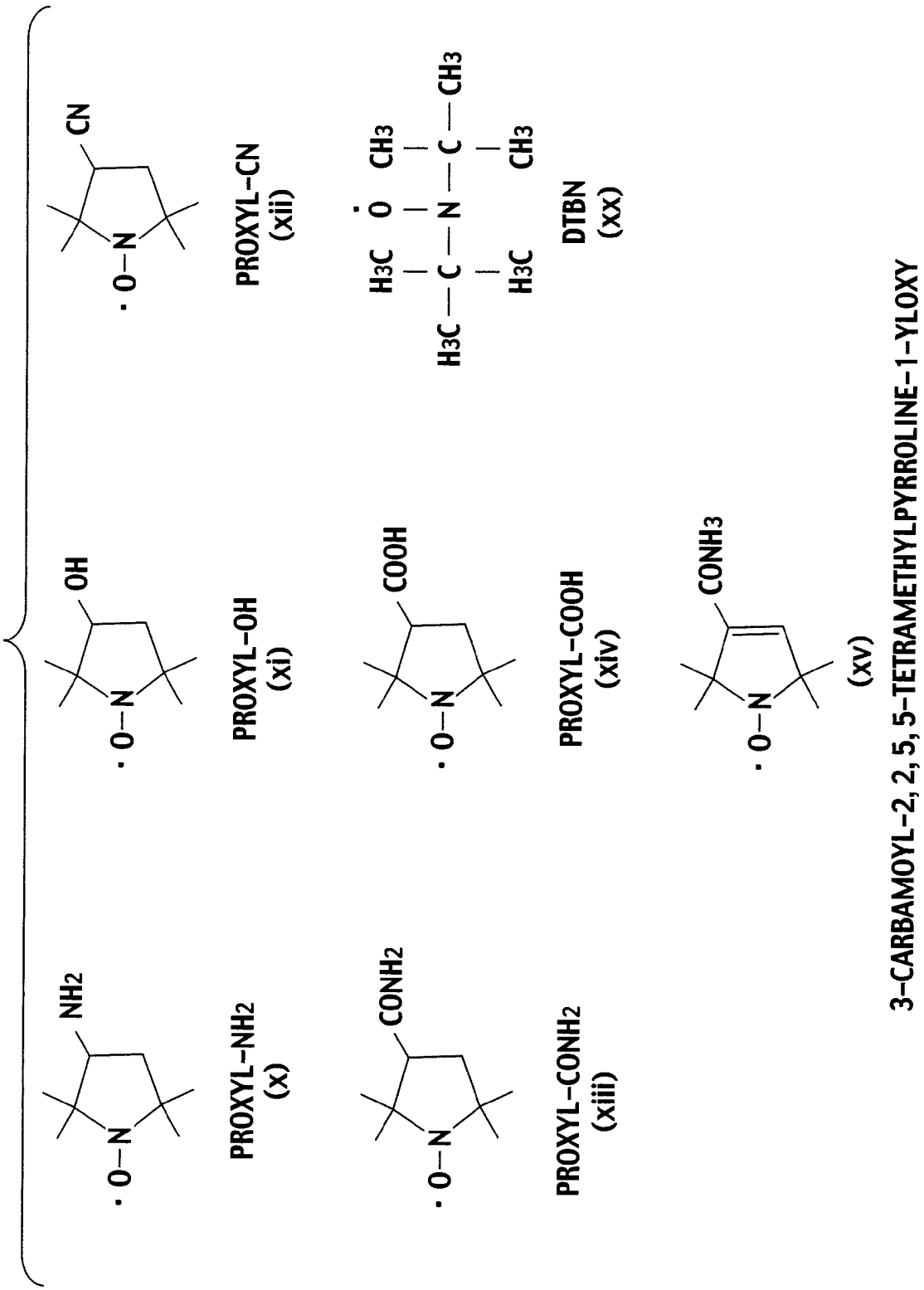
FIG. 8 is a diagram of formulas of exemplary compounds.
Figure 9:
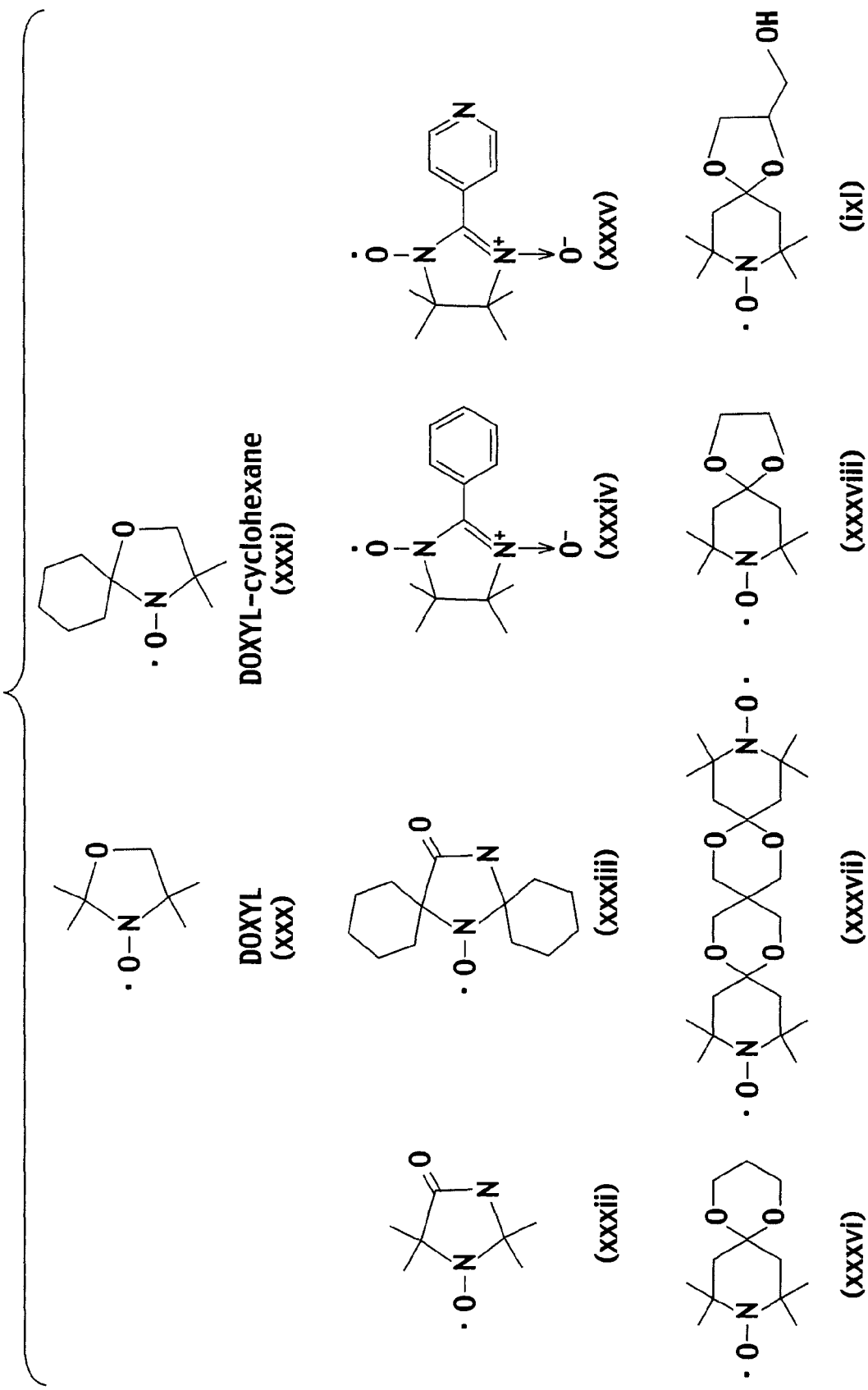
FIG. 9 is a diagram of formulas of exemplary compounds.

Examples of compounds represented by the general formula (XI) or (XII) are shown in FIG. 8 to FIG. 10. As examples of compounds represented by the general formula (XI) or (XII), PROXYL (2,2,5,5-tetramethylpyrrolidine-1-oxyl) and DOXYL (4,4-dimethyloxazolidine-3-oxyl) are now cited. These compounds also have a reversible redox cycle, and can serve for inactivation of active oxygen.

Figure 11:
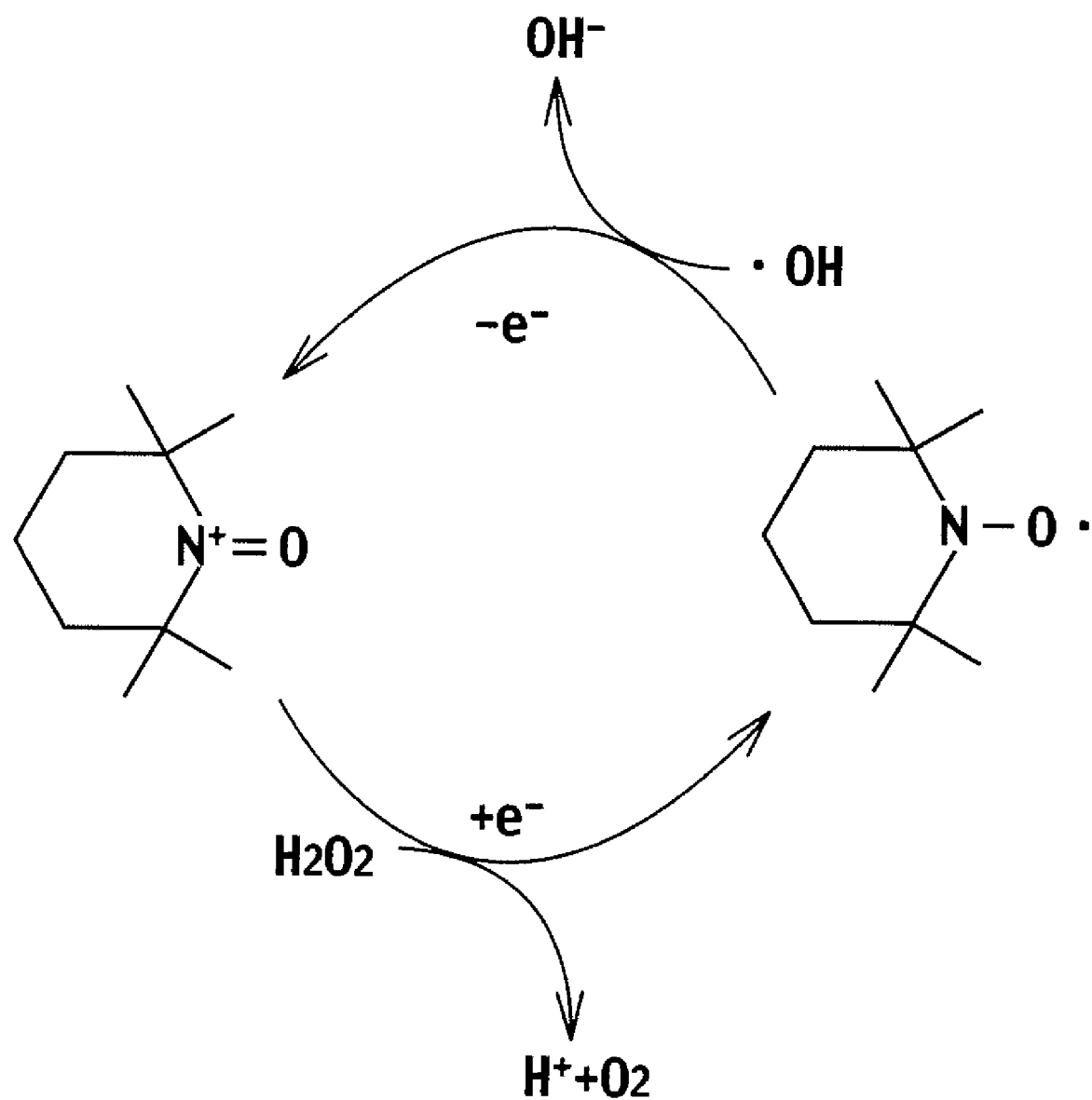
FIG. 11 is a diagram illustrating a mechanism for inactivation of active oxygen by TEMPO.

FIG. 11 shows a mechanism of oxidation and reduction by another example of compound employable in the fuel cell system according to this mode of embodiment. For TEMPO, a typical example of the compound, its redox cycle is illustrated as a mechanism in which hydroxyl radical as well as hydrogen peroxide is inactivated by TEMPO.

It is known that hydrogen peroxide acts as a reducing agent on a substance whose redox potential is higher than hydrogen peroxide, and on the other hand, as an oxidizing agent on a substance whose redox potential is lower than hydrogen peroxide, as in the formula (B9) and as in a formula (B20) below.

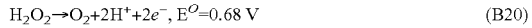

TEMPO is an N-hydroxy imide derivative that has a reversible redox cycle, where performs oxidation and reduction through elementary reaction processes with a redox potential of 0.81V, as shown by formulas (B21) and (B22) below.

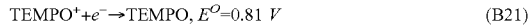

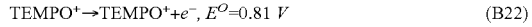

TEMPO has a redox potential higher than the redox potential of hydrogen peroxide, and lower than the redox potential of hydroxy radical. Therefore, an N-oxyl radical of TEMPO, that is, a reductant acts as a reducing agent on hydroxy radical, whereby it supplies an electron (e⁻) to hydroxy radical generated in the electrolyte membrane, which is thereby reduced to OH⁻.

On the other hand, TEMPO⁺ being an oxidant acts as an oxidizing agent on hydrogen peroxide, i.e., performs oxidation of hydrogen peroxide, taking out hydrogen, so that hydrogen peroxide is oxidized to oxygen, whereby TEMPO⁺ is changed to have a recovered form of reductant

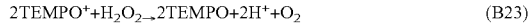

After the recovery to a reductant, TEMPO again acts to reduce hydroxy radical. Like this, a redox cycle turns between reductant and oxidant of TEMPO, which concurrently inactivates hydroxy radical as well as hydrogen peroxide, thus preventing oxidation of electrolyte membrane.

In a situation that TEMPO is supplied from the fuel electrode of fuel cell, part of TEMPO may be oxidized by electrolytic oxidation shown by formula (B22), whereby it may be changed to TEMPO⁺ being an oxidant, and diffused in the electrolyte. In this case also, TEMPO, which has a reversible redox cycle, cooperates with hydrogen per-oxide acting as a reducing agent, to recover the original reductant form of TEMPO, which again functions as an oxidizing agent that can reduce hydroxy radical. Unless the compound has a reversible redox cycle, its antioxidant function is lost when it has reduced hydroxy radical, so that it will not function any more as an oxidizing agent. However, in the case of a compound having a reversible redox cycle, the reversible redox cycle allows the function as an oxidizing agent to be kept to some extent.

Such being the case, according to this mode of embodiment, a fuel cell system is configured with a fuel cell having an electrode, and an antioxidant contacting the electrode, for inactivating active oxygen, and an antioxidant supply system for supplying the antioxidant from an air electrode side or a fuel electrode side of the fuel cell, thereby allowing the fuel cell system to be implemented for an en inactivation and elimination of active oxygen.

In the fuel cell system according to this mode of embodiment, the fuel cell to be employed may well be any one of a hydrogen type, a direct methanol type, and a direct hydrocarbon type.

The fuel cell system according to this mode of embodiment may be mounted on a fuel cell vehicle, as an application thereof. The fuel cell vehicle is allowed to endure a continuous run over a long time, by mounting thereon the fuel cell system according to this mode of embodiment. The fuel cell system has applications thereof not limited to a fuel cell vehicle, and is applicable, for example, to a fuel cell cogeneration power generating system, a fuel cell home electric appliance, a fuel cell portable device, a fuel cell transport machine, and the like.

(Composite for Electrodes)

There will be described below details of a composite for electrodes according to the invention, in accordance with a mode of embodiment. The composite for electrodes according to this mode of embodiment is characterized by a composition containing as an oxidation-reduction catalyst a compound having a redox cycle, where it acts as a reducing agent in a range of potentials lower than a redox potential of oxygen and as an oxidizing agent in a range of potentials higher than a redox potential of hydrogen or hydrogen ion.

In the solid polymer electrolyte type fuel cell, reactions progress as shown by the following formulas.

Negative electrode (fuel electrode):

Positive electrode (air electrode):

A fuel gas containing hydrogen is fed to the fuel electrode, where the reaction of formula (C1) develops, generating hydrogen ions. Hydrogen ions are hydrated by moisture in the solid polymer electrolyte membrane, and move through the solid polymer electrolyte membrane, to the air electrode. At the air electrode, hydrogen ions having moved there react with oxygen in an oxidizing gas fed to the positive electrode, so that the ration of formula (C2) develops, producing water. With an electromotive force then produced, electrons generated at the fuel electrode are conducted via an external circuit to the air electrode. It is noted that $E^O$ is given in terms of a standard redox potential (NHE).

Such oxidation and reduction developing at the air electrode produce water as a final product of a reaction of four-electron reduction of oxygen shown in the formula (C2). It is known that, in addition to the reaction of formula (C2), hydrogen peroxide is generated by a reaction of two-electron reduction of oxygen, if the potential is low, or such as when platinum as a catalyst has impurities adhering thereto.

$$O_2 + 2H^+ + 2e^- \rightarrow H_2O_2, \; E^O = 0.68V \quad (C3)$$

The PEFC employs platinum as a catalyst for electrode, where the reaction of formula (C2) as a main reaction and a reaction of formula (C3) as a side reaction develop as concurrent competitive reactions. The formula (C3) generates hydrogen peroxide, which is considered to disappear through reactions shown by formulas (C4)

$$H_2O_2 + H_2 \rightarrow 2H_2O \quad (C4)$$

$$H_2O_2 + 2H^+ + 2e^- \rightarrow 2H_2O, \; E^O = 1.77V \quad (C5)$$

$$2H_2O_2 \rightarrow 2H_2O + O_2 \quad (C6)$$

The formula (C4) and the formula (C5) represent a reaction in which hydrogen peroxide receives hydrogen ions and electrons at the air electrode, to be reduced into water, and a reaction in which hydrogen peroxide is reduced into water by $H_2$ having crossed over the membrane from the fuel electrode to the air electrode. The formula (C6) represents a reaction in which two molecules of hydrogen peroxide react with each other to generate water and oxygen. In the formula (C6), either hydrogen peroxide acts as an oxidizing agent, and the other hydrogen peroxide acts as a reducing agent as shown by a formula (C7) below, to generate water and oxygen.

$$H_2O_2 \rightarrow 2H^+ + 2e^-, \; E^O = 0.68V \quad (C7)$$

It is known that hydrogen peroxide acts as an oxidizing agent on a substance having a higher redox potential Man hydrogen peroxide, as in the formulas (C5) and (C7), and on the other hand, acts as a reducing agent on a substance having a lower redox potential than.

It is noted that the formula (C4) is a sum of an elementary reaction shown by the formula (C5) and an elementary reaction shown by the formula (C1). The formula (C6) is a sum of an elementary reaction shown by the formula (C5) and an elementary reaction shown by the formula (C7). Thermodynamically, that substance which has a higher redox potential acts as an oxidizing agent, and that substance which has a lower redox potential acts as a reducing agent. And, basically, when $\Delta E^O$ of an entire system has a positive value, the reaction develops. It however is noted that for a respective substance, $E^O$ represents an average value of the substance, while in practice, the redox potential has a certain range, so that the reaction may develop even with a negative value about $\Delta E^O = -0.15V$.

As shown in the formula (C2), oxygen has a standard redox potential of 1.23V, while hydrogen or proton has a standard redox potential of 0.00V. Therefore, at the positive electrode, oxygen acts as an oxidizing agent on hydrogen, so that the reaction of formula (C2) or (C3) develops. The reaction of formula (C3) generates hydrogen peroxide, whose standard redox potential is 1.77V when acting as an oxidizing agent, as shown in the formula (C4), and is higher than the standard redox potential of hydrogen. Therefore, hydrogen peroxide acts as an oxidizing agent on hydrogen, so that the reaction of formula (C4) or (C5) develops. It is noted that the standard redox potential that hydrogen peroxide has when acting as a reducing agent is 0.68V, where two molecules of hydrogen peroxide react with each other to generate water and oxygen, as shown by the formula (C6).

And, by hydrogen peroxide being generated at the positive electrode, carbon employed there for supporting platinum is oxidized, with resultant consumption of carbon, whereby the performance of fuel cell is gradually lowered, accompanying a lowered activation rate of oxygen on platinum. Further, along with deterioration of platinum, generation of hydrogen peroxide increases. To this point, a composite for electrodes may have such a compound residing therein, that has a redox cycle where it acts as a reducing agent in a range of potentials lower than the redox potential of oxygen, and as an oxidizing agent in a range of potentials higher than the redox potential of hydrogen or hydrogen ion. Such a compound will act, first in a reductant type, as a reducing agent at potentials lower the standard redox potential of oxygen, so that the reaction of four-electron reduction of oxygen shown in the formula (C2) is promoted. This compound is then oxidized. After the oxidation of this compound into an oxidant type, the compound receives hydrogen ions and electrons from the positive electrode, whereby it again changes to the reductant type.

Like this, the above-noted compound repeats the redox cycle, where it reversibly acts as an oxidation-reduction catalyst. By the reversible redox cycle of the compound, this compound functions as a catalyst for the reaction of four-electron reduction, where it promotes reduction of oxygen, thus promoting a four-electron reducing reaction in which proton ($H^+$) and molecular oxygen ($O_2$) are caused to react with each other, to be reduced into water. Like this, the compound is adapted to function as a four-electron reducing reaction catalyst that promotes reduction of oxygen, allowing the composite for electrodes to have a reduced amount of platinum used there. Further, this compound acts as an oxidation-reduction catalyst by repetition of a redox cycle, and can be reused many times as a catalyst, allowing for the more reduced amount of catalyst in use.

More specifically, this compound may preferably have a standard redox potential within a range of 0.00V to 1.40V (NHE). In this case, the reduction of oxygen is promoted, and it acts as an oxidizing agent on hydrogen and hydrogen ion. More preferably, the compound should have a star redox potential within a range of 0.68V to 1.00V. It is more preferable if the oxidant as well as reductant of this compound is a relatively stable compound. It is noted that for a respretrive compound, the actual redox potential (RHE) may vary, depending various conditions, such as pH and temperature, and the selection may preferably be made within a matching range. However, in consideration of a poisoning to platinum employed in electrode, the compound to be used in the composite for electrodes according to this mode of embodiment may preferably be an organic compound composed simply of four elements, being carbon, oxygen, nitrogen, and hydrogen.

The compound may preferably comprise a compound represented by a general formula (I) below

(I)

where R1 and R2 denote arbitrary substituent groups, identical or different and X denotes an oxygen atom or a hydroxyl group. In the general formula (I), R1 and R2 may respectively be a substituent group selective from a set of alkyl groups, aryl groups, alkoxy groups, and substituent groups including a hydrogen atom, wherein for R1 and R2 being an alkyl group or alkoxy group, the alkyl group or alkoxy group may be an unsaturated alkyl group or alkoxy group or an alkyl group or alkoxyl group substituted in part by an arbitrary radical, and may be chained, ringed, or branched, and may include oxygen and nitrogen atoms, wherein for R1 and R2 being aryl groups, the aryl groups may be substituted in part by an arbitrary radical, and may include oxygen and nitrogen atoms. Further, in the general formula (I), R1 and R2 may preferably be combined with each other, to form a double bond, an aromatic ring, or a nonaromatic ring, in view of promotion of oxygen activation.

The compound may preferably comprise an imide compound represented by a general formula (II) below

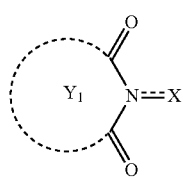

(II)

where a ring Y1 denotes any one kind of ring among 5-membered to 12-membered rings double-bonded and aromatic or nonaromatic. The composite containing the imide compound may be employed in the air electrode of fuel cell, thereby allowing promotion of oxygen activation, with an additional effect to promote oxygen reduction even at a normal temperature, under a normal pressure.

The compound may preferably comprise an imide compound represented by a general formula (III) below, in view of chemical stability and catalyst activity,

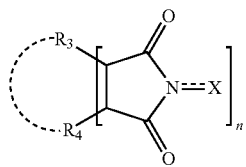

(III)

where R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or a hydroxyl group, and n denotes an integer within 1 to 3.

In the compound represented by the general formula (III), substituents R3 and R4 may include iodine, bromine, chlorine, and fluorine as halogen atoms. The alkyl groups may include those linear chain or branch chain alkyl groups which have carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. Preferable alkyl groups may have carbon numbers within a range of e.g. 1 to 6 or near, and in particular, be as lower alkyl groups as carbon numbers within a range of 1 to 4 or near.

The aryl groups may include a phenyl group, a naphthyl group, etc. The cycloalkyl groups may include a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, that have carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups which have carbon numbers of their alkoxy parts within a range of 1 to 10 or near, for example, a methoxycarbonyl, an ethoxycarbonyl a propoxy carbonyl, an isopropoxy carbonyl a butoxycarbonyl an isobutoxycarbonyl a t-butoxycarbonyl, a pentyloxy carbonyl a hexyloxy carbonyl group, and the like. Preferable alkoxycarbonyl groups may have carbon numbers of alkoxy parts within a range of 1 to 6 or near, and in particular, be as lower alkoxycarbonyl groups as carbon numbers within a range of 1 to 4 or near.

The acyl groups may include those acyl groups which have carbon numbers within a range of 1 to 6 or near, for example, a formyl an acetyl a propionyl a butyryl, an isobutyryl a valeryl an isovaleryl, a pivaloyl group, and the like.

The substituents R3 and R4 may be mutually identical or different. In the compound represented by the general formula (III), the substituents R3 and R4 may be combined with each other to form a double bond, an aromatic ring, or a nonaromatic ring. Among them, the aromatic ring or nonaromatic ring may preferably be any one kind of ring of 5-membered to 12-membered rings, or more preferably, of roughly 6-membered to 10-membered rings, and these may be heterocycles or fused heterocycles, or preferably, hydrocarbon rings.

As such rings, there may be taken, for example: nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring; and aromatic rings, such as benzene rings and naphthalene rings. Those rings may have substituent groups.

Desirable imide compounds may preferably comprise a compound represented by one of general formulas (IVa) to (IVf) below

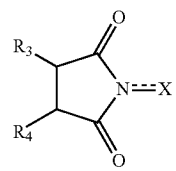

(IVa)

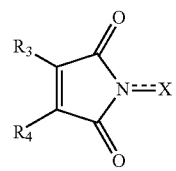

(IVb)

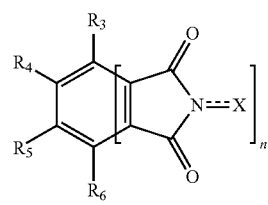

(IVc)

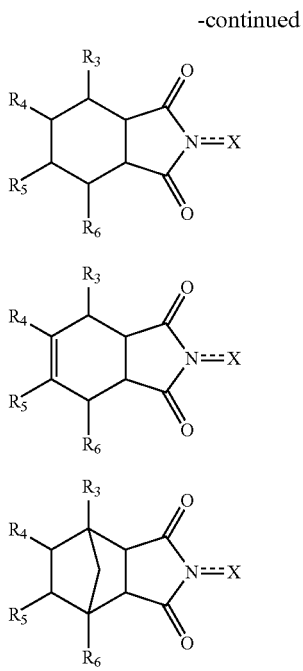

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

The substituents R3 to R6 may include as alkyl groups, like alkyl groups to the above-illustrated alkyl groups, in particular those alkyl groups which have carbon numbers within a range of 1 to 6 or near. They may include as alkoxy groups, like alkoxy groups to the before-mentioned alkoxy groups, in particular those lower alkoxy groups which have carbon numbers within a range of 1 to 4 or near, and as alkoxycarbonyl groups, like alkoxycarbonyl groups to the before-mentioned alkoxycarbonyl groups, in particular those lower alkoxycarbonyl groups whose alkoxy parts have carbon numbers within a range of 1 to 4 or near. Further, they may include as acyl groups, like acyl groups to the before-mentioned acyl groups, in particular those acyl groups which have carbon numbers within a range of 1 to 6 or near. As halogen atoms, there may be cited fluorine, chlorine, and bromine atoms. As for substituents R3 to R6, they may typically be elements of a set of hydrogen atoms, lower alkyl groups having carbon numbers within a range of 1 to 4 or near, carboxyl groups, nitro groups, and halogen atoms, in most cases.

Further, in the compound represented by the general formula (III), X denotes an oxygen atom or a hydroxyl group, and n denotes an integer within 1 to 3, preferably, 1 or 2. Further, for oxygen reduction reaction, one or two or more kinds of compounds represented by the general formula (III) may be used.

As acid anhydrides corresponding to the compound represented by the general formula (III), there may be taken saturated or unsaturated aliphatic dicarboxylic anhydrides, for example, succinic anhydride, maleic anhydride, and the like, saturated or unsaturated nonaromatic cyclic multivalent carboxylic anhydrides (aliphatic multivalent carboxylic anhydrides), for example, tetrahydrophthalic anhydride, hexahydrophthalic anhydride (1,2-cyclohexanedicarboxylic anhydride), 1,2,3,4-cyclohexanetetracarboxylic-1,2-anhydride, and the like, bridging cyclic multivalent carboxylic anhydrides (aliphatic multivalent carboxylic anhydrides), for example, anhydrous fatty acid, anhydrous himic acid, and the like, and aromatic multivalent carboxylic anhydrides, for example, phthalic anhydride, tetrabromo phthalic anhydride, tetrachloro phthalic anhydride, anhydrous nitro phthalic acid, anhydrous trimellitic acid, methylcyclohexene tricarboxylic anhydride, anhydrous pyromellitic acid, anhydrous mellitic acid, 1,8; 4,5-naphthalenetetracarboxylic dianhydride, and the like.

Further, as desirable imide compounds, there may be taken, for example, N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, N,N'-dihydroxynaphthalene tetracarboxylic acid imide, and the like. As preferable compounds there among, there may be taken aliphatic multivalent carboxylic anhydrides, and in particular, N-hydroxy imide compounds derived from aromatic aliphatic multivalent carboxylic anhydrides, for example, N-hydroxy phthalic acid imide, and the like.

Such an imide compound may be prepared by a standard imidizing reaction in which a correspondent acid anhydride reacts with hydroxylamine $NH_2OH$, whereby its acid anhydride radical has an opened ring, which is closed for imidization.

Figure 12:
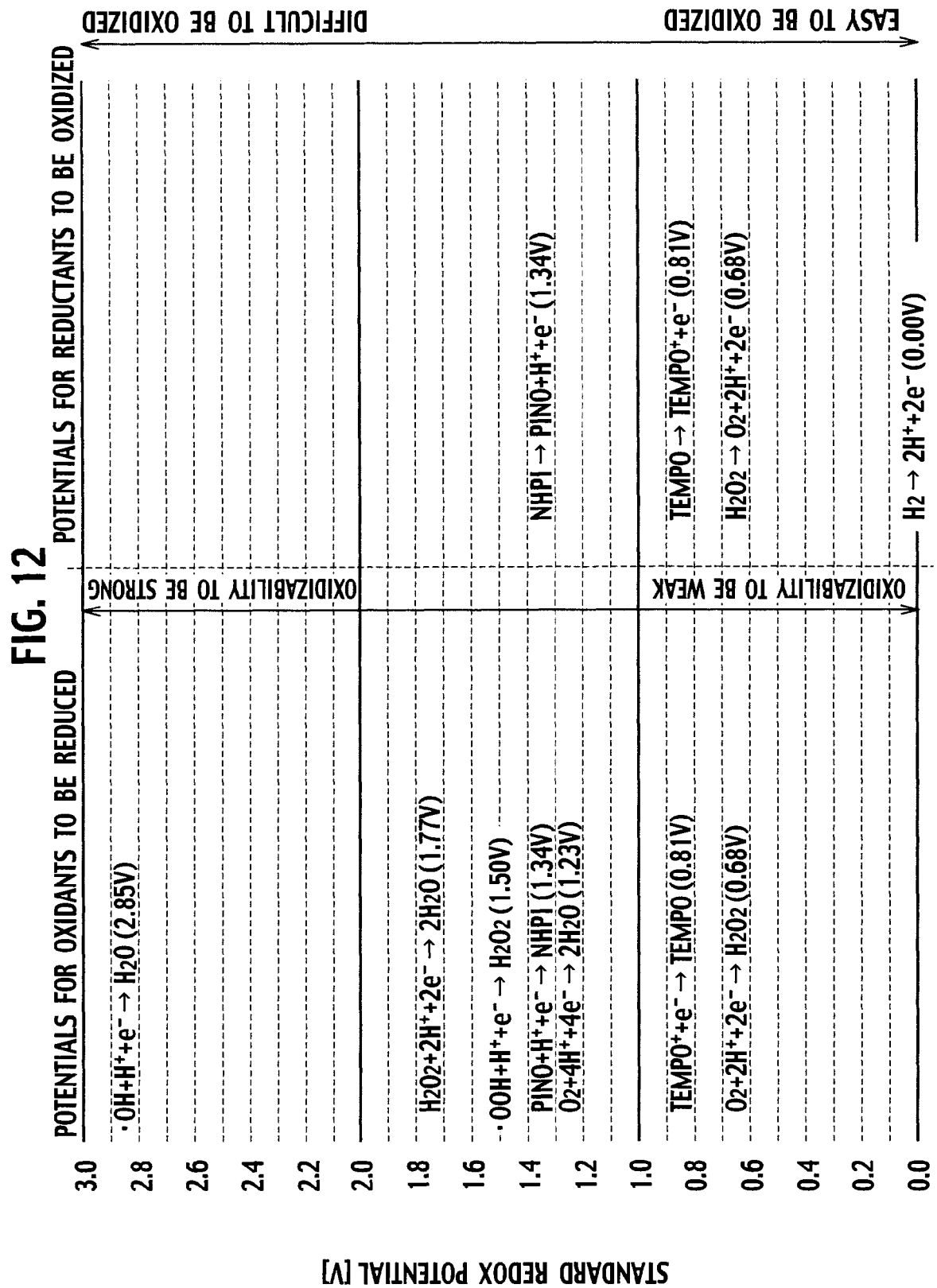
FIG. 12 is a diagram showing redox potentials of oxygen, active oxygen, hydrogen, and the like, when they act as an oxidating agent or a reducing agent.

FIG. 12 shows redox potentials (ORP: oxidation reduction potential) such as of oxygen, active oxygen, and hydrogen acting as an oxidizing agent or a reducing agent. In this figure, the right column gives oxidation half reaction formulas of reducing agents, and the left column, reduction half reaction formulas of oxidizing agents. The axis of ordinate represents a standard redox potential, which is increased as it extends upwards. That is, the difficulty of oxidation is increased, as it is located upper. The half reaction formulas are followed by parenthesized values, which are standard redox potentials of compounds acting as an oxidizing agent or a reducing agent. The oxidation reduction potential may be influenced by pH, temperature, etc., and is given, in FIG. 12, in terms of a standard redox potential corrected to the normal hydrogen electrode (NHE).

Figure 13:
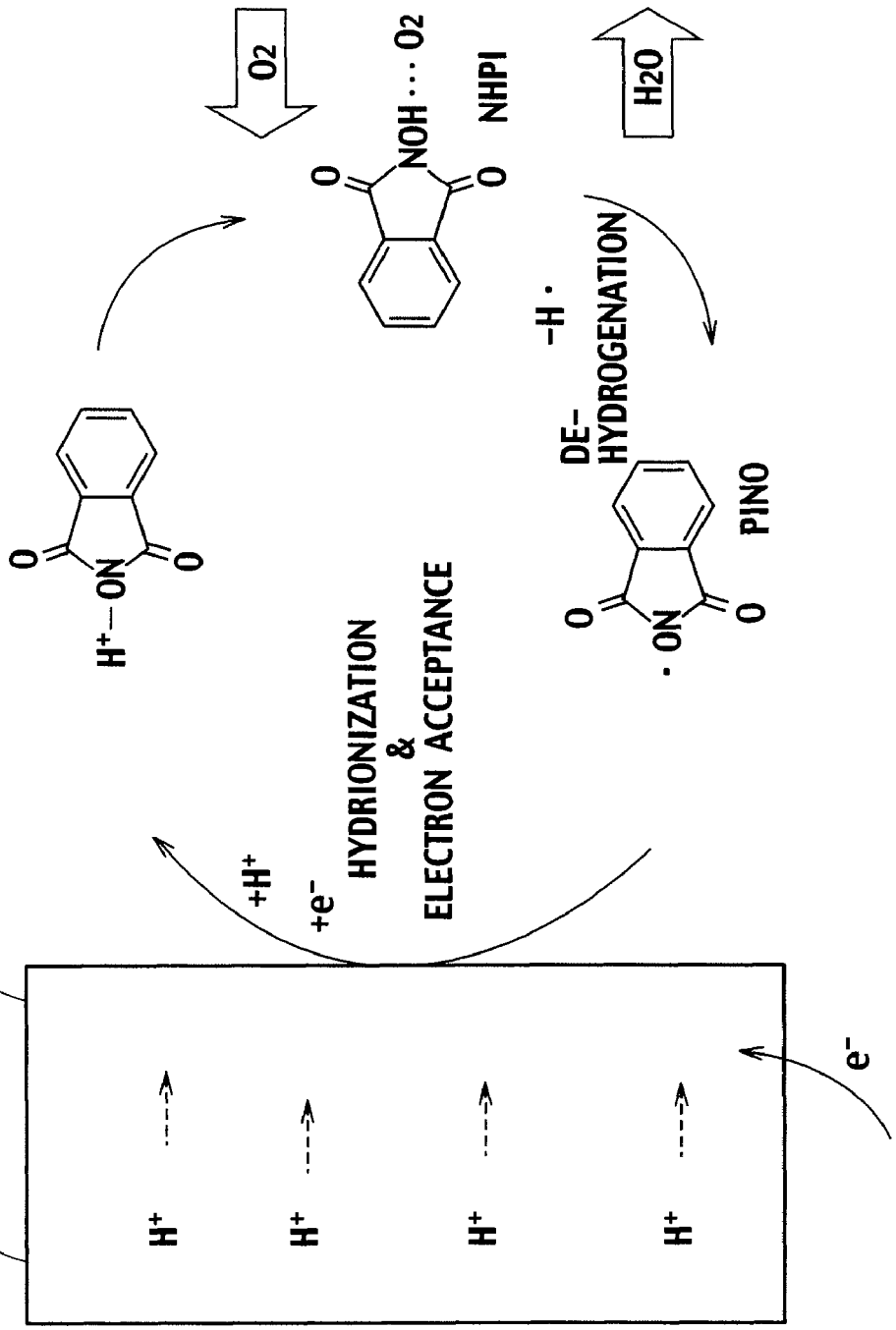
FIG. 13 is a diagram illustrating a redox mechanism of NHPI at a positive electrode of the fuel cell.

FIG. 13 shows a redox mechanism of a compound contained in the composite for electrodes according to this mode of embodiment. As a typical example of the compound, there is taken N-hydroxyphthalimide (abbreviated as NHPI), illustrating the activation mechanism of oxygen, reduction mechanism of oxygen, and reactions with proton. NHPI becomes PINO (phthalimide N-oxyl) when oxidized NHPI and PINO have a redox potential of 1.34V, as shown by formulas (C8) and (C9) below.

$$NHPI \rightarrow PINO + H^+ + e^-, E^O = 1.34V \qquad (C8)$$

$$PINO + H^+ + e^- \rightarrow NHPI, E^O = 1.34V \qquad (C9)$$

The reaction shown in the formula (C2) is a complex reaction composed of a plurality of elementary reactions shown by formulas (C10) to (C14) below.

$$NHPI + O_2 \rightarrow PINO + \cdot OOH \qquad (C10)$$

$$NHPI + \cdot OOH \rightarrow PINO + H_2O_2 \qquad (C11)$$

NHPI+H$_2$O$_2$→PINO+H$_2$O+.OH  (C12)

NHPI+.OH→PINO+H$_2$O  (C13)

4PINO+4H$^+$+4$e^-$→4NHPI  (C14)

Oxygen in the air is a triplet radical molecule in the ground state, calcd triplet oxygen, which draws out hydrogen from N-hydroxyl group of NHPI with ease at a normal temperature under normal pressure, generating PINO and peroxy radical (.OOH), as shown by the formula (C10). Peroxy radical has a high reduction potential of 1.50 V, as a species more active than oxygen, so that it draws out hydrogen from other NHPI, as shown by the formula (C11).

Further, as shown by a formula (C15) below, peroxy radical becomes hydrogen peroxide.

.OOH+H$^+$+$e^-$→H$_2$O$_2$, E$^O$=1.50V  (C15)

Though not being radical, hydrogen peroxide is reactive, and has a high reduction potential of 1.77V, as a species more active than oxygen, so that it draws out hydrogen from other NHPI, as shown by the formula (C12). Having drawn out hydrogen, hydrogen peroxide generates water and hydroxyl radical (OH) as shown by a formula (C16) below.

H$_2$O$_2$+H$^+$+$e^-$→H$_2$O+.OH  (C16)

This hydroxyl radical has a great reduction potential of 2.85V, as a very active species, so that it draws out hydrogen from NHPI, generating PINO and water, as shown by the formula (C13). By elementary reactions of formulas (C10) to (C13), a four-electron reduction of oxygen develops, which generates four PINO molecules. PINO also is an active species, and receives an electron (e) together with proton from the positive electrode of fuel cell, whereby NHPI is recovered, as shown by the formula (C14).

Figure 14:
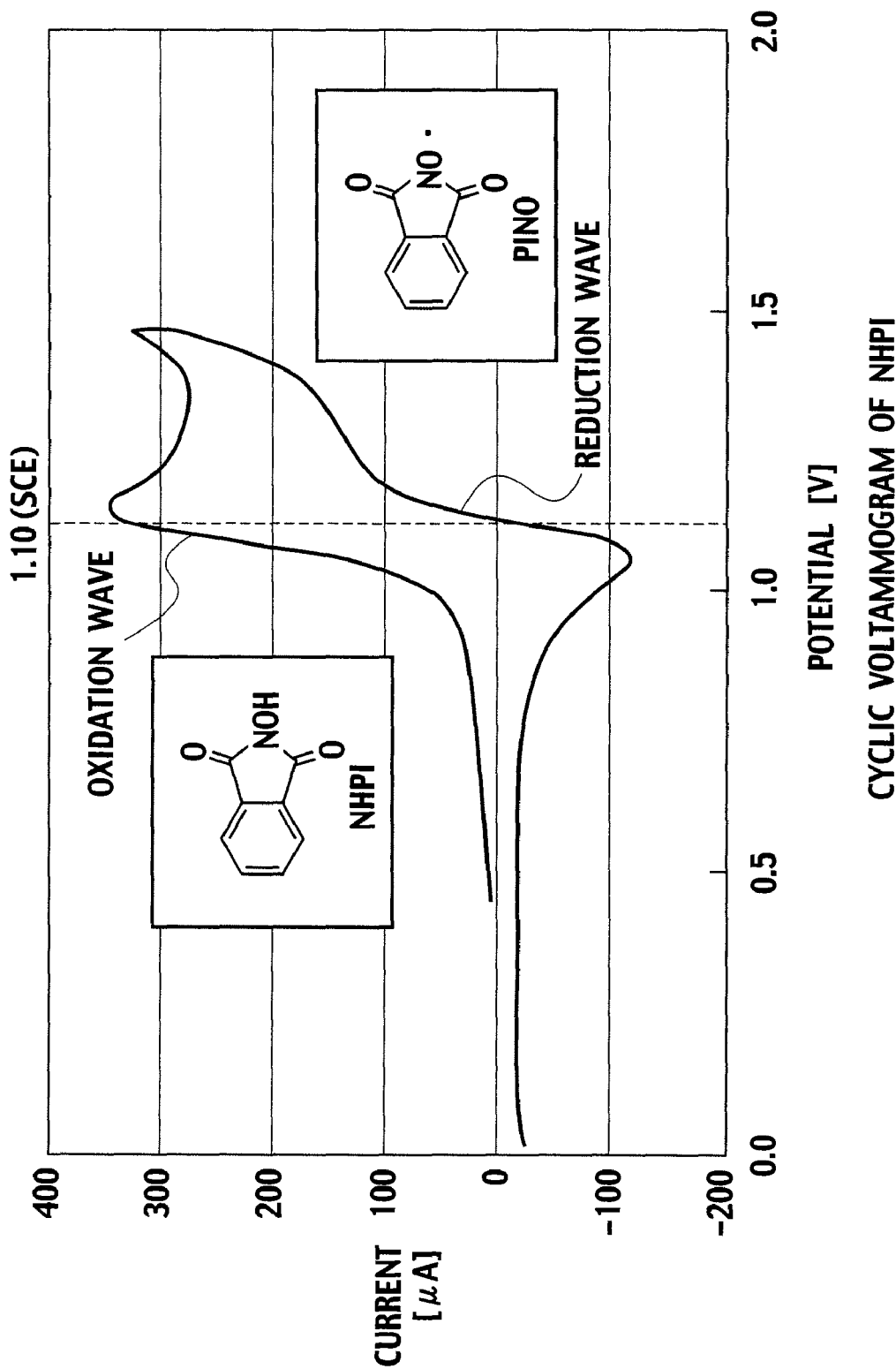
FIG. 14 is a cyclic voltammogram in electrode reactions of NHPI.

For reference use, redox potential of NHPI was measured by using glassy carbon as an acting electrode, platinum as a counter electrode, a saturated calomel electrode (SCE) as a reference electrode, and 1M sulfuric acid as an electrolytic solution. FIG. 14 shows a cyclic voltammogram of NHPI measured under such the condition. Under this condition (SCE), NHPI had a redox potential about 1.10V, which however was corrected for conversion to a standard potential E$^O$ (NHE) by an expression shown in a formula (C17) below, to be consistent with redox potentials of other substances in FIG. 12, as well as with claims and description.

E$^O$(NHE)=E$^O$(SCE)+024V  (C17)

After the correction to NHE, NHPI has a redox potential about 1.34V. This redox potential of NHPI is somewhat higher than the redox potential of oxygen, but yet has a sufficient level to act as a reducing agent on oxygen. Therefore, NHPI is adapted as a compound to reversibly act as an oxidizing agent or a reducing agent, and has a redox cycle, where it can act as an oxidizing agent at potentials higher than the redox potential of hydrogen or hydrogen ion. Like this, NHPI has the function of a four-electron reduction of oxygen with respect to the potential, as well so that NHPI can have a sustained function as a catalyst for reduction of oxygen over a long term. The reaction of four electron reduction of oxygen by NHPI is a reaction to develop at a normal temperature under a normal pressure, with a superior low temperature activity to platinum, thus allowing for a reduced amount of platinum in use as an electrode catalyst of fuel cell.

Further, the compound represented by the general formula (II) may comprise a compound represented by a general formula (V) below that has an N-substituent cyclic imide frame,

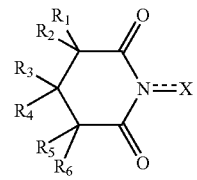

(V)

where X denotes an oxygen atom or a hydroxyl group. R1 to R6 respectively denote elements of a set of hydrogen atoms, alkyl groups, aryl groups, cycloalkyl groups, hydroxyl groups, alkoxy groups, carboxyl groups, substituent oxycarbonyl groups, acyl groups, or acyloxy groups, mutually identical or different. At least two of R1 to R6 may be combined with each other to form a double bond, or an aromatic or nonaromatic ring. At least one of the rings may comprises an N-substituent cyclic imide group. In the N-substitution cyclic imide frame, both 5-membered ring and 6-membered ring are hydrolyzable as shown by formulas (C18) and (C19) below, while the 6-membered ring is slower in hydrolysis, and higher in hydrolysis resistance, than the 5-membered ring.

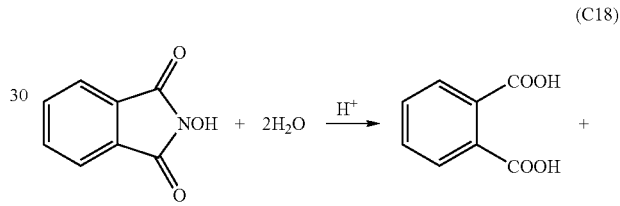

(C18)

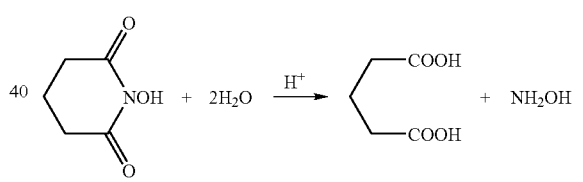

(C19)

Therefore, if the compound having the N-substitution cyclic imide frame is a cyclic imide of a 6-membered ring, this can be reused many times as a redox catalyst, thus allowing the consumption of catalyst to be the more reduced.

The alkyl groups may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The aryl groups may include a phenyl group, a naphthyl group, etc., and the cycloalkyl groups may include a cyclopentyl, a cyclohexyl, and a cyclooctyl group, and the like. The alkoxy groups may include, for example, a methoxy, an ethoxy, a propoxy, an isopropoxy, a butoxy, an isobutoxy, a t-butoxy, a pentyloxy, and a hexyloxy group, and the like, having carbon numbers within a range of 1 to 10 or near, preferably, within a range of 1 to 6 or near, or more preferably, be as lower alkoxy groups as carbon numbers within a range of 1 to 4 or near.

The alkoxycarbonyl groups may include those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of their alkoxy parts within a range of 1 to 6 or near, or more preferably, be as lower alkoxycarbonyl groups as carbon numbers within a range of 1 to 4 or near.

The acyl groups may include those acyl groups which have carbon numbers within a range of 1 to 6 or near, for example, a formyl, an acetyl, a propionyl, a butyryl, an isobutyryl, a valeryl, an isovaleryl, and a pivaloyl group, and the like.

Further, in the compound represented by the general formula (V), at least two of R1 to R6 may preferably be combined with each other to form a double bond, or an aromatic or nonaromatic ring. Among them, the aromatic ring or the nonaromatic ring may preferably be any one kind of ring of 5-membered to 12-membered rings, or more preferably, about 6-membered to 10-membered rings, while the ring may be heterocycles or fused heterocycles. As such rings, there may be taken, for example, nonaromatic hydrocarbon rings, such as cycloalkane rings, e.g, cyclohexane ring, and cycloalkene rings, e.g. cyclohexene ring; nonaromatic bridging rings, such as bridging type hydrocarbon rings, e.g. five-norbornene ring, and aromatic rings, such as benzene rings and naphthalene rings. It is noted that those rings may have a substituent group.

Figure 15:
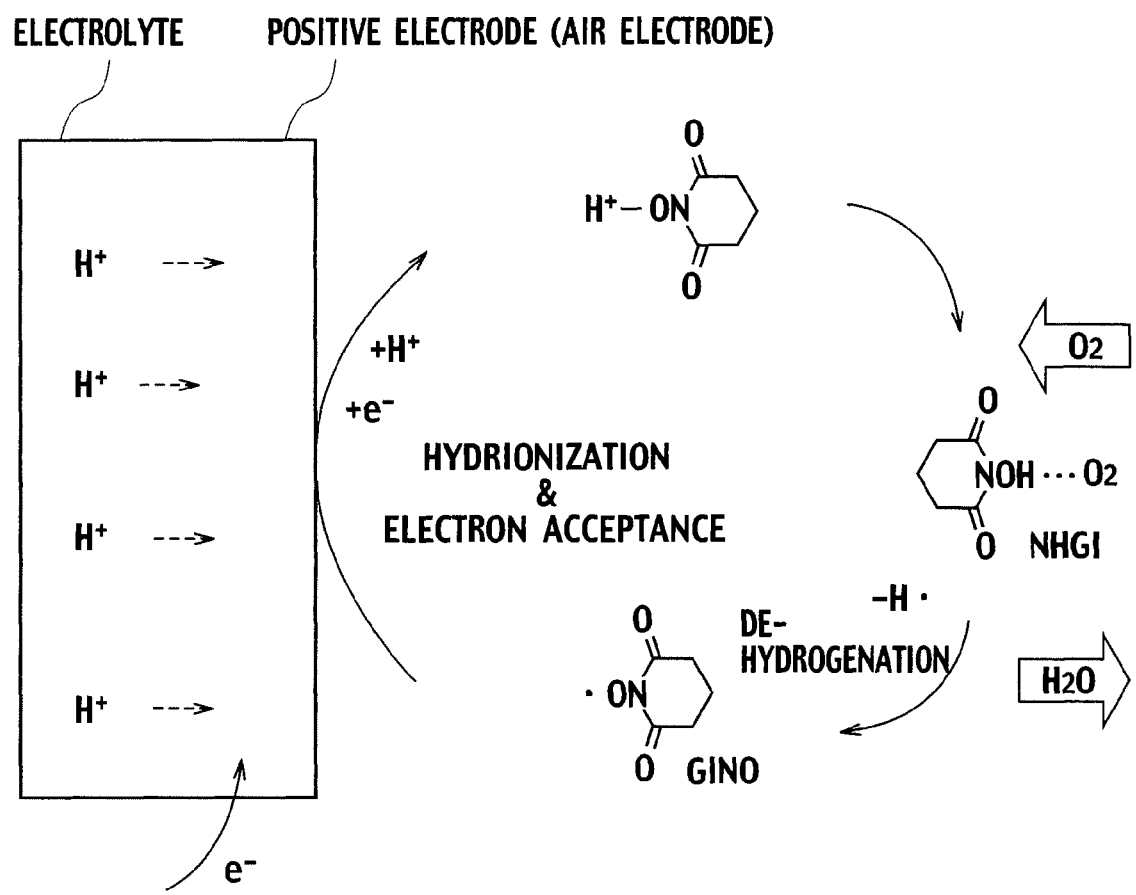
FIG. 15 is a diagram illustrating a redox mechanism of NHGI at a positive electrode of the fuel cell.

Next, FIG. 15 shows a redox mechanism of another compound contained in the composite for electrodes according to this mode of embodiment. As a typical example of the compound represented by the general formula (V), there is taken N-hydroxyglutaric acid imide (NHGI) of which R1 to R6 are all hydrogen atoms and which has a reversible redox cycle, illustrating the activation mechanism of oxygen, reduction mechanism of oxygen, and reactions with proton. NHGI becomes GINO (glutaric acid imide N-oxyl) when oxidized NHGI and GINO have a redox potential of 1.39V, as shown by formulas (C20) and (C21) below.

$$NHGI \rightarrow GINO + H^+ + e^-, E^O = 1.39V \quad (C8)$$

$$GINO + H^+ + e^- \rightarrow NHGI, E^O = 1.39V \quad (C9)$$

The reaction shown in the formula (C2) is a complex reaction composed of a plurality of elementary processes shown by formulas (C22) to (C26) below.

$$NHGI + O_2 \rightarrow GINO + .OOH \quad (C22)$$

$$NHGI + .OOH \rightarrow GINO + H_2O_2 \quad (C23)$$

$$NHGI + H_2O_2 \rightarrow GINO + H_2O + .OH \quad (C24)$$

$$NHGI + .OH \rightarrow GINO + H_2O \quad (C25)$$

$$4PINO + 4H^+ + 4e^- \rightarrow 4GINO \quad (C26)$$

Oxygen in the air is a triplet radical molecule in the ground state, called triplet oxygen, which draws out hydrogen from N-hydroxyl group of NHGI with ease at a normal temperature under normal pressure, generating GINO and peroxy radical (.OOH), as shown by the formula (C22). Peroxy radical has a high reduction potential of 1.50 V, as a species more active than oxygen, so that it draws out hydrogen from other NHGI, as shown by the formula (C23).

Further, as shown by a formula (C27) below, peroxy radical becomes hydrogen peroxide.

$$.OOH + H^+ + e^- \rightarrow H_2O_2, E^O = 1.50V \quad (C27)$$

Though not being radical, hydrogen peroxide is reactive, and has a high reduction potential of 1.77V, as a species more active than oxygen, so that it draws out hydrogen from other NHGI, as shown by the formula (C24). Having drawn out hydrogen, hydrogen peroxide generates water and hydroxyl radical (.OH) as shown by a formula (C28) below.

$$H_2O_2 + H^+ + e^- \rightarrow H_2O + .OH \quad (C28)$$

This hydroxyl radical has a great reduction potential of 2.85V, as a very active species, so that it draws out hydrogen from NHGI, general GINO and water, as shown by the formula (C22). By elementary reactions of formulas (C22) to (C25), the four-electron reduction of oxygen develops, generating four GINO molecules. GINO also is an active species, and receives an electron (e⁻) together with proton from the positive electrode of fuel cell, whereby NHGI is recovered, as shown by the formula (C26).

Redox potential of NHGI measured to SCE in an aqueous solution of 1M sulfuric acid had described a cyclic voltammogram substantially similar to FIG. 14. From this result, NHGI has a redox potential about 1.15 under this condition. This gives 1.39V, when corrected to NHE. This potential is somewhat higher than the redox potential of oxygen, but yet has a sufficient level to act as a reducing agent, which means NHGI is a compound that reversibly functions as an oxidizing agent or a reducing agent, and that has a redox cycle where it acts as an oxidizing agent at potentials higher than the redox potential of hydrogen or hydrogen ion. Like this, NHGI has the function of a four-electron reduction of oxygen with respect to the potential, as well, and NHGI can have a sustained function as a catalyst for reduction of oxygen over a long term. The reaction of four-electron reduction of oxygen is a reaction to develop at a normal temperature under a normal pressure, exhibiting a superior low temperature activity to platinum, thus allowing for a reduced amount of platinum in use as an electrode catalyst of fuel cell. NHGI is a cyclic imide of 6-membered ring, which is slower in hydrolysis, and higher in hydrolysis resistance, in comparison with 5-membered ring. Therefore, if the compound having the N-substitution cyclic imide frame is a cyclic imide of a 6-membered ring, this can be reused many times as a redox catalyst, thus allowing the consumption of catalyst to be.

In view in particular of the compound's stability, durability, and the like, the compound represented by the general formula (V) may preferably comprise a compound represented by one of general formulas (VIa) and (VIb) below

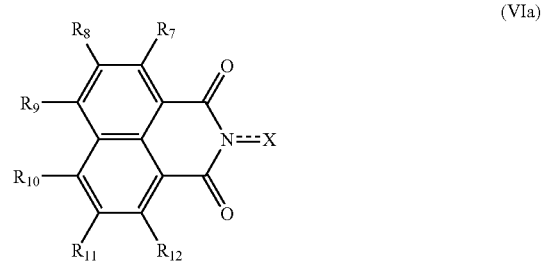

(VIa)

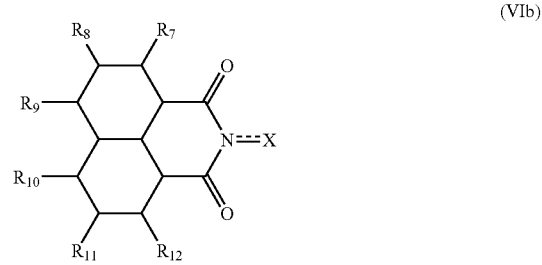

(VIb)

where R7 to R12 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

Further, the compound represented by one of the general formulas (V), (VIa) and (VIb) may preferably comprise at least one kind of imide compound (6-membered imide ring) selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8;4,5-naphthalene tetracarboxylic acid imide, N,N'-dihydroxy-1,8; 4,5-decalin tetracarboxylic acid imide, and N, N',N" trihydroxy isocyanuric acid imide.

The compound represented by the general formula (I) may comprise a compound represented by a general formula (VII) below

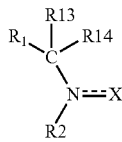

(VII)

where R13 and R14 each respectively denote an alkyl group, or an alkyl group substituted in part by an arbitrary radical, wherein R13 and R14 may be chained, ringed, or branched. R13 and R14 may be mutually combined to form a ring, and may include oxygen and nitrogen atoms. The compound represented by the general formula (VII) may be used to have a reduced redox potential for the more promoted reduction of oxygen. In the compound represented by the general formula (VII), substituents R13 and R14 may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VII) may preferably comprise a compound represented by a general formula (VIII) below

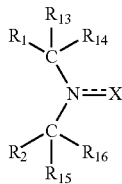

(VIII)

where R13 to R16 each respectively denote an alkyl group, or an alkyl group substituted in part by an arbitrary radical, wherein R13 to R16 may be chained, ringed, or branched. Among them, R13 and R14, or R15 and R16 may be mutually combined to form a ring, and they may include oxygen and nitrogen atoms. In the compound represented by the general formula (VIII), substituents R13 to R16 may include linear chain or branch chain alkyl groups of carbon numbers within a range of 1 to 10 or near, for example, a methyl, an ethyl, a propyl, an isopropyl, a butyl, an isobutyl, a sec-butyl, a t-butyl, a pentyl, a hexyl, a heptyl, an octyl, and a decyl group, and the like. They may preferably have carbon numbers within a range of 1 to 6 or near, or more preferably, be as lower alkyl groups as carbon numbers within a range of 1 to 4 or near.

The compound represented by the general formula (VIII) may preferably comprise a compound represented by a general formula (IX) below

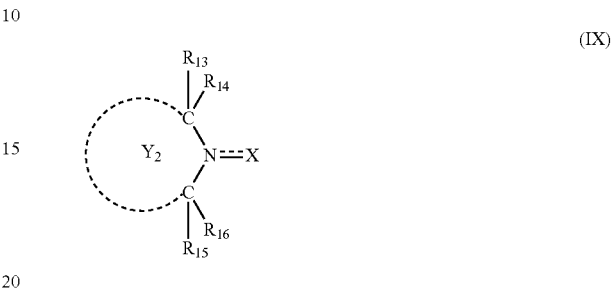

(IX)

where a ring Y2 denotes a 5-membered or 6-membered ring formed by R13 and R14 mutually combined. As such rings, there may be taken, for example, nonaromatic hydrocarbon rings, such as cycloalkane rings, e.g, cyclohexane ring, and cycloalkene rings, e.g. cyclohexene ring, nonaromatic bridging rings, such as bridging type hydrocarbon rings, e.g. five-norbornene ring, and aromatic rings, such as benzene rings and naphthalene rings. It is noted that those rings may have a substituent group.

Further, the compound represented by the general formula (IX) may preferably comprise a compound represented by a general formula (X) below

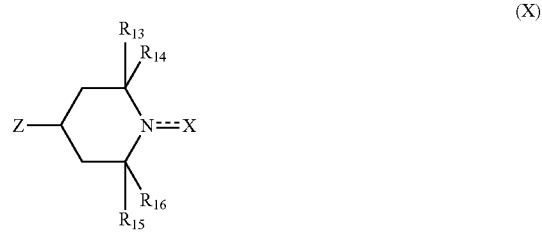

(X)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part and may include oxygen and nitrogen atoms. For Z being an aryl group, the aryl group may be substituted in part by an arbitrary radical, and may include oxygen and nitrogen atoms. The compound represented by the general formula (X) is hardly hydrolyzable, and may be used as a redox catalyst over a long term, allowing for a reduced amount of catalyst in use.

For substituent Z in the compound represented by the general formula (X), there may be taken alkyl groups, in particular those of like alkyl groups to the before-mentioned alkyl groups, which have carbon numbers within a range of 1 to 6 or near, while as aryl groups, there may be taken phenyl groups and naphthyl groups. There may be taken alkoxy groups, in particular those of like alkoxy groups to the before-mentioned alkoxy groups, which have carbon numbers within a range of 1 to 6 or near, and as carboxyl groups, those carboxyl groups which have carbon numbers within a range of 1 to 4 or near, for example. As alkoxycarbonyl groups, there may be taken those alkoxycarbonyl groups whose alkoxy parts have carbon numbers within a range of 1 to 10 or near, for example, a methoxycarbonyl, an ethoxycarbonyl, a propoxy carbonyl, an isopropoxy carbonyl, a butoxycarbonyl, an isobutoxycarbonyl, a t-butoxycarbonyl, a pentyloxy carbonyl, and a hexyloxy carbonyl group, and the like. They may preferably have carbon numbers of alkoxy parts within a range 1 to 6 or near, or more preferably, be as lower alkoxycarbonyl groups as carbon numbers within a range of 1 to 4 or near.

As an example of compound represented by the general formula (X), there is now taken TEMPO (2,2,6,6-tetramethylpiperidine-1-oxyl). FIG. 7 shows chemical formulas of examples of compounds represented by the general formula (X), with TEMPO inclusive. FIG. 7(*i*) shows TEMPO as a compound having a reversible redox-cycle, which finally inactivates active oxygen.

The compound represented by the general formula (IX) may comprise a compound represented by a general formula (XI) below

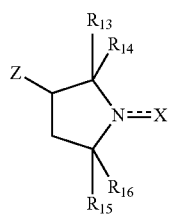

(XI)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in part, and may include oxygen and nitrogen atoms. For Z being an aryl group, the aryl group may be substituted in part by an arbitrary radical, and may include oxygen and nitrogen atoms.

The compound represent by the general formula (IX) may comprise a compound represented by a general formula (XII) below

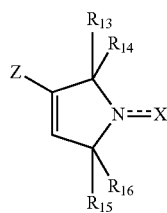

(XII)

where Z denotes a kind of substituent selective from a set of alkyl groups, aryl groups, alkoxy groups, carboxyl groups, alkoxycarbonyl groups, cyano groups, hydroxyl groups, nitro groups, amino groups, and substituent groups including a hydrogen atom. For Z being an alkyl group, the an alkyl group may be substituted in part by an arbitrary radical, may be chained, ringed, or branched in park and may include oxygen and nitrogen atoms. For Z being an aryl group, the aryl group may be substituted in part by an arbitrary radical, and may include oxygen and nitrogen atoms. Also these compounds are hardly hydrolysable like that represented by the general formula (X), and may be used as a redox catalyst over a long term, allowing for a reduced amount of catalyst in use. For compounds represented by the general formula (XI) or (XII), the substituents to be employed may be like to the compound represented by the general formula (X).

Examples of compounds represented by the general formula (XI) or (XII) are shown in FIG. 8 to FIG. 10. As examples of compounds represented by the general formula (XI) or (XII), PROXYL (2,2,5,5-tetramethylpyrrolidine-1-oxyl) and DOXYL (4,4-dimethyloxazolidine-3-oxyl) are now cited. These compounds also have a reversible redox cycle, and can serve for inactivation of active oxygen.

Figure 16:
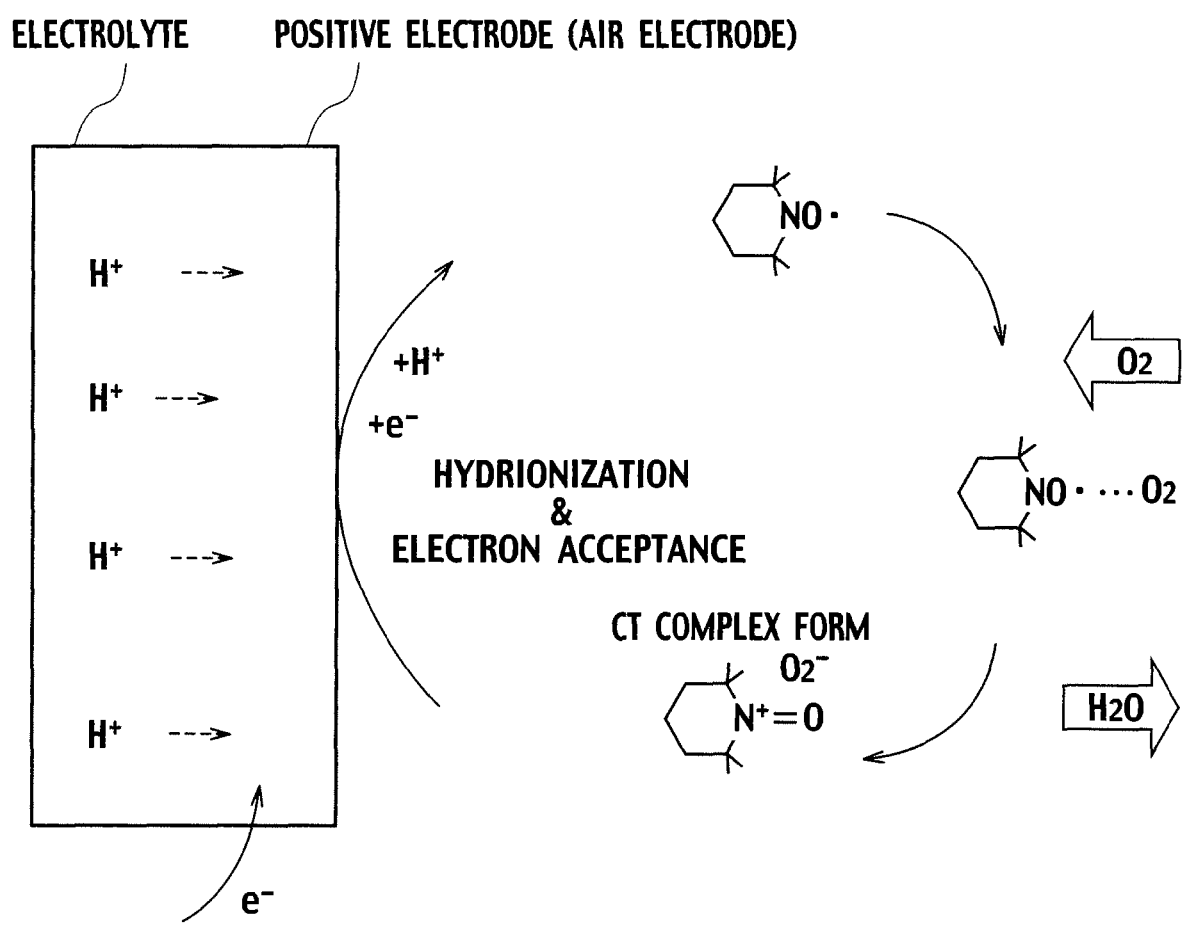
FIG. 16 is a diagram illustrating a redox mechanism of TEMPO at a positive electrode of the fuel cell.

FIG. 16 shows a mechanism of oxidation and reduction by another example of compound contained in the composite for electrodes according to this mode of embodiment. As a typical example of the compound, TEMPO is now taken, illustrating the activation mechanism of oxygen and reduction mechanism of oxygen. TEMPO performs oxidation and reduction through elementary reactions shown by formulas (C29) and (C30) below, its redox potential being 0.81V.

$$TEMPO \rightarrow TEMPO^+ + e^-, E^O = 0.81\ V \tag{C29}$$

$$TEMPO^+ + e^- \rightarrow TEMPO, E^O = 0.81\ V \tag{C30}$$

The redox mechanism is a complex reaction composed of a plurality of elementary reactions shown by formulas (C31) to (C36) below.

$$TEMPO + O_2 \rightarrow TEMPO^+ + O_2^- \tag{C31}$$

$$O_2^- + H^+ \rightarrow HOO. \tag{C32}$$

$$TEMPO^+.OOH + H^+ \rightarrow TEMPO^+ + H_2O_2 \tag{C33}$$

$$TEMPO + H_2O_2 + H^+ \rightarrow TEMPO^+ + H2O + .OH \tag{C34}$$

$$TEMPO + .OH + H^+ \rightarrow TEMPO^+ + H2 \tag{C35}$$

$$4TEMPO^+ + 4e^- \rightarrow 4TEMPO \tag{C36}$$

Oxygen in the air is a triplet radical molecule in the ground state, called triplet oxygen, which cooperates with TEMPO for transfer of electron therebetween at a normal temperature under normal pressure, as shown by the formula (C31), to form a CT (charge transfer) complex. At this time, nitrogen atom of TEMPO being quatermized to $N^+$, TEMPO becomes $TEMPO^+$, while oxygen is activated in the form of super-oxide ($O2^-$). Active super-oxide immediately reacts to hydrogen ion, generating peroxy radical (.OOH). Peroxy radical has a high reduction potential of 1.50V, as a species more active than oxygen, which generates hydrogen peroxide through a reaction shown by the formula (C33). Though not being radical, hydrogen peroxide is yet active under presence of catalyst, and has a high reduction potential of 1.77V, as a species more active than oxygen, which receives electron from another TEMPO, and generates water and hydroxyl radical (.OH), as shown by the formula (C34). This TEMPO is activated to $TEMPO^+$.

Hydroxyl radical thus generated has a great reduction potential of 2.85V, as a very active species, so that it receives electron from another TEMPO, generating water, as shown by the formula (C35). By elementary reactions of formulas (C31) to (C35), a four-electron reduction of oxygen develops, which generates four TEMPO molecules. $TEMPO^+$ also is an active species, which receives an electron ($e^-$) from the positive electrode of fuel cell, whereby TEMPO is recovered, as shown by the formula (C36).

Figure 17:
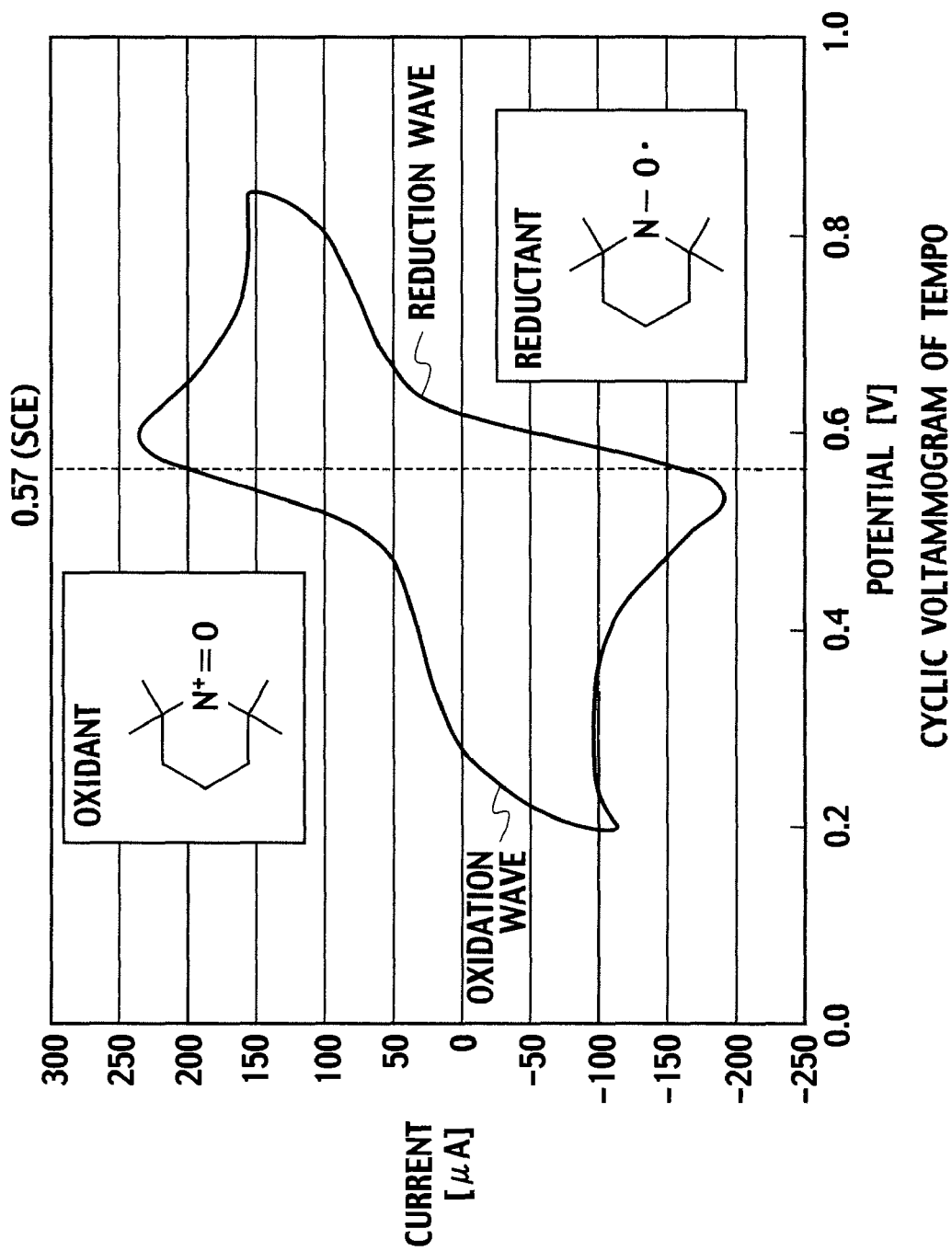
FIG. 17 is a cyclic voltammogram in electrode reactions of TEMPO.

Redox potential of TEMPO measured to SCE in an aqueous solution of 1M sulfuric acid had described a cyclic voltammogram, which is shown in FIG. 17. TEMPO has a redox potential about 0.57V under this condition (SCE). This (SCE) gives a redox potential of 0.81V, when corrected to NHE. Judging from this potential, TEMPO has a redox potential lower than the redox potential of oxygen, that is a sufficient level to act as a reducing agent, which means TEMPO is a compound that reversibly functions as an oxidizing agent or a reducing agent, and that has a redox cycle where it acts as an oxidizing agent at potentials higher than the redox potential of hydrogen or hydrogen ion. Like this, TEMPO has the function of a four-electron reduction of oxygen with respect to the potential, as well, and TEMPO can have a sustained function as a catalyst for reduction of oxygen over a long term. The reaction of four-electron reduction of oxygen is a reaction to develop at a normal temperature under a normal pressure, exhibiting a superior low temperature activity to platinum, thus allowing for a reduced amount of platinum in use as an electrode catalyst of fuel cell. Further, TEMPO is not hydrolyzable, and can be used over a long term, in the use as a redox catalyst, thus allowing consumption of catalyst to be the more reduced.

For addition of the above-noted compound as a redox catalyst, the amount of addition may preferably be controlled within a range of 0.001 to 30 wt % in concentration of catalyst for reduction of oxygen in platinum-supporting carbon in the membrane formed as a film after the drying process. In a range under 0.001 wt %, the effect of oxygen reduction catalyst may be unsuccessfully exhibited. In a range over 30 wt %, considerations may be accompanied, such as to a reduced performance of power generation due to catalyst poisoning, reduced ion mobility, influences on variation in strength of membrane, induction of new side reactions, etc. which is undesirable. In the case of addition, the compound should be uniformly dispersed in platinum-supporting carbon, as an important point. To this point, as a solvent for dispersion of compound, there may be used water or organic solvent, or a mixed solution of water and organic solvent, if the compound has an increased solubility to the solvent.

Although the compounds described can exhibit a sufficient function as an oxygen reduction catalyst, even when used solely, they may have an auxiliary catalyst concurrently used for assistance to transfer of electrons relative to any electrode else, as necessary, such as for reaction rate to be increased. As a corresponding material, there may be taken for use at least one kind or combination of two or more kinds selective from a set of elements selected from among lanthanoids, V (vanadium), Mo (molybdenum), W (tungsten), Fe (iron), Ru (ruthenium), Co (cobalt), Rh (rhodium), Ni (nickel), Cu (copper), Ag (silver), Ir (iridium), Pd (palladium), Pt (platinum), and Au (gold), and oxides, organic acid salts, inorganic acid salts, halides, complexes, heteropolyacids, and heteropolyacid salts including such an element.

The composite for electrodes according to a mode of embodiment of the invention may be implemented by supporting the compound by a carrier. In application as an electrode for fuel cells, there may preferably be employed as the carrier, an electrically conductive carbon black, such as acetylene black, or a nanostructure carbon typified by a carbon nanotube. As a facile method for impregnation to the carrier, a solution in which the above-noted compound is dissolved in a solvent may be inpoured to the carrier, for adsorption of catalyst onto carbon, and thereafter, the carbon may be filtered and dried.

Like this, according to the mode of embodiment of the invention, a composite for electrodes contains as an oxidation-reduction catalyst a compound having a redox cycle, where it acts as a reducing agent in a range of potentials lower than a redox potential of oxygen and as an oxidizing agent in a range of potentials higher than a redox potential of hydrogen or hydrogen ion, whereby the compound acts as a reducing agent in the range of potentials lower than the redox potential of oxygen, and after being oxidized, it reversibly acts as an oxidizing agent in the range of potentials higher than the redox potential of hydrogen or hydrogen ion. At this occasion, a four-electron reduction reaction is promoted, in which proton ($H^+$) and molecular oxygen ($O_2$) are reacted to each other, and reduced to water. Like this, the compound functions as a catalyst for four-electron reduction reaction, which promotes reduction of oxygen, so that the amount of platinum used in the composite for electrodes can be reduced. Further, by repetition of the redox cycle, the compound is adapted to act as a redox catalyst, and can be reused many times as a catalyst, allowing the amount of catalyst in use to be the more reduced.

It is noted that for an electrode containing a composite for electrodes according to the mode of embodiment of the invention, the amount of platinum in use can be reduced. A composite for air electrodes having a composite for electrodes according to the mode of embodiment of the invention, or an air electrode having a composite for air electrodes according to the invention can be used as an air electrode for fuel cells. In this case, the reaction between proton and oxygen is promoted even in electrode reaction at the air electrode, thus allowing the amount of use of platinum to be reduced.

In the fuel cell provided with such an electrode, the amount of use of platinum can be reduced. This fuel cell is employable for a fuel cell system using a high-polymer electrolyte membrane of a proton exchange type, and may have applications not limited to a fuel cell vehicle, and is applicable, for example, to a fuel cell cogeneration power generating system, a fuel cell home electric appliance, a fuel cell portable device, a fuel cell transport machine, and the like.

EXAMPLES

Description will be made of fuel cell systems according to examples 1 to 12 of embodiment of the invention and comparative examples 1 and 2, while the scope of the invention is not limited thereto. Those examples exemplify fuel cell systems using different antioxidants, examining their effectiveness.

Sample Preparation

Example 1

A film of Nafion® 117 of Du Pont Co., 175 μm thick, was cut into 1 cm squares to be used as solid polymer electrolyte membranes. Nafion® membranes were pretreated to the NEDO PEFC R&D project standard treatment, where they were boiled: in 3% hydrogen peroxide aqueous solution for 1 hour, and in distilled water for 1 hour, then, in 1M sulfuric acid solution for 1 hour, and finally, in distilled water for 1 hour, in this order.

Next, for a facilitated ageing resistance judgment in endurance test pretreated Nafion® membranes were subjected to an ion exchange treatment, where they were soaked in 100 mM $FeSO_4$ aqueous solution for one night or more, and ultrasonically cleaned in distilled water for 15 minutes, for removing ions adhering to membrane to thereby exchange counter ions of Nafion® from $N^+$ to $Fe^{2+}$. Wako pure medicine high grade $FeSO_4.7H_2O$ was used as a reagent.

Next, platinum-supporting carbon (20 wt % Pt/Vulcan XC-72, Cabot Co.) was coated 1 mg/cm2 on both sides of each ion-exchanged electrolyte membrane to fabricate a membrane electrode assembly (MEA). Fabricated MEA was assembled in a single cell, to provide a unit cell for PEFC to be 5 cm². 70° C. humidified hydrogen gas (atmospheric pressure) as the fuel electrode side gas and 70° C. humidified oxygen gas (atmospheric pressure) as the air electrode side gas were supplied, via bubblers, to a unit cell held 70° C. As an antioxidant for inactivation of active oxygen, 1 mM NHPI aqueous solution was fed, using a liquid feed pump, by a flow rate of 1 cm³/minute to a fuel gas port. The unit cell was controlled to be held 70° C.

Example 2

Instead of NHPI aqueous solution, NHMI (N-hydro-oxy maleic acid imide) aqueous solution was used as an antioxidant for example 2, of which treatment was like to example 1.

Example 3

Instead of NHPI aqueous solution, NHSI (N-hydroxy succinic acid imide) aqueous solution was used as an antioxidant for example 3, of which treatment was like to example 1.

Example 4

Instead of NHPI aqueous solution, NHGI (N-hydroxyglutaric acid imide) aqueous solution was used as an antioxidant for example 4, of which treatment was like to example 1.

Example 5

Instead of NHPI aqueous solution, THICA (N,N',N"-trihydroxy isocyanuric acid) aqueous solution was used as an antioxidant for example 5, of which treatment was like to example 1.

Comparative Example 1

Comparative example 1 was set to the example 1, as it had no antioxidant aqueous solution fed.

In example 6 to example 11, an S-PES (sulfonated polyethersulfone) film was employed as solid polymer electrolyte membrane. As the S-PES film, procured and used was an equivalent to that described in p. 31 of "researches and developments of a durability-elevated hydrocarbon system electrolyte membrane for proton-exchange membrane fuel cells in the proton-exchange membrane fuel cell elements technology development and like program in the proton-exchange membrane fuel cell system technology project", 2002 yearly results report of the New Energy and Industrial Technology Development Organization of Japan.

Example 6

An S-PES film 170 μm thick was cut into 1 cm squares, and platinum-supporting carbon (Cabot Co. make 20 wt % Pt/Vulcan XC-72) was coated by 1 mg/cm2 on both sides of an S-PES membrane to fabricate a membrane electrode assembly (MEA). Fabricated MEA was assembled in a single cell, to provide a unit cell for PEFC, which was a 5-cm² unit cell. 70° C. humidified hydrogen gas (atmospheric pressure) as the fuel electrode side gas and 70° C. humidified oxygen gas (atmospheric pressure) as the air electrode side gas were supplied, via bubblers, to a unit cell held 70° C. As an antioxidant for inactivation of active oxygen, 1 mM TEMPO—OH aqueous solution was fed, using a liquid feed pump, by a flow rate of 1 cm³/minute to a fuel gas port. The unit cell was controlled to be held 70° C.

Example 7

Instead of TEMPO—OH aqueous solution, TEMPO—COOH (Aldrich Co.) aqueous solution was used as an antioxidant for example 7, of which treatment was like to example 6.

Example 8

Instead of TEMPO—OH aqueous solution, TEMPO (Aldrich Co.) aqueous solution was used as an antioxidant for example 8, of which treatment was like to example 6.

Example 9

Instead of TEMPO—OH aqueous solution, PROXYL-$CONH_2$ (Aldrich Co.) aqueous solution was used as an antioxidant for example 9, of which treatment was like to example 6.

Example 10

Instead of TEMPO—OH aqueous solution, PROXYL-COOH (Aldrich Co.) aqueous solution was used as an antioxidant for example 10, of which treatment was like to example 6.

Example 11

Instead of TEMPO—OH aqueous solution, 3-carbamoyl-2,2,5,5-tetramethylpyrroline-1-yloxy (Aldrich Co.) aqueous solution was used as an antioxidant for example 11, of which treatment was like to example 6.

Example 12

Instead of TEMPO—OH aqueous solution, DTBN (di-t-butylnitroxide: Aldrich Co.) aqueous solution was used as an antioxidant for example 12, of which treatment was like to example 6.

Comparative Example 2

Comparative example 2 was set to the example 6, as it had no antioxidant aqueous solution fed.

Samples of the foregoing examples were evaluated, as follows:

<Measurements of Redox Potential>

Redox potentials of the compounds employed in the examples were measured by using glassy carbon as an acting electrode, platinum as a counter electrode, a saturated calomel electrode (SCE) as a reference electrode, and 1M sulfuric acid as an electrolytic solution. Exemplary measurements of NHPI as a typical imide system compound and TEMPO as a typical TEMPO system compound are shown in FIG. 14 and FIG. 17. Graphs in FIG. 14 and FIG. 17 are corrected to standard potential $E^O$ (NHE) to be consistent with redox potentials of respective substances. Redox potential of NHPI resides near 1.10V (SCE) as shown in FIG. 14, and redox potential of TEMPO resides near 0.57V (SCE) as seen from FIG. 17. As will be seen from those potentials, NHPI and TEMPO are compounds that function as a reducing agent on hydroxy radical, and compounds that function as an oxidizing agent on hydrogen peroxide, as compounds meeting the present objective.

<Start and Stop Repeating Endurance Test>

Figure 18:
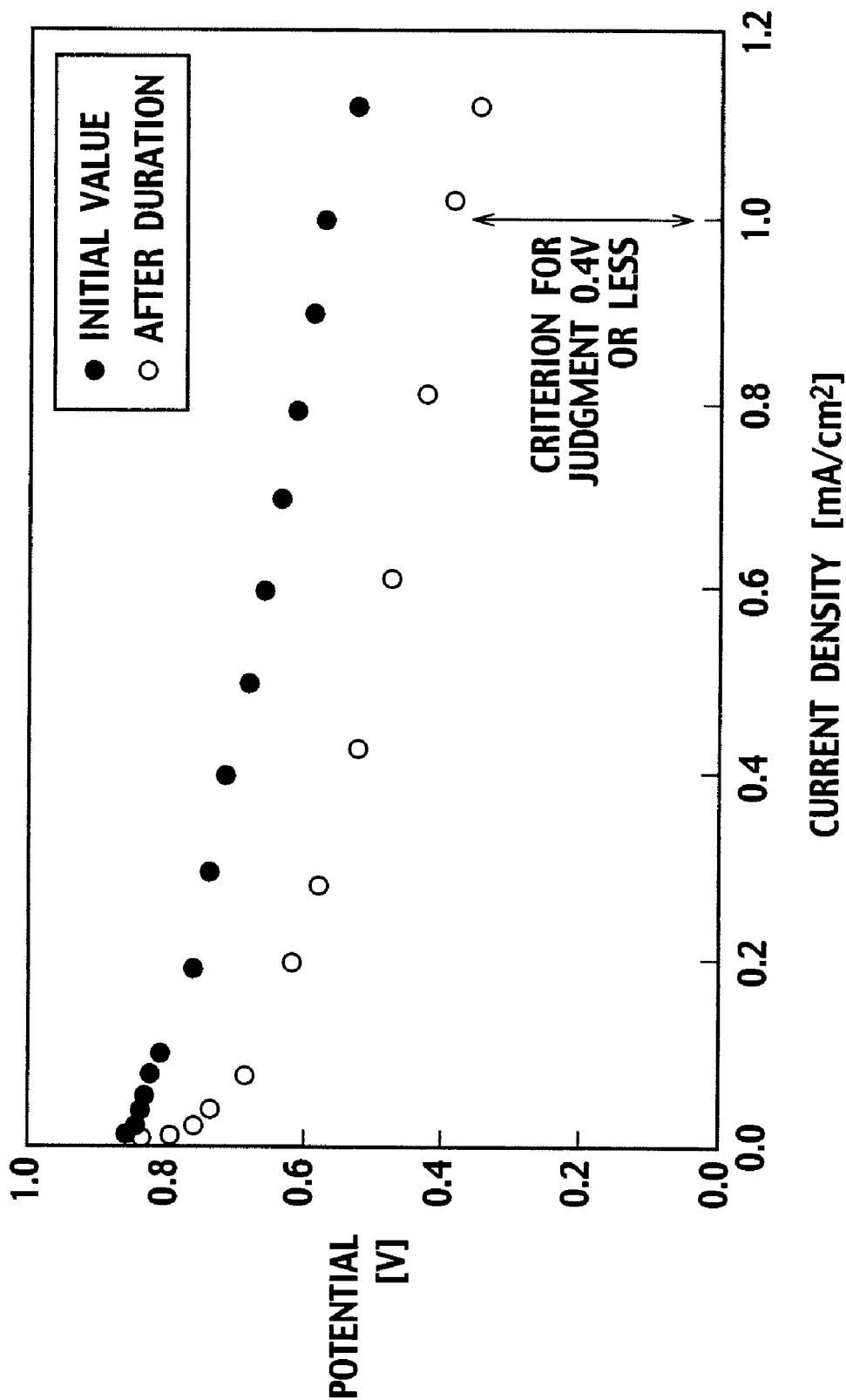
FIG. 18 is a graph showing, for unit cells of a fuel cell fabricated in an embodiment example 1, a potential vs. current curve by initial values of a start-stop repeating endurance test, and a potential vs. current curve after endurance.

An open-circuit condition was held at the fuel electrode side for 30 minutes, to start the test in the t supplying gas to the unit cell by a flow rate of 300 dm$^3$/min, the current density was increased from a discharge open-circuit condition, making discharge till the terminal voltage gets below 0.3V. Then, after the terminal voltage had got below 0.3V, an open-circuit condition was again held for 5 minutes. This operation was repeated, for comparison of the endurance performance in terms of the number of times when the voltage gets below 0.4V under a condition of power generation with a current density of 1 mA/cm$^3$. FIG. 18 shows, as an example of a start and stop repeating endurance test for a unit cell of fuel cell prepared in the example 1, a graph of initial values of current-voltage curve, and a current-voltage curve after duration. In this graph, under the condition of power generation with the current density of 1 mA/cm$^3$, the voltage gets below 0.4V at a number of times, which is referred to as start-stop repetition time number.

<Analysis of Emitted Substances at Air Electrode>

For analysis of deterioration of Nafion® membrane, measurements were made of concentrations of fluoride ions and sulfate ions emitted upon decomposition of the membrane. For S-PES membrane, concentration measurements were made of sulfate ions emitted upon membrane decomposition. For detection of transferred ions, discharged liquid from the air electrode was collected, and measured by using an ion chromatograph. The ion chromatograph was a Daionecc Co. make (model name: CX-120). As a specific test method for respective examples, as well as for comparative examples, comparison was made of samples of liquid discharged from the air electrode upon a completion of 100 times of repetition in the start and stop repeating endurance test. Further, gases emitted at the air electrode were measured by using a gas chromatograph mass spectrometer. The gas chromatograph mass spectrometer used was a Shimadzu Co. make (GCMS-QP5050).

For example 1 to example 12 and comparative example 1 and comparative example 2, the type of electrolyte membrane, used antioxidant redox potential of antioxidant start-stop repetition time number, and presence or absence of emission of fluoride ion, sulfate ion, and carbon dioxide at the air electrode are listed in Table 1 and Table 2 below.

TABLE 1

| | Electrolyte Membrane | Antioxidant | Redox Pot.*) | Repetition Time No. | Fluoride Ion** | Sulfate Ion**) | CO$_2$**) |
|---|---|---|---|---|---|---|---|
| Example 1 | Nafion | NHPI | 1.34 V | 1250 | No | No | Yes |
| Example 2 | Nafion | NHMI | 1.34 V | 1170 | No | No | Yes |
| Example 3 | Nafion | NHSI | 1.36 V | 1210 | No | No | Yes |
| Example 4 | Nafion | NHGI | 1.38 V | 1430 | No | No | Yes |
| Example 5 | Nafion | THICA | 1.40 V | 1450 | No | No | Yes |
| Com. Ex 1 | Nafion | None | — | 120 | Yes | Yes | No |

*)Redox potential of antioxidant
**)Yes: Present, No: Absent

TABLE 2

| | Electrolyte Membrane | Antioxidant | Redox Pot.*) | Repetition Time No. | Fluoride Ion** | Sulfate Ion**) | CO$_2$**) |
|---|---|---|---|---|---|---|---|
| Example 6 | S-PES | TEMPO-OH | 0.81 V | 740 | — | No | Yes |
| Example 7 | S-PES | TEMPO-COOH | 0.81 V | 760 | — | No | Yes |
| Example 8 | S-PES | TEMPO | 0.81 V | 730 | — | No | Yes |
| Example 9 | S-PES | PROXYL-CONH$_2$ | 0.85 V | 730 | — | No | Yes |
| Example 10 | S-PES | PROXYL-COOH | 0.86 V | 730 | — | No | Yes |
| Example 11 | S-PES | ***) | 0.95 V | 610 | — | No | Yes |
| Example 12 | S-PES | DTBN | 0.80 V | 650 | — | No | Yes |
| Com. Ex 2 | S-PES | None | — | 80 | — | Yes | No |

*)Redox potential of antioxidant
**)Yes: Present, No: Absent
***) 3-carbamoyl-2,2,5,5-tetramethylpyrroline-1-yloxy The antioxidants employed in example 1 to example 12 had their redox potentials within a range of a potential of 0.68V (NUE) where hydrogen peroxide acts as an oxidizing agent and a potential of 1.77V (NUE) where hydrogen peroxide acts as a reducing agent, thus meeting the objective.

For the comparative example 1 supplied with no antioxidant, the start and stop repeating endurance test showed, under the condition of power generation with a current density of 1 mA/cm$^3$, a voltage drop to a level of 0.4 V or less at a start-stop repetition time number of 120. To the contrary, in each of example 1 to example 5 supplied with an antioxidant, the voltage dropped below 0.4V about a start-stop repetition time number of 1200, as a verification of a suppressed deterioration of solid polymer electrolyte membrane by addition of the antioxidant, with an enhanced durability. In example 6 to example 12, the voltage dropped below 0.4V at a start-stop repetition time number of 600 or more, which verified an enhanced endurance due to suppressed deterioration of electrolyte membrane.

Ion chromatograph analyses revealed a detection of fluoride ion and sulfate ion in the comparative example 1, and a detection of sulfate ion in the comparative example 2, supporting a deterioration by decomposition of electrolyte membrane. On the contrary, in each of example 1 to example 5, emission of fluoride ion and sulfate ion was below detection limits, proving a suppressed decomposition of Nafion® membrane by introduction of antioxidant. In each of example 6 to example 12, as well, emission of sulfate ion was below detection limits, proving a suppressed decomposition of S-PES membrane by introduction of antioxidant. For example 1 to example 12 where an antioxidant was introduced, measurements by gas chromatograph mass spectrometer revealed a detection of $CO_2$, supporting that the antioxidant, as it had been introduced from the fuel electrode and served for inactivation of active oxygen, was oxidized at the air electrode, emitting $CO_2$.

Although perfluorosulfonic acid system polymers typified by the Nafion® film having wide application to an electrolyte membrane of a fuel cell in a fuel cell system, as well as hydrocarbon system polymers referred to S-PES, are put in a situation where they are unsuccessfully considered having a sufficient tolerance by generation of active oxygen at an air electrode of the fuel cell, as will be seen from the foregoing description, by mixing or dissolving an antioxidant to a liquid fuel according to an embodiment of the invention, active oxygen can be decomposed even if the generation is continuous, thus enabling a prevention of deterioration of the electrolyte membrane, allowing for an enhanced durability of fuel cell system.

Description is now specifically made of composites for electrodes according to examples 13 to 32 of embodiment of the invention and comparative examples 3 to 6, while the scope of the invention is not limited thereto. Those examples exemplify composites for electrodes prepared with different materials, examining their effectiveness.

Employed compounds and their redox potentials are listed in Table 3 and Table 4. Redox potentials of the compounds employed in the examples were measured by using glassy carbon as an acing electrode, platinum as a counter electrode, a saturated calomel electrode (SCE) as a reference electrode, and 1M sulfuric acid as an electrolytic solution. Obtained values were corrected to standard potential $E^O$ (NHE) to be consistent with redox potentials of respective substances.

TABLE 3

| Chemical substances | | Redox potentials (V) of compounds |
|---|---|---|
| Example 13 | NHPI | 1.34 |
| Example 14 | N-hydroxy maleic acid imide | 1.34 |
| Example 15 | N-hydroxy succinic acid imide | 1.36 |
| Example 16 | N-hydroxy trimellitic acid imide | 1.37 |
| Example 17 | N,N'-dihydroxy pyromellitic acid imide | 1.37 |
| Example 18 | NHGI | 1.39 |
| Example 19 | NHNDI | 1.39 |
| Example 20 | NHDDI | 1.39 |
| Example 21 | NHNTI | 1.39 |
| Example 22 | NHDTI | 1.39 |
| Example 23 | THICA | 1.40 |

TABLE 4

| Chemical substances | | Redox potentials (V) of compounds |
|---|---|---|
| Example 24 | TEMPO | 0.81 |
| Example 25 | TEMPO-OH | 0.81 |
| Example 26 | TEMPO-COOH | 0.81 |
| Example 27 | PROXYL-CONH$_2$ | 0.85 |
| Example 28 | PROXYL-COOH | 0.86 |
| Example 29 | ***) | 0.95 |
| Example 30 | DTBN | 0.80 |

***) 3-carbamoyl-2,2,5,5-tetramethylpyrroline-1-yloxy

Samples were prepared in the following manner.

Sample Preparation

Example 13

As platinum-supporting carbon, Cabot Co. make 20 wt % Pt/Vulcan XC-72 was employed. First, to the platinum-supporting carbon, an aqueous solution of 0.5 mM of NHPI was added as oxygen reduction catalyst, and stirred sufficiently, which was left 12 hours, so that NHPI was impregnated to platinum-supporting carbon. Thereafter, platinum-supporting carbon with impregnated NHPI was collected by filtering, as a composite for electrodes. Next, composite for electrodes thus obtained was applied by a spread of 1 mg/c$^2$ to one side of a Nafion® membrane to constitute the air electrode side, and platinum-supporting carbon without impregnated NHPI was applied by a spread of 1 mg/cm$^2$ to the other side to constitute the fuel electrode side, thereby preparing a membrane electrode assembly (MEA). Prepared MEA was incorporated in a single cell, to provide a unit cell for PEFC, which was employed for evaluation. For the evaluation of electrodes and composite for electrodes, unit cells were prepared as a 5-m unit cell. As the high-polymer solid electrolyte membrane to be employed for MEA, a 175-μm thick film of Nafion® 117 of Du Pont Co. was use.

Example 14

Instead of NHPI aqueous solution, an aqueous solution of 0.5 mM of N-hydroxymaleic acid imide was used as an oxygen reduction catalyst for example 14, of which treatment was like to example 13.

Example 15

Instead of NHPI aqueous solution, an aqueous solution of 0.5 mM of N-hydroxysuccinic acid imide was used as an oxygen reduction catalyst for example 15, of which treatment was like to example 13.

Example 16

Instead of NHPI aqueous solution, an aqueous solution of 0.5 mM of N-hydroxytrimellitic acid imide was used as an oxygen reduction catalyst for example 16, of which treatment was like to example 13.

Example 17

Instead of NHPI aqueous solution, an aqueous solution of 0.5 mM of N,N'-dihydroxypyromellitic acid imide was used as an oxygen reduction catalyst for example 17, of which treatment was like to example 13.

Example 18

Instead of NHPI aqueous solution, an aqueous solution of 0.5 mM of N-hydroxyglutaric acid imide (NHGI) was used as an oxygen reduction catalyst for example 18, of which treatment was like to example 13.

Example 19

Instead of NHPI aqueous solution, an aqueous solution of 0.5 mM of N-hydroxy-1,8-naphthalenedicarboxylic acid imide (NHNDI) was used as an oxygen reduction catalyst for example 19, of which treatment was like to example 13.

Example 20

Instead of NHPI aqueous solution, an aqueous solution of 0.5 mM of N-hydroxy-1,8-decalindicarboxylic acid imide (NHDDI) was used as an oxygen reduction catalyst for example 20, of which treatment was like to example 13.

Example 21

Instead of NHPI aqueous solution, an aqueous solution of 0.5 mM of N,N'-dihydroxy-1,8; 4,5-naphthalenetetracarboxylic acid imide (NHNTI) was used as an oxygen reduction catalyst for example 21, of which treatment was like to example 13.

Example 22

Instead of NHPI aqueous solution, an aqueous solution of 0.5 mM of N,N'-dihydroxy-1,8; 4,5-decalintetracarboxylic acid imide (NHDTI) was used as an oxygen reduction catalyst for example 22, of which treatment was like to example 13.

Example 23

Instead of NHPI aqueous solution, an aqueous solution of 0.5 mM of N,N', N"-trihydroxyisocyanuric acid (MICA) was used as an oxygen reduction catalyst for example 23, of which treatment was like to example 13.

Example 24

Instead of NHPI aqueous solution, an aqueous solution of 0.5 mM of TEMPO shown in FIG. 7($i$) was used as an oxygen reduction catalyst for example 24, of which treatment was like to example 13.

Example 25

Instead of NHPI aqueous solution, an aqueous solution of 0.5 mM of N-hydroxy-TEMPO shown in FIG. 7($ii$) was used as an oxygen reduction catalyst for example 25, of which treatment was like to example 13.

Example 26

Instead of NHPI aqueous solution, an aqueous solution of 0.5 mM of 4 boxy-TEMPO shown in FIG. 7 ($iii$) was used as an oxygen reduction catalyst for example 26, of which treatment was like to example 13.

Example 27

Instead of NHPI aqueous solution, an aqueous solution of 0.5 mM of 3-carbamoyl-PROXYL shown in FIG. 8 ($xiii$) was used as an oxygen reduction catalyst for example 27, of which treatment was like to example 13.

Example 28

Instead of NHPI aqueous solution, an aqueous solution of 0.5 mM of 3-carboxy-PROXYL shown in FIG. 8 ($xiv$) was used as an oxygen reduction catalyst for example 28, of which treatment was like to example 13.

Example 29

Instead of NHPI aqueous solution, an aqueous solution of 0.5 mM of 3-carbamoyl-2,2,5,5-tetramethylpyrroline-1-yloxy shown in FIG. 8 ($xv$) was used as an oxygen reduction catalyst for example 29, of which treatment was like to example 13.

Example 30

Instead of NHPI aqueous solution, an aqueous solution of 0.5 mM of 3di-t-butylnitroxide (DTBN) shown in FIG. 8 ($xx$) was used as an oxygen reduction catalyst for example 30, of which treatment was like to example 13.

Comparative Example 3

Comparative example 3 was set to the example 13, as it had platinum-supporting carbon with no NHPI impregnated. That is, on both the fuel electrode side and the air electrode side of Nafion® membrane, platinum-supporting carbon was applied by a spread of mg/cm², thereby preparing an MEA. Prepared MBA was assembled in a unit cell, which was employed for evaluation.

Comparative Example 4

25 wt % Pt/Vulcan XC-72 was employed as platinum-supporting carbon for comparative example 4, of which treatment was like to the comparative example 3.

Comparative Example 5

30 wt % Pt/Vulcan XC-72 was employed as platinum-supporting carbon for comparative example 5, of which treatment was like to the comparative example 3.

Those unit cells which have assembled MEA's obtained by the foregoing methods were evaluated by a power generation test described below.

<Power Generation Test>

70° C. humidified hydrogen gas (atmospheric pressure) and 70° C. humidified oxygen gas (atmospheric pressure) were supplied, respectively, to the fuel electrode and the air electrode of a unit cell held at a temperature of 70° C., which was held in an open-circuit condition for 5 minutes. Thereafter, feeding gas to the unit cell by a flow rate of 300 $dm^3$/ml, the open-circuit voltage was measured, and variations in excess voltage of oxygen were measured. Further, feeding gas by a flow rate of 300 $dm^3$/min to the unit cell, measurements of a current-potential curve were made. For the superiority order of power generation characteristic, judgment was made by a potential to conduction of a current of 1 $mA/cm^2$.

Figure 19:
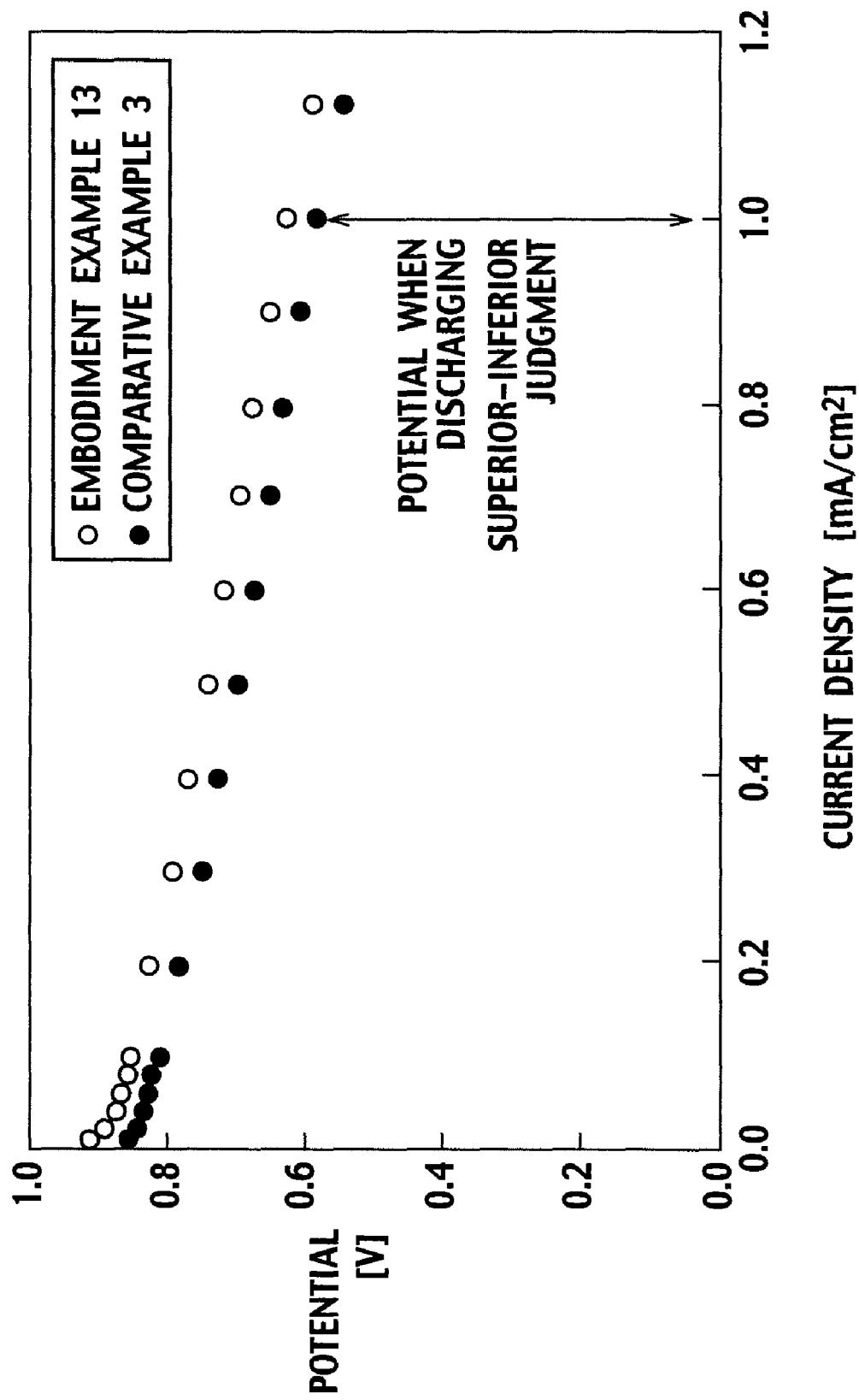
FIG. 19 is a diagram showing a potential vs current curve by initial values, as well as a criterion for decision of a state of generation to be superior or inferior, for a fuel cell fabricated by use of unit cells prepared in an embodiment example 13, and that in a comparative example 3.

FIG. 19 shows initial values of current-potential curves in example 13 and comparative example 3. For example 13 to example 30 and comparative example 3 to comparative 5, the open-circuit voltages and power generation test results are listed Table 5 to Table 7 below.

TABLE 5

| | Platinum-supporting Carbon | Redox Catalyst | Open-circuit Voltage (V) | Circuit voltage (V), when discharged |
|---|---|---|---|---|
| Example 13 | 20 wt % Pt/Vulcan XC-72 | NHPI | 0.93 | 0.63 |
| Example 14 | 20 wt % Pt/Vulcan XC-72 | N-hydroxymaleic acid imide | 0.92 | 0.62 |
| Example 15 | 20 wt % Pt/Vulcan XC-72 | N-hydroxysuccinic acid imide | 0.93 | 0.63 |
| Example 16 | 20 wt % Pt/Vulcan XC-72 | N-hydroxytrimellitic acid imide | 0.91 | 0.61 |
| Example 17 | 20 wt % Pt/Vulcan XC-72 | N,N'-dihydroxy pyromellitic acid imide | 0.91 | 0.60 |
| Comparative Example 3 | 20 wt % Pt/Vulcan XC-72 | None | 0.85 | 0.52 |
| Comparative Example 4 | 25 wt % Pt/Vulcan XC-72 | None | 0.85 | 0.59 |
| Comparative Example 5 | 30 wt % Pt/Vulcan XC-72 | None | 0.86 | 0.66 |

TABLE 6

| | Platinum-supporting Carbon | Redox Catalyst | Open-circuit Voltage (V) | Circuit voltage (V), when discharged |
|---|---|---|---|---|
| Example 18 | 20 wt % Pt/Vulcan XC-72 | NHGI | 0.93 | 0.63 |
| Example 19 | 20 wt % Pt/Vulcan XC-72 | NHNDI | 0.92 | 0.62 |
| Example 20 | 20 wt % Pt/Vulcan XC-72 | NHDDI | 0.93 | 0.63 |
| Example 21 | 20 wt % Pt/Vulcan XC-72 | NHNTI | 0.91 | 0.61 |
| Example 22 | 20 wt % Pt/Vulcan XC-72 | NHDTI | 0.91 | 0.60 |
| Example 23 | 20 wt % Pt/Vulcan XC-72 | THICA | 0.94 | 0.65 |

TABLE 7

| | Platinum-supporting Carbon | Redox Catalyst | Open-circuit Voltage (V) | Circuit voltage (V), when discharged |
|---|---|---|---|---|
| Example 24 | 20 wt % Pt/Vulcan XC-72 | TEMPO | 0.92 | 0.64 |
| Example 25 | 20 wt % Pt/Vulcan XC-72 | TEMOP-OH | 0.90 | 0.62 |

TABLE 7-continued

| | Platinum-supporting Carbon | Redox Catalyst | Open-circuit Voltage (V) | Circuit voltage (V), when discharged |
|---|---|---|---|---|
| Example 26 | 20 wt % Pt/Vulcan XC-72 | TEMPO-COOH | 0.92 | 0.64 |
| Example 27 | 20 wt % Pt/Vulcan XC-72 | PROXYL-CONH$_2$ | 0.92 | 0.64 |
| Example 28 | 20 wt % Pt/Vulcan XC-72 | PROXYL-COOH | 0.92 | 0.64 |
| Example 29 | 20 wt % Pt/Vulcan XC-72 | ***) | 0.88 | 0.60 |
| Example 30 | 20 wt % Pt/Vulcan XC-72 | DTBN | 0.89 | 0.61 |

***) 3-carbamoyl-2,2,5,5-tetramethylpyrroline-1-yloxy

Between example 13 and comparative example 3, comparison of open-circuit voltage was made, with a result that the open-circuit voltage of example 13 appeared to be higher by approx. 10% or near, which was considered due to a decrease in excess voltage of oxygen that had activated reaction at the air electrode, promoting the promoted reduction of oxygen. This phenomenon was observed, not simply in example 13, but also in any of examples 13 to 30 that had added a redox catalyst, as an increase about 5 to 10% relative to the comparative examples that had added no redox catalyst.

The power generation test had as a measure the voltage during generation under the condition of a current density of 1 mA/cm$^3$. In example 1, the voltage upon generation with a current density of 1 mA/cm$^3$ was 0.6V or more, which verified a sufficient voltage obtainable. Further, in comparison between example 13 and comparative example 3, the example 13 that had added NHPI showed a higher circuit voltage when discharged, which was considered as an activation of reaction at the air electrode promoting the reduction of oxygen. Further, in comparison between example 13 and comparative example 5 using 30 wt % Pt/Vulcan XC-72, the example 13 had a little but somewhat lower circuit voltage when discharged, relative to the comparative example 5 which had held a greater amount of platinum. However, relative to comparative example 4 using 25 wt % Pt/Vulcan XC-72, the example 13 had a higher circuit voltage when discharged. From those results, it was indicated that the amount of platinum to be added can be reduced by addition of NHPI.

Further, from results of example 13 to example 30, it was indicated that even in use as catalyst of a compound different from NHPI as an oxygen reduction catalyst, a possible promotion of the reaction of four-electron reduction of oxygen at the air electrode allows for a reduced amount of platinum to be added. It is noted that THICA employed in example 23 is small in molecular weight as well and has 3 functionality, thus being effective as an oxygen reduction catalyst, so that it showed yet enhanced data over other examples, in the open-circuit voltage as well as in voltage when discharged.

Although, in any of example 13 to example 30, impregnation of oxygen reduction catalyst to platinum-supporting carbon was implemented by a method of using a 0.5 mM aqueous solution, the concentration of aqueous solution of the oxygen reduction catalyst is not particularly limited. For the use, it is important to have the compound uniformly dispersed in platinum-supporting carbon. Here is water used as a solvent, whereas an organic solvent may also be used, as necessary, should this be a solvent for an increased solubility of the oxygen reduction catalyst. Further, for oxygen reduction catalyst to reside in platinum-supporting carbon formed in a film after a drying process, the concentration may preferably be within a range of 0.001 to 30 wt %. In a range under 0.001 wt %, the effect of oxygen reduction catalyst may be unsuccessfully exhibited, and in a range over 30 wt %, considerations may be accompanied, such as to a reduced performance of power generation due to catalyst poisoning, reduced ion mobility, influences on variation in strength of membrane, induction of new side reactions, etc. which is undesirable.

<Stability Test>

For stability of compound, each compound was dissolved to 0.5M sulfuric acid by a concentration of 1.0 mM, which was then kept 80° C., while the state of disappearance of compound was quantified by a liquid chromatography.

Figure 20:
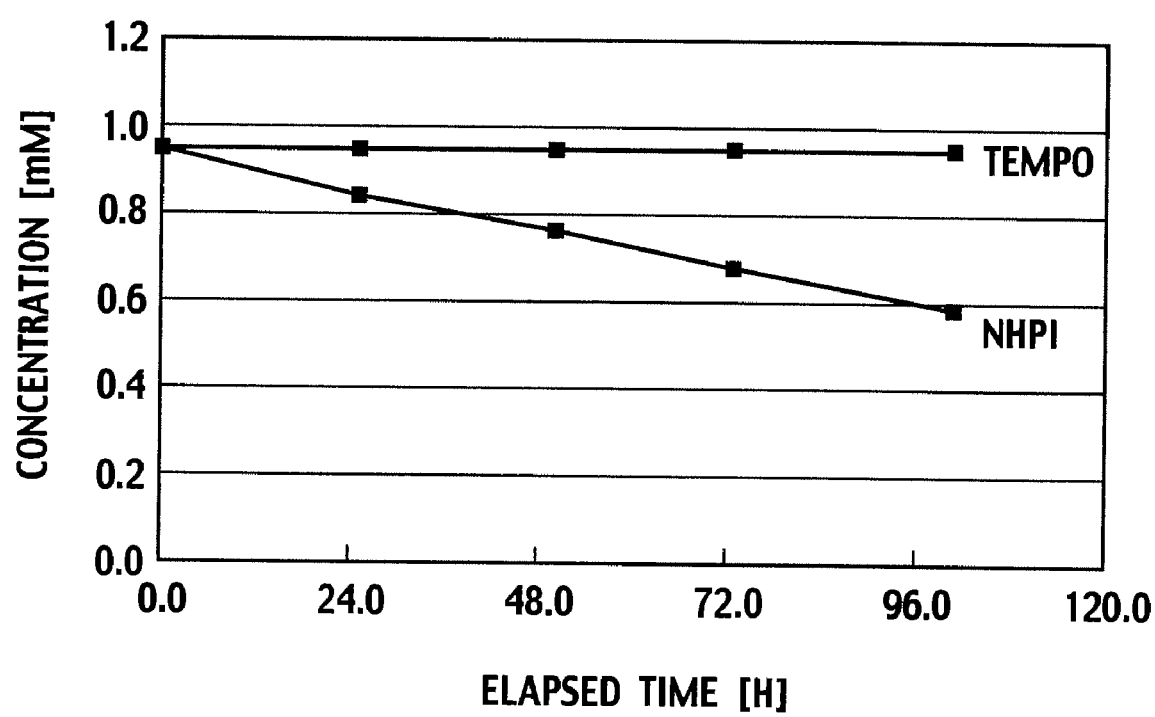
FIG. 20 is a graph showing results of a stability test, for NHPI and TEMPO.

FIG. 20 shows, in a graph, results of stability test on NHPI and TEMPO. As shown in FIG. 20, NHPI, which was hydrolyzed by a reaction shown in FIG. 21(a), had a decreasing concentration as the time had elapsed, so that the concentration of NHPI was decreased to approx. 0.6 mM by a lapse of 96 hours. To the contrary, TEMPO was little changed in concentration even with the lapse of 96 hours. As shown in FIGS. 21(b) and (c), for PROXYL system compound, TEMPO system compound, and DTBN, such hydrolysis as observed of imide system compounds was not observed, indicating that the amount of compound lost was smaller in comparison with the imide system.

<Unit Cell Durability Promotion Test>

At a cell temperature of 90° C., an open-circuit leaving test was performed, where an OCV (open-circuit voltage) was monitored to examine the durability of unit cell by addition of compound to the electrode. 30% humidified hydrogen gas and 30% humidified oxygen gas were supplied by a flow rate of 500 ml/min, to the fuel electrode and the air electrode, respectively, and the OCV was measured while gases were conducted.

Example 31

There were employed Tanaka Precious Metal make TEC10E50E as platinum-supporting carbon, and a 5 wt % solution of Dupon Co. make Nafion® as an electrolyte binder. The platinum-supporting carbon was sufficiently moistured with water, and thereafter, the electrolyte binder was added, and isopropyl alcohol was added, for dispersion of platinum-supporting carbon and electrolyte binder into isopropyl alcohol by the addition of isopropyl alcohol. Thereafter, it was mixed up for three hours by a homogenizer for a homogenization process, and thereafter subjected to a defoaming process, to obtain a catalyst ink. Then, the catalyst ink was applied by a spread of platinum of 0.4 mg/cm$^3$ to a Teflon® sheet, which was referred to catalyst sheet A.

Likewise, employing Tanaka Precious Metal make TEC10E50E as platinum-supporting carbon, and a 5 wt % solution of Dupon Co. make Nafion® as an electrolyte binder, the platinum-supporting carbon was sufficiently moistured with water, and thereafter, the electrolyte binder and 1.8 wt % in carbon ratio of NHPI were added, and isopropyl alcohol was added, for dispersion of platinum-supporting carbon, electrolyte binder, and NHPI into isopropyl alcohol. Thereafter, it was mixed up for three hours by homogenizer for a homogenization process, and thereafter subjected to a defoaming process, to obtain a catalyst ink. Then, the catalyst ink was applied by a spread of platinum of 0.4 mg/cm$^3$ to a Teflon® sheet, which was referred to catalyst sheet B.

The catalyst sheet A was disposed on the air electrode side of a Nafion® 211 membrane, and the catalyst sheet B was disposed on the fuel electrode side, and by a 10-minute hot pressing at 132° C. under 2 MPa, a transfer of electrode catalyst layer was made from the catalyst sheets A and B to the Nafion® 211 membrane, obtaining a CCM (catalyst coated membrane). The CCM was pinced by gas diffusion layers, and additionally pinced by separators and collectors, to have a unit cell prepared with 5×5 cm$^2$ catalyst areas.

Example 32

Like the example 31, prepared catalyst sheet A was disposed on the anode (fuel electrode) side of a Nafion® 211 membrane, and prepared catalyst sheet B was disposed on the cathode (air electrode) side, and by a 10-minute hot pressing at 132° C. under 2 MPa, a transfer of electrode catalyst layer was made from the catalyst sheets A and B to the Nafion® 211 membrane, obtaining a CCM. The CCM was pinced by gas diffusion layers, and additionally pinced by separators and collectors, to have a unit cell prepared with 5×5 cm$^2$ catalyst areas.

Comparative Example 6

There were employed Tanaka Precious Metal make TEC10E50E as platinum-supporting carbon, and a 5 wt % solution of Dupon Co. make Nafion® as an electrolyte binder. The platinum-supporting carbon was sufficiently moistured with water, and thereafter, the electrolyte binder was added, and isopropyl alcohol was added, for dispersion of platinum-supporting carbon and electrolyte binder into isopropyl alcohol. Thereafter, it was mixed up for three hours by homogenizer for a homogenization process, and thereafter subjected to a defoaming process, to obtain a catalyst ink. Then, the catalyst ink was applied by a spread of platinum of 0.4 mg/cm$^3$ to Teflon® sheets, for preparation of two catalyst sheets.

The catalyst sheets were disposed on the fuel electrode side and the air electrode side of a Nafion® 211 membrane, respectively, and by a 10-minute hot pressing at 132° C. under 2 MPa, a transfer of electrode catalyst layer was made from the catalyst sheets to the Nafion® 211 membrane, obtaining a CCM. The CCM was pinced by gas diffusion layers, and additionally pinced by separators and collectors, to have a unit cell prepared with 5×5 cm$^2$ catalyst areas.

Figure 22:
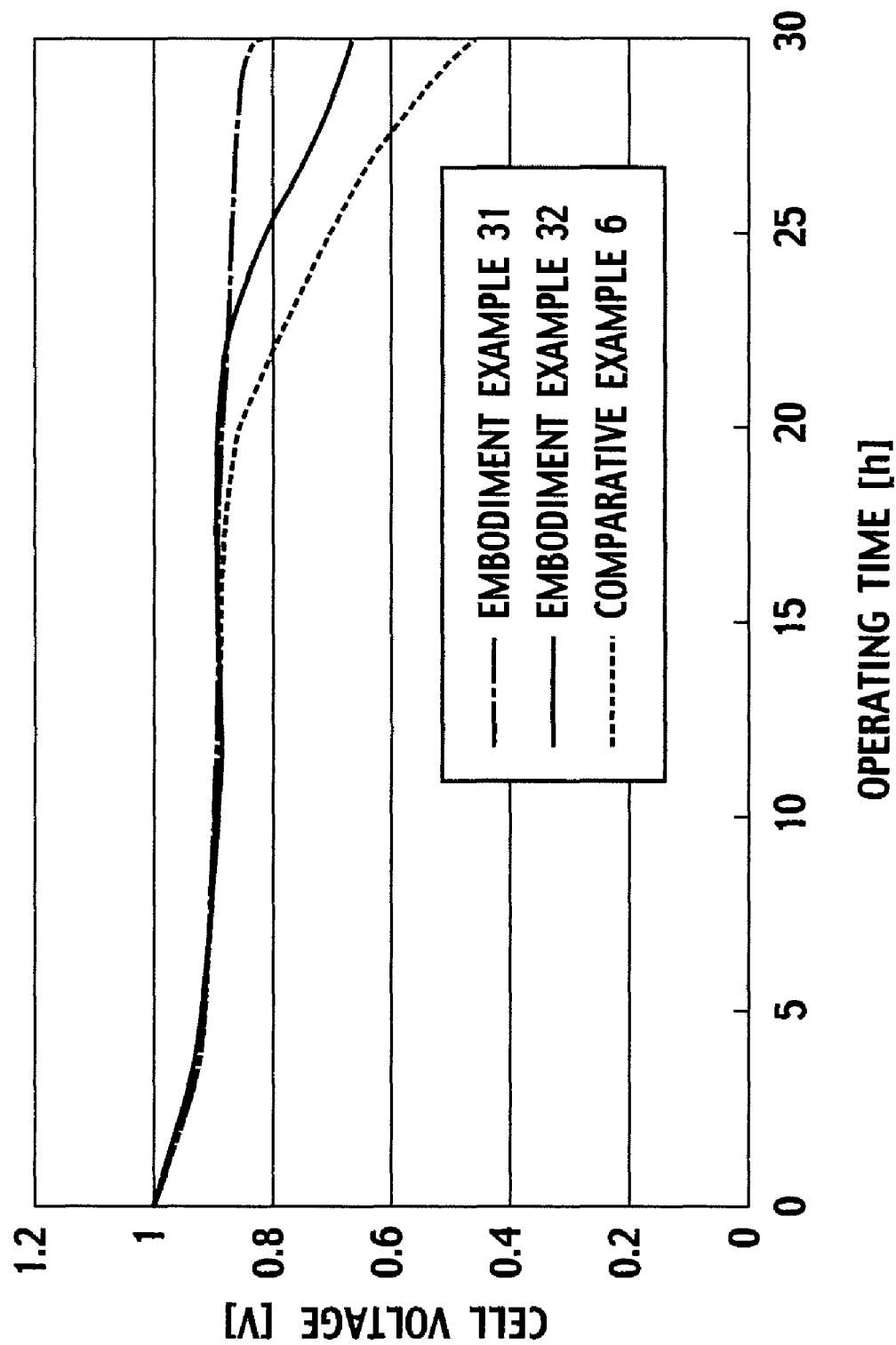
FIG. 22 is a graph showing test results of promoted endurance of unit cells.

FIG. 22 shows results of the unit cell durability promotion test. In any of example 31, example 32, and comparative example 6, the OCV was about 0.95V after initiation of the test, and lowered to about 0.9V by a lapse of 5 hours. In the comparative example 6 that had no NHPI added to elelctrode catalyst layers, the OCV dropped after a lapse of 18 hours from start of the test, so that power generation was disabled with 40 hours, though not shown in FIG. 22. To the contrary in the example 31 that had NHPI added on the fuel electrode side, the OCV was kept about 0.9V until 29 hours has elapsed, so that power generation was maintained up to 80 hours. Further, in the example 32 that had NHPI added on the air electrode side, the OCV was kept about 0.9V until 22 hours has elapsed, so that power generation was maintained up to 50 hours. Like this, by addition of NHPI to elelctrode catalyst layer, the unit cell had an enhanced durability. This is considered due to the NHPI acting as a redox catalyst by repeating a redox cycle, thus removing intermediate products such as hydrogen peroxide by the repetition of redox cycle, as this phenomenon lead to an enhancement of the time of endurance. This effect was more remarkable in the example 31 that had NHPI added on the fuel electrode side. It was thus verified that the duration time of power generation is improved by concurrent use of platinum and a compound that has a redox cycle.

Although NHPI was added to be 1.8 wt % in example 31 and example 32, the amount of addition of NHPI is not particularly limited. Further, not limiting to NHPI, any compound else can be used, if it has a redox function. For the use, it is important to have the compound uniformly dispersed in platinum-supporting carbon. Here is isopropyl alcohol used as a solvent for dispersion of the compound, while, without limiting to isopropyl alcohol, any organic solvent else may be used, should this be a solvent for an increased solubility of the oxygen reduction catalyst. Further, for oxygen reduction catalyst to reside in platinum-supporting carbon formed in a film after a drying process, the concentration may preferably be within a range of 0.001 to 30 wt %. In a range under 0.001 wt %, the effect of oxygen reduction catalyst may be unsuccessfully exhibited, and in a range over 30 wt %, considerations may be accompanied, such as to a reduced performance of power generation due to catalyst poisoning, reduced ion mobility, influences on variation in strength of membrane, induction of new side reactions, etc. which is undesirable.

As described, it is verified that in a proton-exchange membrane fuel cell, the amount of platinum to be used in composites for electrodes can be reduced by concurrent use of platinum and a composite for electrodses containing the above-noted compound. It also is verified that this compound acts as a redox catalyst by repetition of a redox cycle, allowing the use as a catalyst many times, thus allowing for the more reduced amount of catalyst in use.

The whole contents of Japanese Patent Application No. 2004-203147 (filing date: Jul. 9, 2004), Japanese Patent Application No. 2004-258507 (filing date: Sep. 6, 2004), Japanese Patent Application No. 2004-355268 (filing date: Dec. 8, 2004), Japanese Patent Application No. 2005-157449 (filing date: May 30, 2005), and Japanese Patent Application No. 2005-172229 (filing date: Jun. 13, 2005) are incorporated herein by reference.

While the contents of the present invention have been described by way of mode of embodiments and example thereof such description is not limited thereto, and it will be obvious for artisan that various changes and improvements can be made.

INDUSTRIAL APPLICABILITY

In a fuel system according to the invention, an antioxidant residing in or contacting an electrode functions as a catalyst for promoting a reaction of four-electron reduction of oxygen, allowing for a reduced amount of platinum to be in electrode.

The invention claimed is:

1. A fuel cell system comprising:
a fuel cell comprising a plurality of laminated unit cells each respectively comprising:
a membrane electrode assembly comprising a solid polymer electrolyte membrane, and an air electrode and a fuel electrode, with the solid polymer electrolyte membrane in between;
an air electrode side separator disposed on a surface at the air electrode side of the membrane electrode assembly, cooperating with the membrane electrode assembly to have an air channel defined therebetween; and
a fuel electrode side separator disposed on a surface at the fuel electrode side of the membrane electrode assembly, cooperating with the membrane electrode assembly to have a fuel gas channel defined therebetween, and
an antioxidant supply system which supplies the fuel cell with an antioxidant, the antioxidant residing in or contacting the fuel electrode or the air electrode to inactivate active oxygen.

2. The fuel cell system as claimed in claim 1, characterized in that the antioxidant is supplied as an antioxidant solution continuously to the fuel electrode.

3. The fuel cell system as claimed in claim 2, characterized in that the antioxidant solution is an aqueous solution.

4. The fuel cell system as claimed in claim 2, characterized in that the antioxidant supply system comprises an antioxidant solution tank having the antioxidant solution sealed therein, a liquid feed pump for feeding the antioxidant solution to the fuel electrode, an antioxidant solution line interconnecting the antioxidant solution tank and the liquid feed pump, and an antioxidant solution line interconnecting the liquid feed pump and the fuel gas channel.

5. The fuel cell system as claimed in claim 1, characterized in that the antioxidant comprises a hydrocarbon system compound composed of four elements being carbon, oxygen, nitrogen, and hydrogen.

6. The fuel cell system as claimed in claim 1, characterized in that an oxidant of the antioxidant is hydrolyzed to a chemically stable hydrolysate.

7. The fuel cell system as claimed in claim 1, characterized in that the antioxidant has a reversible redox-ability, and an oxidant of the antioxidant is chemically stable.

8. The fuel cell system as claimed in claim 7, characterized in that an oxidant of the antioxidant or unused antioxidant is oxidized by a catalyst contained in the air electrode, to be discharged as $CO_2$, $H_2O$, or $N_2$.

9. The fuel cell system as claimed in claim 1, characterized in that the antioxidant has a standard oxidation-reduction potential greater than 0.68 V and smaller than 1.77 V.

10. The fuel cell system as claimed in claim 1, characterized in that the antioxidant comprises a compound represented by a general formula (I) below

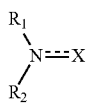
(I)

where R1 and R2 denote arbitrary substituent groups, identical or different, and X denotes an oxygen atom or a hydroxyl group.

11. The fuel cell system as claimed in claim 10, characterized in that R1 and R2 are combined with each other, to form a double bond, an aromatic ring, or a nonaromatic ring.

12. The fuel cell system as claimed in claim 11, characterized in that the antioxidant comprises an imide compound represented by a general formula (II) below

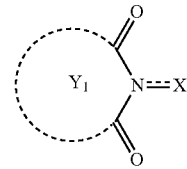
(II)

where a ring Y1 denotes any one kind of ring among 5-membered to 12-membered rings double-bonded and aromatic or nonaromatic.

13. The fuel cell system as claimed in claim 12, characterized in that the antioxidant comprises an imide compound represented by a general formula (III) below

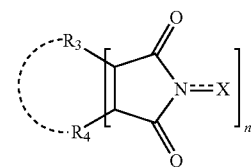
(III)

where R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or a hydroxyl group, and n denotes an integer within 1 to 3.

14. The fuel cell system as claimed in claim 13, characterized in that R3 and R4 are combined with each other to form a double bond, an aromatic ring, or a nonaromatic ring.

15. The fuel cell system as claimed in claim 13, characterized in that R3 and R4 are combined with each other to form any one kind of ring among 5-membered to 12-membered rings aromatic or nonaromatic.

16. The fuel cell system as claimed in claim 13, characterized in that R3 and R4 are combined with each other to form at least one kind of ring selective from a set of a cycloalkane, a cycloalkene, a bridged hydrocarbon ring, and an aromatic ring, and substitutions thereof.

17. The fuel cell system as claimed in claim 13, characterized in that the imide compound comprises an imide compound represented by one of general formulas (IVa) to (IVf) below

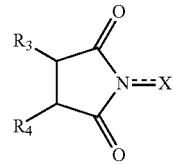
(IVa)

-continued

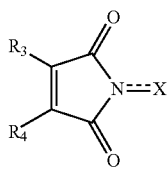
(IVb)

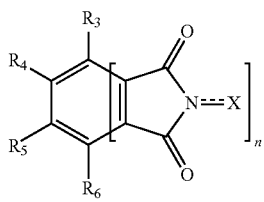
(IVc)

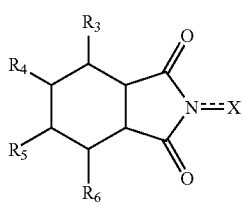
(IVd)

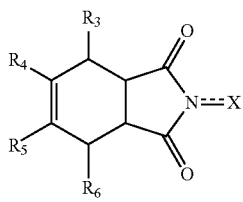
(IVe)

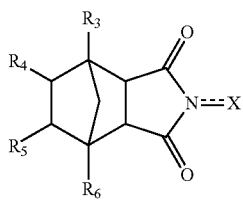
(IVf)

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

18. The fuel cell system as claimed in claim 13, characterized in that the imide compound comprises an imide compound selective from a set of N-hydroxy succinic acid imide, N-hydroxy maleic acid imide, N-hydroxy hexahydrophthalic acid imide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide.

19. The fuel cell system as claimed in claim 12, characterized in that the compound represented by the general formula (II) comprises a compound represented by a general formula (V) below

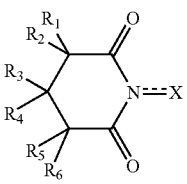
(V)

where X denotes an oxygen atom or a hydroxyl group, R1 to R6 respectively denote elements of a set of hydrogen atoms, alkyl groups, aryl groups, cycloalkyl groups, hydroxyl groups, alkoxyl groups, carboxyl groups, substituent carbonyl groups, acyl groups, or acyloxy groups, mutually identical or different, wherein at least two of R1 to R6 may be combined with each other to form a double bond, or an aromatic or nonaromatic ring, whereof at least one ring may comprises an N-substituent cyclic imide group.

20. The fuel cell system as claimed in claim 19, characterized in that the compound represented by the general formula (V) comprises a compound represented by one of general formulas (VIa) and (VIb) below

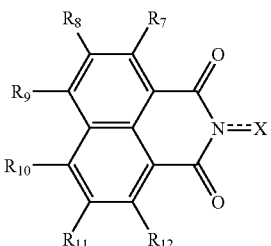
(VIa)

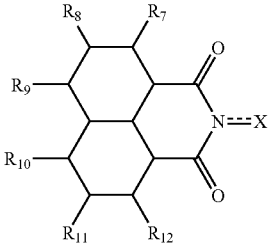
(VIb)

where R7 to R12 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

21. The fuel cell system as claimed in claim 20, characterized in that the compound represented by one of the general formulas (V), (VIa) and (VIb) comprises an imide compound selective from a set of N-hydroxyglutaric acid imide, N-hydroxy-1,8-naphthalene dicarboxylic acid imide, N-hydroxy-1,8-decalin dicarboxylic acid imide, N,N'-dihydroxy-1,8; 4,5-naphthalene tetracarboxylic acid imide, N,N dihydroxy-1,8; 4,5-decalin tetracarboxylic acid imide, and N,N', N" trihydroxy isocyanuric acid imide.

22. The fuel cell system as claimed in claim 10, characterized in that the compound represented by the general formula (I) comprises a compound represented by a general formula (VII) below

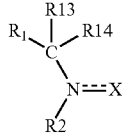
(VII)

where R13 and R14 each respectively denote an alkyl group, or an alkyl group substituted in part by an arbitrary radical, wherein R13 and R14 may be chained, ringed, or branched, wherein R13 and R14 may be combined with each other to form a ring, wherein oxygen and nitrogen atoms may be included.

23. The fuel cell system as claimed in claim 22, characterized in that the compound represented by the general formula (VII) comprises a compound represented by a general formula (VIII) below

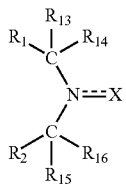
(VIII)

where R13 to R16 each respectively denote an alkyl group, or an alkyl group substituted in part by an arbitrary radical, wherein R13 to R16 may be chained, ringed, or branched, wherein R13 and R14, or R15 and R16 may be combined with each other to form a ring, wherein oxygen and nitrogen atoms may be included.

24. The fuel cell system as claimed in claim 23, characterized in that the compound represented by the general formula (VIII) comprises a compound represented by a general formula (IX) below

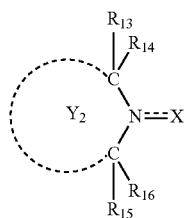
(IX)

where a ring Y2 denotes a 5-membered or 6-membered ring formed by R13 and R14 mutually combined.

25. The fuel cell system as claimed in claim 24, characterized in that the compound represented by the general formula (IX) comprises a compound represented by a general formula (X) below

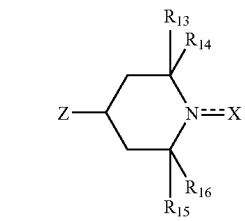
(X)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

26. The fuel cell system as claimed in claim 24, characterized in that the compound represented by the general formula (IX) comprises a compound represented by a general formula (XI) below

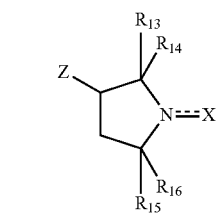
(XI)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

27. The fuel cell system as claimed in claim 24, characterized in that the compound represented by the general formula (IX) comprises a compound represented by a general formula (XII) below

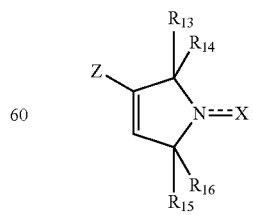
(XII)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

28. The fuel cell system as claimed in claim 1, characterized in that the antioxidant has an oxidation-reduction potential greater than 0.68 V and smaller than 1.00 V.

29. The fuel cell system as claimed in claim 1, characterized in that the fuel cell comprises any one kind selective from among a hydrogen fuel cell, a direct methanol fuel cell, and a direct hydrocarbon fuel cell.

30. The fuel cell system as claimed in claim 1, characterized in that the antioxidant comprises a compound having a redox cycle, where it acts as a reducing agent in a range of potentials lower than a redox potential of oxygen and as an oxidizing agent in a range of potentials higher than a redox potential of hydrogen or hydrogen ion, and the fuel cell electrode or the air electrode contains the compound as an oxidation-reduction catalyst.

31. A fuel cell system comprising
a fuel cell comprising a plurality of laminated unit cells each respectively comprising:
a membrane electrode assembly comprising a solid polymer electrolyte membrane, and an air electrode and a fuel electrode, with the solid polymer electrolyte membrane in between;
an air electrode side separator disposed on a surface at the air electrode side of the membrane electrode assembly, cooperating with the membrane electrode assembly to have an air channel defined therebetween; and
a fuel electrode side separator disposed on a surface at the fuel electrode side of the membrane electrode assembly, cooperating with the membrane electrode assembly to have a fuel gas channel defined therebetween, and
antioxidant supply means for supplying the fuel cell with the antioxidant, the antioxidant residing in or contacting the fuel electrode or the air electrode to inactivate active oxygen.

32. A composite for electrodes, comprising: a composition containing as an oxidation-reduction catalyst a compound having a redox cycle, where it acts as a reducing agent in a range of potentials lower than a redox potential of oxygen and as an oxidizing agent in a range of potentials higher than a redox potential of hydrogen or hydrogen ion.

33. The composite for electrodes as claimed in claim 32, characterized in that said compound has a standard redox potential within a range of 0.00V to 1.40V.

34. The composite for electrodes as claimed in claim 32, characterized in that said compound has a standard redox potential within a range of 0.68V to 1.00V.

35. The composite for electrodes as claimed in claim 32, characterized in that said compound comprises a compound represented by a general formula (I) below

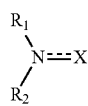
(I)

where R1 and R2 denote arbitrary substituent groups, identical or different, and X denotes an oxygen atom or a hydroxyl group, wherein R1 and R2 may respectively be a substituent group selective from a set of alkyl groups, aryl groups, alkoxy groups, and substituent groups including a hydrogen atom, wherein for R1 and R2 being an alkyl group or alkoxy group, the alkyl group or alkoxy group may be an unsaturated alkyl group or alkoxy group or an alkyl group or alkoxyl group substituted in part by an arbitrary radical, and may be chained, ringed, or branched, and may include oxygen and nitrogen atoms, wherein for R1 and R2 being aryl groups, the aryl groups may be substituted in part by an arbitrary radical, and may include oxygen and nitrogen atoms.

36. The composite for electrodes as claimed in claim 35, characterized in that R1 and R2 are combined with each other, to form a double bond, an aromatic ring, or a nonaromatic ring.

37. The composite for electrodes as claimed in claim 36, characterized in that the compound comprises an imide compound represented by a general formula (II) below

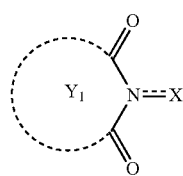
(II)

where a ring Y1 denotes any one kind of ring among 5-membered to 12-membered rings double-bonded and aromatic or nonaromatic.

38. The composite for electrodes as claimed in claim 37, characterized in that the compound represented by the general formula (II) comprises an imide compound represented by a general formula (III) below

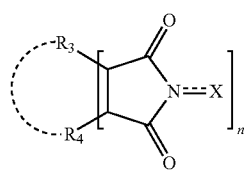
(III)

where R3 and R4 respectively denote elements of a set of hydrogen atoms, halogen atoms, alkyl groups, aryl groups, cycloalkyl groups, hydroxyl groups, alkoxyl groups, carboxyl groups, alkoxycarbonyl groups, or acyl groups, mutually identical or different, X denotes an oxygen atom or a hydroxyl group, and n denotes an integer within 1 to 3.

39. The composite for electrodes as claimed in claim 38, characterized in that R3 and R4 are combined with each other to form a double bond, an aromatic ring, or a nonaromatic ring.

40. The composite for electrodes as claimed in claim 38, characterized in that R3 and R4 are combined with each other to form any one kind of ring among 5-membered to 12-membered rings aromatic or nonaromatic.

41. The composite for electrodes as claimed in claim 38, characterized in that R3 and R4 are combined with each other to form at least one kind of ring selective from a set of a cycloalkane, a cycloalkene, a bridged hydrocarbon ring, and an aromatic ring, and substitutions thereof.

42. The composite for electrodes as claimed in claim 38, characterized in that the imide compound comprises an imide compound represented by one of general formulas (IVa) to (IVf) below

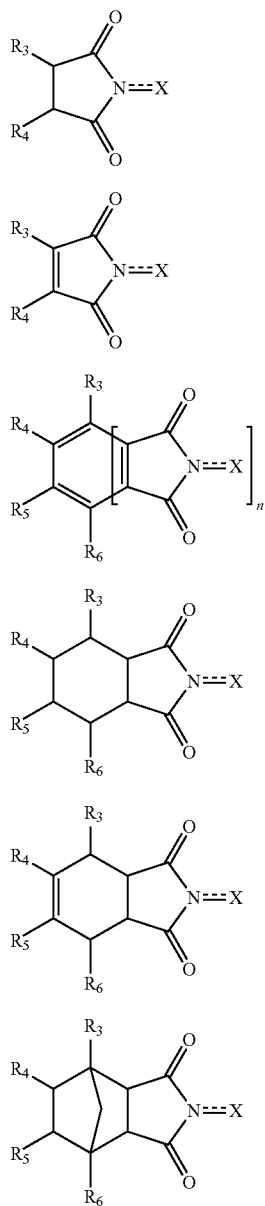

where R3 to R6 respectively denote elements of a set of hydrogen atoms, halogen atoms, alkyl groups, hydroxyl groups, alkoxyl groups, carboxyl groups, alkoxycarbonyl groups, acyl groups, nitro groups, cyano groups, or amino groups, mutually identical or different, and n denotes an integer within 1 to 3.

43. The composite for electrodes as claimed in claim 38, characterized in that the imide compound comprises an imide compound selective from a set of N-hydroxy succinic acid imide, N-hydroxy maleic acid imide, N-hydroxy hexahydrophthalimide, N,N'-dihydroxycyclohexane tetracarboxylic acid imide, N-hydroxyphthalimide, N-hydroxy tetrabromophthalic acid imide, N-hydroxy tetrachlorophthalic acid imide, N-hydroxy fatty acid imide, N-hydroxy himic acid imide, N-hydroxy trimellitic acid imide, N,N'-dihydroxy pyromellitic acid imide, and N,N'-dihydroxynaphthalene tetracarboxylic acid imide.

44. The composite for electrodes as claimed in claim 37, characterized in that the compound represented by the general formula (II) comprises a compound represented by a general formula (V) below

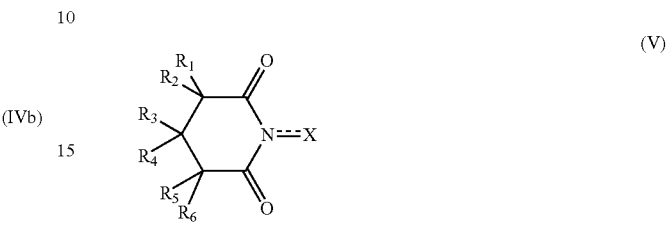

where X denotes an oxygen atom or a hydroxyl group, R1 to R6 respectively denote elements of a set of hydrogen atoms, alkyl groups, aryl groups, cycloalkyl groups, hydroxyl groups, alkoxyl groups, carboxyl groups, substituent oxycarbonyl groups, acyl groups, or acyloxy groups, mutually identical or different, wherein at least two of R1 to R6 may be combined with each other to form a double bond, or an aromatic or nonaromatic ring, whereof at least one ring may comprise an N-substituent cyclic imide group.

45. The composite for electrodes as claimed in claim 44, characterized in that the compound represented by the general formula (V) comprises a compound represented by one of general formulas (VIa) and (VIb) below

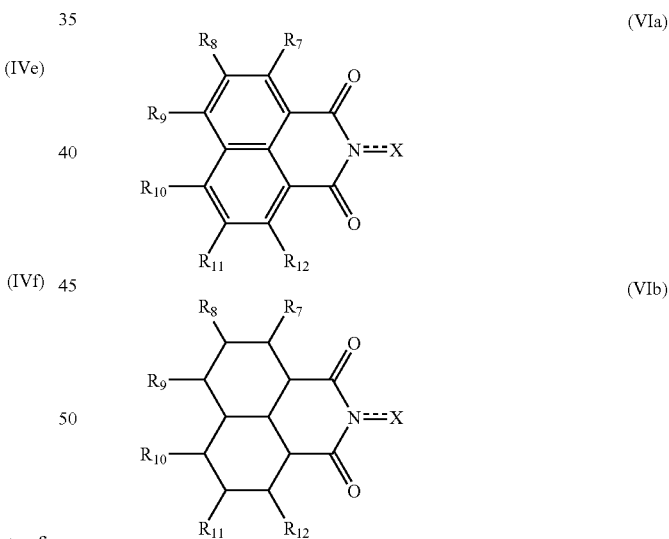

where R7 to R12 respectively denote elements of a set of hydrogen atoms, alkyl groups, hydroxyl groups, alkoxyl groups, carboxyl groups, alkoxycarbonyl groups, acyl groups, nitro groups, cyano groups, or amino groups, mutually identical or different.

46. The composite for electrodes as claimed in claim 45, characterized in that the compound represented by one of the general formulas (V), (VIa) and (VIb) comprises an imide compound selective from a set of N-hydroxyglutaric acid imide, N-hydroxy-1,8-naphthalene dicarboxylic acid imide, N-hydroxy-1,8-decalin dicarboxylic acid imide, N,N dihydroxy-1,8; 4,5-naphthalene tetracarboxylic acid imide, N,N'-dihydroxy-1,8; 4,5-decalin tetracarboxylic acid imide, and N,N,N" trihydroxy isocyanuric acid imide.

47. The composite for electrodes as claimed in claim 35, characterized in that the compound represented by the general formula (I) comprises a compound represented by a general formula (VII) below

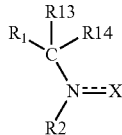

(VII)

where R13 and R14 each respectively denote an alkyl group, or an alkyl group substituted in part by an arbitrary radical, wherein R13 and R14 may be chained, ringed, or branched, wherein R13 and R14 may be combined with each other to form a ring, wherein oxygen and nitrogen atoms may be included.

48. The composite for electrodes as claimed in claim 47, characterized in that the compound represented by the general formula (VII) comprises a compound represented by a general formula (VIII) below

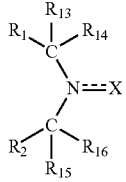

(VIII)

where R13 to R16 each respectively denote an alkyl group, or an alkyl group substituted in part by an arbitrary radical, wherein R13 to R16 may be chained, ringed, or branched, wherein R13 and R14, or R15 and R16 may be combined with each other to form a ring, wherein oxygen and nitrogen atoms may be included.

49. The composite for electrodes as claimed in claim 48, characterized in that the compound represented by the general formula (VIII) comprises a compound represented by a general formula (IX) below

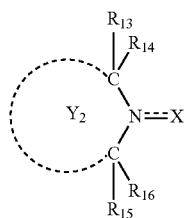

(IX)

where a ring Y2 denotes a 5-membered or 6-membered ring formed by R13 and R14 mutually combined.

50. The composite for electrodes as claimed in claim 49, characterized in that the compound represented by the general formula (IX) comprises a compound represented by a general formula (X) below

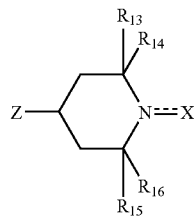

(X)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

51. The composite for electrodes as claimed in claim 49, characterized in that the compound represented by the general formula (IX) comprises a compound represented by a general formula (XI) below

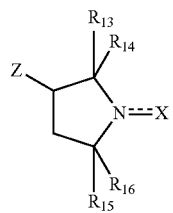

(XI)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

52. The composite for electrodes as claimed in claim 49, characterized in that the compound represented by the general formula (IX) comprises a compound represented by a general formula (XII) below

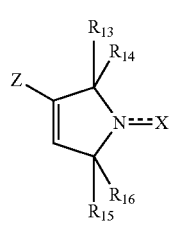

(XII)

where Z denotes a substituent group selective from a set of alkyl groups, aryl groups, alkoxy groups, carboxyl groups, alkoxycarbonyl groups, cyano groups, hydroxyl groups, nitro groups, amino groups, and substituent groups including a hydrogen atom, wherein for Z being an alkyl group, the alkyl group may be substituted in part by an arbitrary radical, and may be chained, ringed, or branched in part, and may include oxygen and nitrogen atoms, wherein for Z being an aryl group, the aryl group may be substituted in part by an arbitrary radical, and may include oxygen and nitrogen atoms.

53. The composite for electrodes as claimed in claim 32, further characterized by an auxiliary catalyst for promoting oxidation of said compound.

54. The composite for electrodes as claimed in claim 53, characterized in that the auxiliary catalyst comprises an element selected from among lanthanoids, V, Mo, W, Fe, Ru, Co, Rh, Ni, Cu, Ag, Ir, Pd, Pt, and Au, or at least one kind selective from a set of oxides, organic acid salts, inorganic acid salts, halides, complexes, heteropolyacids, and heteropolyacid salts including such an element.

55. The composite for electrodes as claimed in claim 54, characterized in that a carrier supporting said compound and the auxiliary catalyst comprises conductive carbon or nanostructure carbon.

56. The composite for electrodes as claimed in claim 55, characterized in that the conductive carbon comprises an acetylene black, and the nanostructure carbon comprises a carbon nanotube.

57. An electrode comprising a composite for electrodes claimed in claim 32.

58. A composite for air electrodes comprising a composite for electrodes claimed in claim 32.

59. An air electrode for fuel cells comprising a composite for air electrodes claimed in claim 58.

60. A fuel cell comprising an electrode claimed in claim 57.

61. A fuel cell vehicle having mounted thereon a fuel cell system claimed in claim 1.

* * * * *